United States Patent
Liang et al.

(10) Patent No.: US 12,089,293 B2
(45) Date of Patent: Sep. 10, 2024

(54) METHODS AND APPARATUSES FOR SENDING AND RECEIVING PHYSICAL LAYER PROTOCOL DATA UNIT

(71) Applicant: HUAWEI TECHNOLOGIES CO., LTD., Guangdong (CN)

(72) Inventors: Dandan Liang, Shenzhen (CN); Ming Gan, Shenzhen (CN); Xun Yang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 290 days.

(21) Appl. No.: 17/524,971

(22) Filed: Nov. 12, 2021

(65) Prior Publication Data
US 2022/0078884 A1    Mar. 10, 2022

Related U.S. Application Data
(63) Continuation of application No. PCT/CN2020/089526, filed on May 11, 2020.

(30) Foreign Application Priority Data

May 14, 2019    (CN) .......................... 201910402342.9

(51) Int. Cl.
H04W 72/0453 (2023.01)
H04W 80/02 (2009.01)

(52) U.S. Cl.
CPC ....... *H04W 80/02* (2013.01); *H04W 72/0453* (2013.01)

(58) Field of Classification Search
None
See application file for complete search history.

(56) References Cited

U.S. PATENT DOCUMENTS

2013/0114757 A1    5/2013  Park et al.
2016/0261452 A1*   9/2016  Porat ................... H04L 27/2656
(Continued)

FOREIGN PATENT DOCUMENTS

CN    101527664 A    9/2009
CN    105120520 A    12/2015
(Continued)

OTHER PUBLICATIONS

P802.11ax/D3.0, "Draft Standard for Information Technology—Telecommunications and Information Exchange Between Systems Local and Metropolitan Area Networks—Specific Requirements Part 11: Wireless LAN Medium Access Control (MAC) and Physical Layer (PHY) Specifications Amendment Enhancements for High Efficiency WLAN", Jun. 2018—IEEE , total 682 pages.
(Continued)

*Primary Examiner* — Benjamin Lamont

(57) ABSTRACT

This application provides methods and apparatuses for sending and receiving a physical layer protocol data unit. The method includes generating a physical layer protocol data unit PPDU, where the PPDU includes a short training field, a length of a frequency domain sequence of the short training field is greater than a first length, and the first length is a length, for example, 2048, of a frequency domain sequence of a short training field that is transmitted over a 160 MHz-bandwidth channel; and sending the PPDU over a target channel, where a bandwidth of the target channel is greater than 160 MHz. According to embodiments of this application, a larger actual channel bandwidth can be achieved, and backward compatibility is implemented.

16 Claims, 6 Drawing Sheets

(1)

(2)

(56) References Cited

U.S. PATENT DOCUMENTS

| | | | |
|---|---|---|---|
| 2018/0145811 | A1 | 5/2018 | Park et al. |
| 2018/0183905 | A1 | 6/2018 | Azizi et al. |
| 2019/0053240 | A1* | 2/2019 | Park .................. H04L 27/2626 |
| 2019/0116545 | A1 | 4/2019 | Verma et al. |
| 2019/0268739 | A1 | 8/2019 | Cariou et al. |
| 2019/0288895 | A1* | 9/2019 | Chen .................. H04W 72/542 |
| 2019/0289612 | A1 | 9/2019 | Chen et al. |
| 2020/0076552 | A1 | 3/2020 | Cherian et al. |
| 2020/0275371 | A1 | 8/2020 | Park et al. |
| 2021/0336827 | A1* | 10/2021 | Park .................... H04L 1/0069 |
| 2022/0140962 | A1 | 5/2022 | Park et al. |
| 2022/0361170 | A1* | 11/2022 | Park ..................... H04L 27/262 |

FOREIGN PATENT DOCUMENTS

| | | | |
|---|---|---|---|
| CN | 105162745 | A | 12/2015 |
| CN | 106100791 | A | 11/2016 |
| CN | 106936749 | A | 7/2017 |
| CN | 107508780 | A | 12/2017 |
| CN | 108040028 | A | 5/2018 |
| CN | 110324268 | A | 10/2019 |
| CN | 110768924 | A | 2/2020 |
| CN | 111886839 | A | 11/2020 |
| CN | 116366414 | A | 6/2023 |
| EP | 3829124 | A1 | 6/2021 |
| JP | 2017531954 | A | 10/2017 |
| JP | 2023510228 | A | 3/2023 |
| JP | 2023518733 | A | 5/2023 |
| KR | 20160086950 | A | 7/2016 |
| KR | 20170139516 | A | 12/2017 |
| KR | 20210041005 | A | 4/2021 |
| WO | 2013152111 | A1 | 10/2013 |
| WO | 2018076144 | A1 | 5/2018 |
| WO | 2019178511 | A1 | 9/2019 |

OTHER PUBLICATIONS

Yuanwen Li et al., "Research On Channel Propagation Cha.R. Acteristic and Acquisition Technology of Millimeter Wave MIMO Systems", May 30, 2016,total: 94 pages.
Doc.: IEEE 802.11-16/0903r1, Yujin Noh et al, Gamma Phase Rotation for HE PPDU, Jul. 2016, total 26 pages. XP068158320.
IEEE Computer Society et al.,"Part 11: Wireless LAN Medium Access Control (MAC) and Physical Layer (PHY) specifications", IEEE Std 802.11g—2003,total: 78 pages.
IEEE Standard for Information technology Telecommunications and information exchange between systems Local and metropolitan area networks Specific requirements, "Part 11: Wireless LAN Medium Access Control (MAC) and Physical Layer (PHY) Specifications",IEEE Std 802.11—2007, total: 1232 pages.
Doc.: IEEE 802.11-18/1967r1, Eunsung Park et al, Overview of PHY Features for EHT, Jan. 2019, total 22 pages. XP068159645.
IEEE Computer Society et al., "Part 11:Wireless LAN Medium Access Control (MAC) and Physical Layer(PHY) Specifications", IEEE Std 802.11 n-2009, total: 536 pages.
HTC et al.,."UE radio access capability for WLAN",3GPP TSG-RAN2#91bis meeting,Malmo, Sweden, Tdoc R2-154369,Oct. 5-9, 2015,total: 7 pages.
IEEE Computer Society et al.,"Part 11: Wireless LAN Medium Access Control (MAC) and Physical Layer (PHY) Specifications", IEEE Std 802.11ac—2013, total: 425 pages.
Office Action for U.S. Appl. No. 17/158,758 dated May 24, 2021, 11 pages.
European Search Report dated Aug. 25, 2021 for Application No. 19842154.7, 9 pages.
PCT Search Report for PCT/CN2020/089526 dated Jul. 29, 2020, 9 pages.
Office Action for Chinese Application No. 201910402342 dated Jan. 2, 2024, 10 pages.
Doc.: IEEE 802.11-16/0335r0, Eunsung Park et al, HE-STF Sequences for 160/SO+SOMHz, Mar. 2016, total 21 pages, XP068105204.
Doc.: IEEE 802.11-15/1323r1, Eunsung Park et al, HE-STF Sequences, Nov. 2015, total 28 pages, XP068099281.
Doc.: IEEE 802.11-20/0585r0, Eunsung Park et al, Consideration on EHT-STF, Mar. 2020, total 16 pages, XP068167507.
European Search Report for Application No. 20806697.7 dated May 6, 2022, 10 pages.
Office Action for U.S. Appl. No. 17/856,112 dated Feb. 13, 2023, 31 pages.
Office Action for Chinese Application No. 201910402342 dated Apr. 25, 2023, 106 pages.
Office Action for U.S. Appl. No. 18/360,114 dated Sep. 22, 2023, 36 pages.
Notice of Reasons for Rejection for Japanese Application No. 2012-568364 dated Dec. 23, 2022, 9 pages (with translation).
Office Action for Chinese Application No. 202010007115.9 dated Oct. 12, 2023, 6 pages.
Notice of Allowance for Korean Application No. 952024046340346 dated Jun. 3, 2024, 4 pages.
Eunsung Park (LG ELECTRONICS):" EHT-STF Sequences", IEEE Draft; 11-20-0782-01-00BE-EHT-STF-Sequences, IEEE-Samentor, Piscataway, NJ USA, vol. 802.11 EHT; 802.11be, No. 1 May 29, 2020 (May 29, 2020), pp. 1-28, XP068168119.
European Patent Office Communication for EP Application No. 21817818.4 dated Jun. 18, 2024, 9 pages.
Notice of Allowance for Japanese Application No. 2022-574137 dated Jul. 9, 2024, 4 pages.

* cited by examiner (1)

(2)

METHODS AND APPARATUSES FOR SENDING AND RECEIVING PHYSICAL LAYER PROTOCOL DATA UNIT

CROSS-REFERENCE TO RELATED APPLICATIONS

This application is a continuation of International Application No. PCT/CN2020/089526, filed on May 11, 2020, which claims priority to Chinese Patent Application No. 201910402342.9, filed on May 14, 2019. The disclosures of the aforementioned applications are hereby incorporated by reference in their entireties.

TECHNICAL FIELD

This application relates to the field of communications technologies, and more specifically, to methods and apparatuses for sending and receiving a physical layer protocol data unit.

BACKGROUND

From IEEE 802.11a to 802.11g, 802.11n, 802.11ac, and 802.11ax, available frequency bands include 2.4 gigahertz (GHz) and 5 GHz. With increasingly more available frequency bands, a maximum channel bandwidth supported by 802.11 is expanded from 20 megahertz (MHz) to 40 MHz and then to 160 MHz. In 2017, the federal communications commission (FCC) opened up a new unlicensed frequency band of 6 GHz (5925 MHz-7125 MHz). Drafters of the 802.11ax standard expanded an operating range of 802.11ax devices from 2.4 GHz and 5 GHz to 2.4 GHz, 5 GHz and 6 GHz in an 802.11ax project authorization request (PAR). Because available bandwidth of the newly opened 6 GHz frequency band is larger, it can be predicted that a channel bandwidth greater than 160 MHz will be supported in a next-generation standard of 802.11ax.

Therefore, how to design a short training field (STF) for a larger channel bandwidth is a problem needing to be resolved.

SUMMARY

This application provides methods and apparatuses for sending and receiving a physical layer protocol data unit, so that a short training sequence can be designed for a larger channel bandwidth, and can be backward compatible.

According to a first aspect, a method for sending a physical layer protocol data unit is provided. The method may be performed by a network device, or may be performed by a chip or a circuit configured in the network device. This is not limited in this application.

The method may include: generating a physical layer protocol data unit (PPDU), where the PPDU includes a short training field, a length of a frequency domain sequence of the short training field is greater than a first length, and the first length is a length of a frequency domain sequence of a short training field that is transmitted over a 160 MHz-bandwidth channel; and sending the PPDU over a target channel, where a bandwidth of the target channel is greater than 160 MHz.

According to a second aspect, a method for receiving a physical layer protocol data unit is provided. The method may be performed by a terminal device, or may be performed by a chip or a circuit configured in the terminal device. This is not limited in this application.

The method may include: receiving a PPDU over a target channel, where the PPDU includes a short training field, a length of a frequency domain sequence of the short training field is greater than a first length, the first length is a length of a frequency domain sequence of a short training field that is transmitted over a 160 MHz-bandwidth channel, and a bandwidth of the target channel is greater than 160 MHz; and parsing the PPDU.

Based on the foregoing technical solution, a short training sequence or a frequency domain sequence corresponding to a larger channel bandwidth is determined. This may support a receive end to perform automatic gain control on data transmitted over the larger channel bandwidth. The short training sequence may be obtained based on a short training sequence of an existing channel bandwidth, and a short training sequence with comparatively good performance may be obtained through simulation calculation, for example, parameter adjustment. A short training field may be obtained based on the short training sequence. According to an embodiment of this application, a larger actual channel bandwidth can be achieved, and backward compatibility is implemented. In addition, exhaustive simulation is performed on parameters to verify that the short training sequence provided in the embodiment of this application has a comparatively small peak to average power ratio (PAPR) and comparatively good performance. This improves an estimation effect of an automatic gain control circuit at the receive end, and reduces a receive bit error rate.

Optionally, the short training field may also be referred to as a field for short training.

Optionally, the length of the frequency domain sequence of the short training field is greater than 2048.

With reference to the first aspect or the second aspect, in some implementations, the bandwidth of the target channel is 240 MHz, and the frequency domain sequence of the short training field is any one of the following:

$\{HES_{-496:16:496'}, 1, -HES_{-496:16:496'}, 0, -HES_{-496:16:496'}\} * (1+j)/\sqrt{2}$;

$\{-HES_{-496:16:496'}, -1, HES_{-496:16:496'}, 0, HES_{-496:16:496'}\} * (1+j)/\sqrt{2}$;

$\{HES_{-496:16:496'}, 1, -HES_{-496:16:496'}, 1, -HES_{-496:16:496'}\} * (1+j)/\sqrt{2}$;

$\{-HES_{-496:16:496'}, -1, HES_{-496:16:496'}, -1, HES_{-496:16:496'}\} * (1+j)/\sqrt{2}$;

$\{HES_{-496:16:496'}, 1, -HES_{-496:16:496'}, -1, -HES_{-496:16:496'}\} * (1+j)/\sqrt{2}$;

$\{-HES_{-496:16:496'}, -1, HES_{-496:16:496'}, 1, HES_{-496:16:496'}\} * (1+j)/\sqrt{2}$;

$\{HES_{-496:16:496'}, 1, HES_{-496:16:496'}, 1, -HES_{-496:16:496'}\} * (1+j)/\sqrt{2}$;

$\{-HES_{-496:16:496'}, -1, -HES_{-496:16:496'}, -1, HES_{-496:16:496'}\} * (1+j)/\sqrt{2}$;

$\{HES_{-496:16:496'}, 0, HES_{-496:16:496'}, 1, -HES_{-496:16:496'}\} * (1+j)/\sqrt{2}$; or $\{-HES_{-496:16:496'}, 0, -HES_{-496:16:496'}, -1, HES_{-496:16:496'}\} * (1+)/\sqrt{2}$; where $HES_{-496:16:496'}$ is represented as $\{M, 1, -M, 0, -M, 1, -M\}$, and $M = \{-1, -1, -1, 1, 1, 1, -1, 1, 1, 1, -1, 1, 1, -1, 1\}$.

Based on the foregoing technical solution, the short training sequence or the frequency domain sequence corresponding to a larger channel bandwidth are determined. This may support the receive end to perform automatic gain control on data transmitted over the larger channel bandwidth. The short training sequence may be obtained based on the short training sequence of the existing channel bandwidth, and a short training sequence with comparatively good performance may be obtained through simulation calculation, for example, the parameter adjustment. According to this embodiment of this application, not only a larger actual channel bandwidth can be achieved, but also a 240 MHz short training sequence may be compatible with an 80 MHz short training sequence. In addition, exhaustive simulation is performed on parameters to verify that the short training sequence provided in the embodiment of this application has a comparatively small peak to average power ratio and comparatively good performance. This improves an estimation effect of an automatic gain control circuit at the receive end, and reduces a receive bit error rate.

$HES_{-496:16:496'}$ is represented as $\{M, 1, -M, 0, -M, 1, -M\}$, and correspondingly, $-HES_{-496:16:496'}$ is represented as $\{-M, -1, M, 0, M, -1, M\}$.

Optionally, a period length of the frequency domain sequence of the short training field is 0.8 µs.

With reference to the first aspect or the second aspect, in some implementations, the bandwidth of the target channel is 240 MHz, and the frequency domain sequence of the short training field is any one of the following:

$\{HES_{-504:8:504'}, 0, HES_{-504:8:504'}, 0, -HES_{-504:8:504'}\} * (1+j)/\sqrt{2};$ $\{HES_{-504:8:504'}, 0, -HES_{-504:8:504'}, 0, -HES_{-504:8:504'}\} * (1+j)/\sqrt{2};$ $\{-HES_{-504:8:504'}, 0, HES_{-504:8:504'}, 0, HES_{-504:8:504'}\} * (1+j)/\sqrt{2};$ $\{-HES_{-504:8:504'}, 0, -HES_{-504:8:504'}, 0, HES_{-504:8:504'}\} * (1+j)/\sqrt{2};$ $\{HES_{-504:8:504'}, -1, HES_{-504:8:504'}, 0, -HES_{-504:8:504'}\} * (1+j)/\sqrt{2};$ $\{HES_{-504:8:504'}, 0, -HES_{-504:8:504'}, 1, -HES_{-504:8:504'}\} * (1+j)/\sqrt{2};$ $\{-HES_{-504:8:504'}, 0, HES_{-504:8:504'}, -1, HES_{-504:8:504'}\} * (1+j)/\sqrt{2};$ $\{-HES_{-504:8:504'}, 1, -HES_{-504:8:504'}, 0, HES_{-504:8:504'}\} * (1+j)/\sqrt{2};$ $\{HES_{-504:8:504'}, 1, HES_{-504:8:504'}, 0, -HES_{-504:8:504'}\} * (1+j)/\sqrt{2};$ $\{HES_{-504:8:504'}, 0, -HES_{-504:8:504'}, -1, -HES_{-504:8:504'}\} * (1+j)/\sqrt{2};$ $\{-HES_{-504:8:504'}, 0, HES_{-504:8:504'}, 1, HES_{-504:8:504'}\} * (1+j)/\sqrt{2};$ $\{-HES_{-504:8:504'}, -1, -HES_{-504:8:504'}, 0, HES_{-504:8:504'}\} * (1+j)/\sqrt{2};$ $\{HES_{-504:8:504'}, 0, HES_{-504:8:504'}, -1, -HES_{-504:8:504'}\} * (1+j)/\sqrt{2};$ $\{-HES_{-504:8:504'}, 1, HES_{-504:8:504'}, 0, HES_{-504:8:504'}\} * (1+j)/\sqrt{2};$ $\{-HES_{-504:8:504'}, 0, -HES_{-504:8:504'}, -1, HES_{-504:8:504'}\} * (1+j)/\sqrt{2};$ $\{HES_{-504:8:504'}, -1, HES_{-504:8:504'}, -1, -HES_{-504:8:504'}\} * (1+j)/\sqrt{2};$ $\{HES_{-504:8:504'}, 1, -HES_{-504:8:504'}, 1, -HES_{-504:8:504'}\} * (1+j)/\sqrt{2};$ $\{-HES_{-504:8:504'}, -1, HES_{-504:8:504'}, -1, HES_{-504:8:504'}\} * (1+j)/\sqrt{2};$ or $\{-HES_{-504:8:504'}, 1, -HES_{-504:8:504'}, 1, HES_{-504:8:504'}\} * (1+j)/\sqrt{2};$ where $HES_{-504:8:504'}$ is represented as $\{M, -1, M, -1, -M, -1, M, 0, -M, 1, M, 1, -M, 1, -M\}$, and $M = \{-1, -1, -1, 1, 1, 1, -1, 1, 1, 1, -1, 1, 1, -1, 1\}$.

Based on the foregoing technical solution, a short training sequence corresponding to a larger channel bandwidth are determined. This may support the receive end to perform automatic gain control on data transmitted over the larger channel bandwidth. The short training sequence may be obtained based on the short training sequence of the existing channel bandwidth, and a short training sequence with comparatively good performance may be obtained through simulation calculation, for example, the parameter adjustment. According to this embodiment of this application, not only a larger actual channel bandwidth can be achieved, but also a 240 MHz short training sequence may be compatible with an 80 MHz short training sequence. In addition, exhaustive simulation is performed on parameters to verify that the short training sequence provided in the embodiment of this application has a comparatively small peak to average power ratio and comparatively good performance. This improves an estimation effect of an automatic gain control circuit at the receive end, and reduces a receive bit error rate.

$HES_{-504:8:504}$ is represented as $\{M, -1, M, -1, -M, -1, M, 0, -M, 1, M, 1, -M, 1, -M\}$, and correspondingly, $-HES_{-504:8:504}$ is represented as $\{-M, 1, -M, 1, M, 1, -M, 0, M, -1, -M, -1, M, -1, M\}$.

Optionally, a period length of the frequency domain sequence of the short training field is 1.6 µs.

With reference to the first aspect or the second aspect, in some implementations, the bandwidth of the target channel is 320 MHz, and the frequency domain sequence of the short training field is any one of the following:

$\{HES_{-496:16:496'}, 1, -HES_{-496:16:496'}, 0, -HES_{-496:16:496'}, 0, -HES_{-496:16:496'}\} * (1+j)/\sqrt{2};$ $\{HES_{-496:16:496'}, -1, HES_{-496:16:496'}, 0, HES_{-496:16:496'}, 0, HES_{-496:16:496'}\} * (1+j)/\sqrt{2};$ $\{HES_{-496:16:496'}, 0, -HES_{-496:16:496'}, 0, -HES_{-496:16:496'}, -1, -HES_{-496:16:496'}\} * (1+j)/\sqrt{2};$ $\{-HES_{-496:16:496'}, 0, HES_{-496:16:496'}, 0, HES_{-496:16:496'}, 1, HES_{-496:16:496'}\} * (1+j)/\sqrt{2};$ $\{HES_{-496:16:496'}, 1, -HES_{-496:16:496'}, 0, -HES_{-496:16:496'}, 1, -HES_{-496:16:496'}\} * (1+j)/\sqrt{2};$ $\{-HES_{-496:16:496'}, -1, HES_{-496:16:496'}, 0, HES_{-496:16:496'}, -1, HES_{-496:16:496'}\} * (1+j)/\sqrt{2};$ $\{HES_{-496:16:496'}, 1, -HES_{-496:16:496'}, 0, -HES_{-496:16:496'}, -1, -HES_{-496:16:496'}\} * (1+j)/\sqrt{2};$ $\{-HES_{-496:16:496'},-1,HES_{-496:16:496'},0,$
$HES_{-496:16:496'},1,HES_{-496:16:496'}\}*(1+j)/\sqrt{2};$ $\{HES_{-496:16:496'},0,-HES_{-496:16:496'},0,$
$-HES_{-496:16:496'},0,-HES_{-496:16:496'}\}*(1+j)/\sqrt{2};$
or $\{-HES_{-496:16:496'},0,HES_{-496:16:496'},0,HES_{-496:16:496'},$
$0,HES_{-496:16:496'}\}*(1+j)/\sqrt{2};$ where $HES_{-496:16:496'}$ is represented as $\{M,1,-M,0,-M,1,-M\}$, and $M=\{-1,-1,-1,1,1,1,-1,1,1,1,-1,1,1,-1,1\}$.

Based on the foregoing technical solution, a short training sequence corresponding to a larger channel bandwidth are determined. This may support the receive end to perform automatic gain control on data transmitted over the larger channel bandwidth. The short training sequence may be obtained based on the short training sequence of the existing channel bandwidth, and a short training sequence with comparatively good performance may be obtained through simulation calculation, for example, the parameter adjustment. Then, fast Fourier transform is performed on the short training sequence to obtain a short training field. According to this embodiment of this application, not only a larger actual channel bandwidth can be achieved, but also a 320 MHz short training sequence may be compatible with an 80 MHz short training sequence. In addition, exhaustive simulation is performed on parameters to verify that the short training sequence provided in the embodiment of this application has a comparatively small peak to average power ratio and comparatively good performance. This improves an estimation effect of an automatic gain control circuit at the receive end, and reduces a receive bit error rate.

$HES_{-496:16:496'}$ is represented as $\{M,1,-M,0,-M,1,-M\}$, and correspondingly, $-HES_{-496:16:496'}$ is represented as $\{-M, -1, M, 0, M, -1, M\}$.

Optionally, a period length of the frequency domain sequence of the short training field is 0.8 μs.

With reference to the first aspect or the second aspect, in some implementations, the bandwidth of the target channel is 320 MHz, and the frequency domain sequence of the short training field is any one of the following:

$\{HES_{-496:16:496'},0,HES_{-496:16:496'},0,HES_{-496:16:496'},$
$0,-HES_{-496:16:496'}\}*(1+j)/\sqrt{2};$ or $\{-HES_{-496:16:496'},0,-HES_{-496:16:496'},0,$
$-HES_{-496:16:496'},0,-HES_{-496:16:496'}\}*(1+j)/\sqrt{2};$
where $HES_{-496:16:496'}$ is represented as $\{M,1,-M,0,-M,1,-M\}$, and $M=\{-1,-1,-1,1,1,1,-1,1,1,1,-1,1,1,-1,1\}$.

Based on the foregoing technical solution, a short training sequence corresponding to a larger channel bandwidth are determined. This may support the receive end in performing automatic gain control on data transmitted over the larger channel bandwidth. The short training sequence may be obtained based on the short training sequence of the existing channel bandwidth, and a short training sequence with comparatively good performance may be obtained through simulation calculation, for example, the parameter adjustment. Then, fast Fourier transform is performed on the short training sequence to obtain a short training field. According to this embodiment of this application, not only a larger actual channel bandwidth can be achieved, but also a 320 MHz short training sequence may be compatible with an 80 MHz short training sequence. In addition, exhaustive simulation is performed on parameters to verify that the short training sequence provided in the embodiment of this application has a comparatively small peak to average power ratio and comparatively good performance. This improves an estimation effect of an automatic gain control circuit at the receive end, and reduces a receive bit error rate.

$HES_{-496:16:496'}$ is represented as $\{M,1,-M,0,-M,1,-M\}$, and correspondingly, $-HES_{-496:16:496'}$ is represented as $\{-M, -1, M, 0, M, -1, M\}$.

Optionally, a period length of the frequency domain sequence of the short training field is 0.8 μs.

With reference to the first aspect or the second aspect, in some implementations, the bandwidth of the target channel is 320 MHz, and the frequency domain sequence of the short training field is any one of the following:

$\{HES_{-504:8:504'},1,HES_{-504:8:504'},0,HES_{-504:8:504'},1,$
$-HES_{-504:8:504'}\}*(1+j)/\sqrt{2};$ $\{HES_{-504:8:504'},-1,-HES_{-504:8:504'},0,$
$-HES_{-504:8:504'},-1,-HES_{-504:8:504'}\}*(1+j)/\sqrt{2};$ $\{-HES_{-504:8:504'},1,HES_{-504:8:504'},0,HES_{-504:8:504'},1,$
$HES_{-504:8:504'}\}*(1+j)/\sqrt{2};$ $\{-HES_{-504:8:504'},-1,-HES_{-504:8:504'},0,$
$-HES_{-504:8:504'},-1,HES_{-504:8:504'}\}*(1+j)/\sqrt{2};$ $\{HES_{-504:8:504'},0,HES_{-504:8:504'},0,HES_{-504:8:504'},0,$
$-HES_{-504:8:504'}\}*(1+j)/\sqrt{2};$ $\{HES_{-504:8:504'},0,-HES_{-504:8:504'},0,-HES_{-504:8:504'},$
$0,-HES_{-504:8:504'}\}*(1+j)/\sqrt{2};$ $\{-HES_{-504:8:504'},0,HES_{-504:8:504'},0,HES_{-504:8:504'},0,$
$HES_{-504:8:504'}\}*(1+j)/\sqrt{2};$ $\{-HES_{-504:8:504'},0,-HES_{-504:8:504'},0,-HES_{-504:8:504'},$
$0,HES_{-504:8:504'}\}*(1+j)/\sqrt{2};$ $\{HES_{-504:8:504'},0,HES_{-504:8:504'},0,HES_{-504:8:504'},1,$
$-HES_{-504:8:504'}\}*(1+j)/\sqrt{2};$ $\{HES_{-504:8:504'},-1,-HES_{-504:8:504'},0,-HES_{-504:8:504'},$
$0,-HES_{-504:8:504'}\}*(1+j)/\sqrt{2};$ $\{-HES_{-504:8:504'},1,HES_{-504:8:504'},0,HES_{-504:8:504'},0,$
$HES_{-504:8:504'}\}*(1+j)/\sqrt{2};$ $\{-HES_{-504:8:504'},0,-HES_{-504:8:504'},0,-HES_{-504:8:504'},$
$1,HES_{-504:8:504'}\}*(1+j)/\sqrt{2};$ $\{HES_{-504:8:504'},-1,HES_{-504:8:504'},0,HES_{-504:8:504'},-$
$1,-HES_{-504:8:504'}\}*(1+j)/\sqrt{2};$ $\{HES_{-504:8:504'},1,-HES_{-504:8:504'},0,-HES_{-504:8:504'},$
$1,-HES_{-504:8:504'}\}*(1+j)/\sqrt{2};$ $\{-HES_{-504:8:504'},-1,HES_{-504:8:504'},0,HES_{-504:8:504'},-$
$1,HES_{-504:8:504'}\}*(1+j)/\sqrt{2};$ $\{-HES_{-504:8:504'},1,-HES_{-504:8:504'},0,-HES_{-504:8:504'},$
$1,HES_{-504:8:504'}\}*(1+j)/\sqrt{2};$ $\{HES_{-504:8:504'},-1,HES_{-504:8:504'},0,HES_{-504:8:504'},0,-$
$HES_{-504:8:504'}\}*(1+j)/\sqrt{2};$ $\{HES_{-504:8:504'},0,-HES_{-504:8:504'},0,-HES_{-504:8:504'},$
$1,-HES_{-504:8:504'}\}*(1+j)/\sqrt{2};$ $\{-HES_{-504:8:504'},0,HES_{-504:8:504'},0,HES_{-504:8:504'},-1,$
$HES_{-504:8:504'}\}*(1+j)/\sqrt{2};$ or $\{-HES_{-504:8:504'}, 1, -HES_{-504:8:504'}, 0, -HES_{-504:8:504'}, 0, HES_{-504:8:504'}\} * (1+j)/\sqrt{2}$;

where $HES_{-504:8:504'}$ is represented as $\{M, -1, M, -1, -M, -1, M, 0, -M, 1, M, 1, -M, 1, -M\}$, and $M = \{-1, -1, -1, 1, 1, 1, -1, 1, 1, 1, -1, 1, 1, -1, 1\}$.

Based on the foregoing technical solution, a short training sequence corresponding to a larger channel bandwidth are determined. This may support the receive end to perform automatic gain control on data transmitted over the larger channel bandwidth. The short training sequence may be obtained based on the short training sequence of the existing channel bandwidth, and a short training sequence with comparatively good performance may be obtained through simulation calculation, for example, the parameter adjustment. Then, fast Fourier transform is performed on the short training sequence to obtain a short training field. According to this embodiment of this application, not only a larger actual channel bandwidth can be achieved, but also a 320 MHz short training sequence may be compatible with an 80 MHz short training sequence. In addition, exhaustive simulation is performed on parameters to verify that the short training sequence provided in the embodiment of this application has a comparatively small peak to average power ratio and comparatively good performance. This improves an estimation effect of an automatic gain control circuit at the receive end, and reduces a receive bit error rate.

$HES_{-504:8:504'}$ is represented as $\{M, -1, M, -1, -M, -1, M, 0, -M, 1, M, 1, -M, 1, -M\}$, and correspondingly, $-HES_{-504:8:504'}$ is represented as $\{-M, 1, -M, 1, M, 1, -M, 0, M, -1, -M, -1, M, -1, M\}$.

Optionally, a period length of the frequency domain sequence of the short training field is 1.6 μs.

With reference to the first aspect or the second aspect, in some implementations, the bandwidth of the target channel is 320 MHz, and the frequency domain sequence of the short training field is any one of the following:

$\{HES_{-504:8:504'}, 0, HES_{-504:8:504'}, 0, HES_{-504:8:504'}, 0, -HES_{-504:8:504'}\} * (1+j)/\sqrt{2}$;

$\{HES_{-504:8:504'}, 0, -HES_{-504:8:504'}, 0, -HES_{-504:8:504'}, 0, -HES_{-504:8:504'}\} * (1+j)/\sqrt{2}$;

$\{-HES_{-504:8:504'}, 0, HES_{-504:8:504'}, 0, HES_{-504:8:504'}, 0, HES_{-504:8:504'}\} * (1+j)/\sqrt{2}$; or $\{-HES_{-504:8:504'}, 0, -HES_{-504:8:504'}, 0, -HES_{-504:8:504'}, 0, HES_{-504:8:504'}\} * (1+j)/\sqrt{2}$;

where $HES_{-504:8:504'}$ is represented as $\{M, -1, M, -1, -M, -1, M, 0, -M, 1, M, 1, -M, 1, -M\}$, and $M = \{-1, -1, -1, 1, 1, 1, -1, 1, 1, 1, -1, 1, 1, -1, 1\}$.

Based on the foregoing technical solution, a short training sequence corresponding to a larger channel bandwidth are determined. This may support the receive end to perform automatic gain control on data transmitted over the larger channel bandwidth. The short training sequence may be obtained based on the short training sequence of the existing channel bandwidth, and a short training sequence with comparatively good performance may be obtained through simulation calculation, for example, the parameter adjustment. Then, fast Fourier transform is performed on the short training sequence to obtain a short training field. According to this embodiment of this application, not only a larger actual channel bandwidth can be achieved, but also a 320 MHz short training sequence may be compatible with an 80 MHz short training sequence. In addition, exhaustive simulation is performed on parameters to verify that the short training sequence provided in the embodiment of this application has a comparatively small peak to average power ratio PAPR and comparatively good performance. This improves an estimation effect of an automatic gain control circuit at the receive end, and reduces a receive bit error rate.

$HES_{-504:8:504'}$ is represented as $\{M, -1, M, -1, -M, -1, M, 0, -M, 1, M, 1, -M, 1, -M\}$, and correspondingly, $-HES_{-504:8:504'}$ is represented as $\{-M, 1, -M, 1, M, 1, -M, 0, M, -1, -M, -1, M, -1, M\}$.

Optionally, a period length of the frequency domain sequence of the short training field is 1.6 μs.

According to a third aspect, an apparatus for sending a physical layer protocol data unit is provided. The apparatus is configured to perform the method provided in the first aspect. Specifically, the apparatus may include modules configured to perform any one of the first aspect or the possible implementations of the first aspect.

According to a fourth aspect, an apparatus for receiving a physical layer protocol data unit is provided. The apparatus is configured to perform the method provided in the second aspect. Specifically, the apparatus may include modules configured to perform any one of the second aspect or the possible implementations of the second aspect.

According to a fifth aspect, an apparatus for sending a physical layer protocol data unit is provided. The apparatus includes a processor. The processor is coupled to a memory, and may be configured to execute instructions in the memory, to implement the method according to any one of the first aspect or the possible implementations of the first aspect. Optionally, the apparatus further includes the memory. Optionally, the apparatus further includes a communications interface, and the processor is coupled to the communications interface.

In an implementation, the apparatus is a network device. When the apparatus is the network device, the communications interface may be a transceiver or an input/output interface.

In another implementation, the apparatus is a chip configured in a network device. When the apparatus is the chip configured in the network device, the communications interface may be an input/output interface.

In another implementation, the apparatus is a chip or a chip system.

Optionally, the transceiver may be a transceiver circuit. Optionally, the input/output interface may be an input/output circuit.

According to a sixth aspect, an apparatus for receiving a physical layer protocol data unit is provided. The apparatus includes a processor. The processor is coupled to a memory, and may be configured to execute instructions in the memory, to implement the method according to any one of the second aspect or the possible implementations of the second aspect. Optionally, the apparatus further includes the memory. Optionally, the apparatus further includes a communications interface, and the processor is coupled to the communications interface.

In an implementation, the apparatus is a terminal device. When the apparatus is the terminal device, the communications interface may be a transceiver or an input/output interface.

In another implementation, the apparatus is a chip configured in a terminal device. When the apparatus is the chip configured in the terminal device, the communications interface may be an input/output interface.

In another implementation, the apparatus is a chip or a chip system.

Optionally, the transceiver may be a transceiver circuit. Optionally, the input/output interface may be an input/output circuit.

According to a seventh aspect, a computer-readable storage medium is provided. The computer-readable storage medium stores a computer program, and when the computer program is executed by an apparatus, the apparatus is enabled to implement the method according to any one of the first aspect or the possible implementations of the first aspect.

According to an eighth aspect, a computer-readable storage medium is provided. The computer-readable storage medium stores a computer program, and when the computer program is executed by an apparatus, the apparatus is enabled to implement the method according to any one of the second aspect or the possible implementations of the second aspect.

According to a ninth aspect, a computer program product including instructions is provided, and when the instructions are executed by a computer, an apparatus is enabled to implement the method according to any one of the first aspect or the possible implementations of the first aspect.

According to a tenth aspect, a computer program product including instructions is provided, and when the instructions are executed by a computer, an apparatus is enabled to implement the method according to any one of the second aspect or the possible implementations of the second aspect.

According to an eleventh aspect, a communications system is provided. The system includes the foregoing network device and terminal device.

DESCRIPTION OF EMBODIMENTS

The following describes technical solutions of this application with reference to accompanying drawings.

The technical solutions of embodiments of this application may be applied to various communications systems, such as: a wireless local area network (WLAN) communications system, a global system for mobile communications (GSM), a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunications system (UMTS), a worldwide interoperability for microwave access (WiMAX) communications system, a subsequent 5th generation (5G) system, or a new radio (NR) system.

The following is used as an example for description. Only the WLAN system is used as an example below to describe an application scenario and a method in the embodiments of this application.

Specifically, the embodiments of this application may be applied to a wireless local area network (WLAN), and the embodiments of this application may be applied to any protocol in the institute of electrical and electronics engineers (IEEE) 802.11 μseries protocols currently used in the WLAN. The WLAN may include one or more basic service sets (BSS). A network node in the basic service set includes an access point (AP) and a station (STA).

Specifically, in the embodiments of this application, an initiating device and a responding device may be user stations (STA) in the WLAN. The user station may also be referred to as a system, a subscriber unit, an access terminal, a mobile station, a remote station, a remote terminal, a mobile device, a user terminal, a terminal, a wireless communications device, a user agent, a user apparatus, or user equipment (UE). The STA may be a cellular phone, a cordless phone, a session initiation protocol (SIP) phone, a wireless local loop (WLL) station, a personal digital assistant (PDA), a handheld device having a wireless local area network (for example, Wi-Fi) communications function, a wearable device, a computing device, or another processing device connected to a wireless modem.

In addition, the initiating device and the responding device in the embodiments of this application may alternatively be APs in the WLAN. The AP may be configured to: communicate with an access terminal through the wireless local area network, and transmit data of the access terminal to a network side, or transmit data from a network side to the access terminal.

Figure 1:
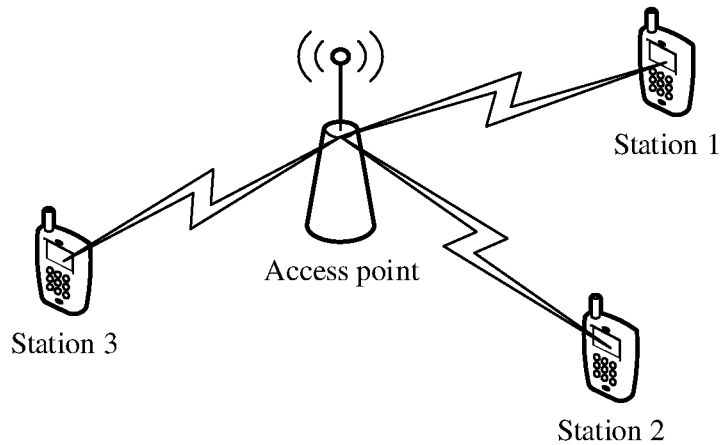
FIG. 1 is an example schematic diagram of a communications system applicable to a method according to an embodiment of this application.

For ease of understanding the embodiments of this application, a communications system shown in FIG. 1 is used as an example to describe in detail a communications system applicable to the embodiments of this application. A scenario system shown in FIG. 1 may be a WLAN system. The WLAN system in FIG. 1 may include one or more APs and one or more STAs. In FIG. 1, one AP and three STAs are used as an example. Wireless communication may be performed between the AP and the STA according to various standards. For example, wireless communication between the AP and the STA may be performed by using a single-user multiple-input multiple-output (SU-MIMO) technology or a multi-user multiple-input multiple-output (MU-MIMO) technology.

Figure 2:
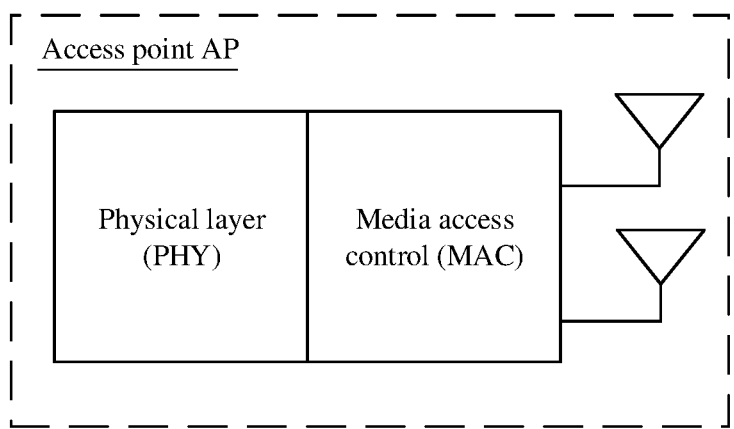
FIG. 2 is an example internal structural diagram of a wireless access point applicable to an embodiment of this application.
Figure 3:
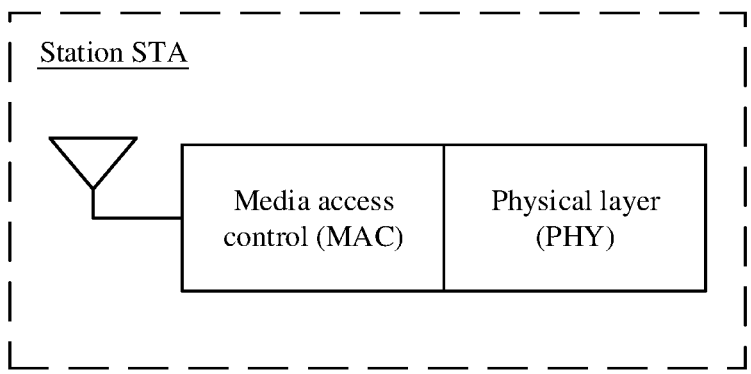
FIG. 3 is an example internal structural diagram of a user station applicable to an embodiment of this application.

The AP is also referred to as a radio access point, a hotspot, or the like. The AP is an access point for a mobile user to access a wired network, and is mainly deployed in homes, buildings, and campuses, or is deployed outdoors. The AP is equivalent to a bridge that connects a wired network and a wireless network. A main function of the AP is to connect wireless network clients together, and then connect the wireless network to the Ethernet. Specifically, the AP may be a terminal device or a network device with a wireless fidelity (Wi-Fi) chip. Optionally, the AP may be a device that supports a plurality of WLAN standards such as 802.11. FIG. 2 shows an internal structural diagram of an AP product. The AP may have a plurality of antennas or may have a single antenna. In FIG. 2, the AP includes a physical layer (PHY) processing circuit and a media access control (MAC) processing circuit. The physical layer processing circuit may be configured to process a physical layer signal, and the MAC layer processing circuit may be configured to process a MAC layer signal. The 802.11 μstandard focuses on a PHY and MAC part, and this embodiment of this application focuses on protocol design on the MAC and the PHY A STA product is usually a terminal product, for example, a mobile phone, a notebook computer, or the like, that supports the 802.11 μseries standards. FIG. 3 shows a structural diagram of a STA with a single antenna. In an actual scenario, the STA may also have a plurality of antennas, and may be a device with more than two antennas. In FIG. 3, the STA may include a physical layer (PHY) processing circuit and a media access control (MAC) processing circuit. The physical layer processing circuit may be configured to process a physical layer signal, and the MAC layer processing circuit may be configured to process a MAC layer signal.

To greatly improve a service transmission rate of a WLAN system, the IEEE 802.11ax standard further uses an orthogonal frequency division multiple access (OFDMA) technology based on an existing orthogonal frequency division multiplexing (OFDM) technology. The OFDMA technology supports a plurality of nodes to simultaneously send and receive data. This achieves multi-station diversity gains.

From 802.11a to 802.11g, 802.11n, 802.11ac, and 802.11ax, available frequency bands include 2.4 GHz and 5 GHz. With increasingly more available frequency bands, a maximum channel bandwidth supported by 802.11 is expanded from 20 MHz to 40 MHz and then to 160 MHz. In 2017, the federal communications commission (FCC) opened up a new unlicensed frequency band of 6 GHz (5925 MHz-7125 MHz). Drafters of the 802.11ax standard expanded an operating range of 802.11ax devices from 2.4 GHz and 5 GHz to 2.4 GHz, 5 GHz and 6 GHz in an 802.11ax project authorization request (PAR). Because available bandwidth of the newly opened 6 GHz frequency band is larger, it can be predicted that a channel bandwidth greater than 160 MHz will be supported in a next-generation standard after 802.11ax.

Figure 4:
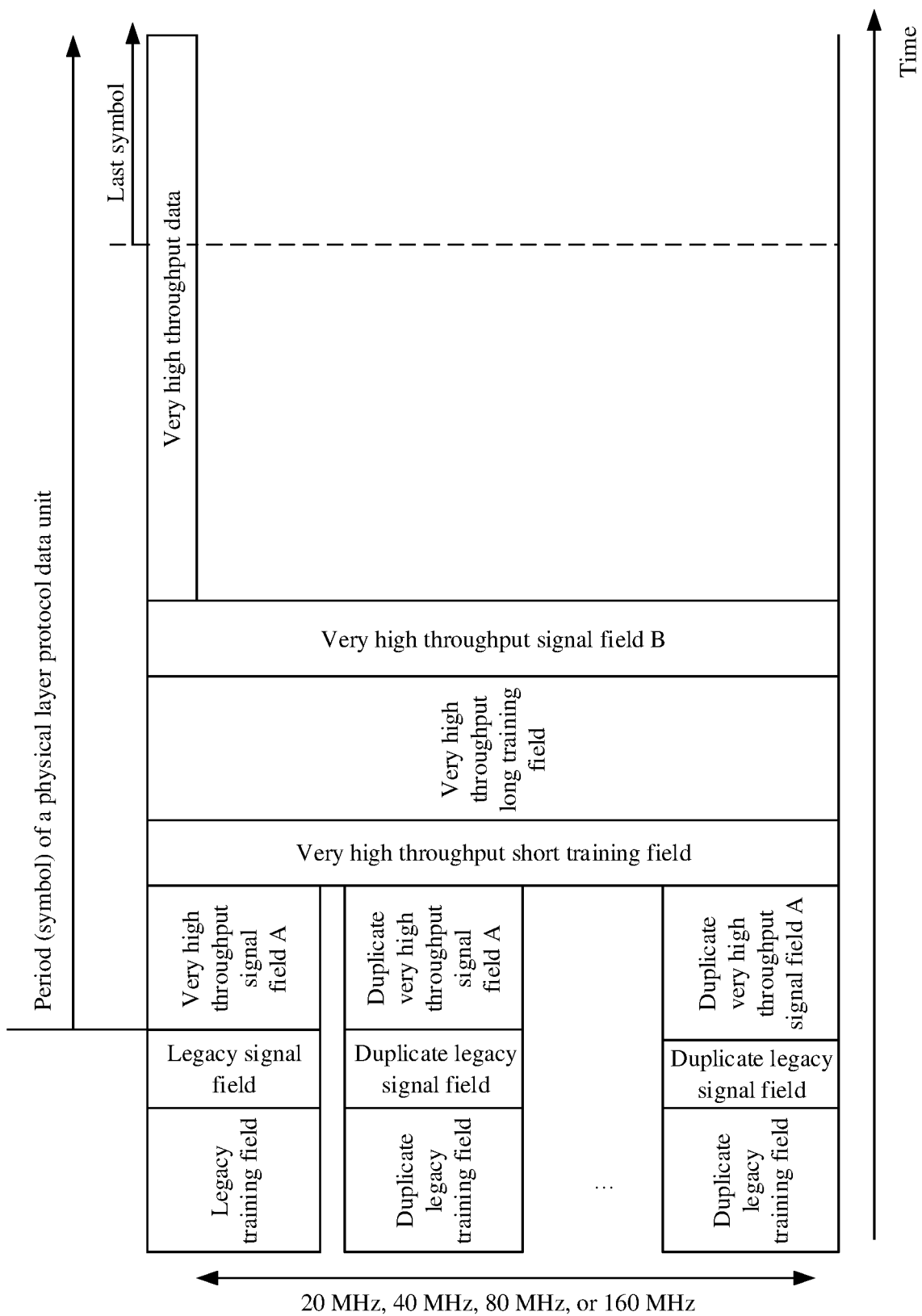
FIG. 4 is a example schematic diagram of an 802.11ac VHT frame structure.

Each generation of mainstream 802.11 protocols is compatible with legacy stations. For example, an 802.11a frame structure of an earliest generation of mainstream Wi-Fi starts with a preamble, and includes a legacy short training field (L-STF), a legacy long training field (L-LTF), and a legacy signal field (L-SIG). To be compatible with a legacy site, a frame structure of subsequent 802.11ax and 802.11ax under development starts with a legacy preamble. Fields after the legacy preamble are a new signal field, a short training field, and a long training field that are newly defined for each generation. The short training field (STF) after the legacy preamble is referred to as an extremely high throughput short training field (EHT-STF) for short, to be distinguished from the L-STF. When transmitting a channel bandwidth greater than 20 MHz, the L-STF replicates and transmits the channel bandwidth on every 20 MHz channel bandwidth, and the EHT-STF introduced after 802.11a is defined as a new sequence for the channel bandwidth greater than 20 MHz. For example, an STF defined in 802.11ac, namely, a very high throughput short training field (VHT-STF) is defined as sequences of 20 MHz, 40 MHz, 80 MHz, and 160 MHz as shown in FIG. 4. FIG. 4 is a schematic diagram of an 802.11ac VHT frame structure. Similarly, a high efficiency-short training field (HE-STF) defined in 802.11ax also supports a maximum channel bandwidth of 160 MHz. As shown in FIG. 4, the figure includes a legacy training field (L-TF), a duplicate legacy training field (Dup L-TF), a legacy signal field (L-SIG), a duplicate legacy signal field (Dup L-SIG), a very high throughput signal field A (VHT-SIG-A), a duplicate very high throughput signal field A (Dup VHT-SIG-A), a very high throughput short training field (VHT-STF), a very high throughput long training field (VHT-LTF), a very high throughput signal field B (VHT-SIG-B), and very high throughput data (VHT Data).

It is specified in the protocol that a time domain waveform of the HE-STF includes five repetition periods, and is mainly used to enhance estimation of automatic gain control (AGC) in multiple-input multiple-output (MIMO) transmission. Therefore, a smaller peak to average power ratio of a sequence is required. As described above, a next-generation protocol of 802.11 is expected to support a channel bandwidth greater than 160 MHz.

Therefore, a new short training sequence needs to be designed for a new channel bandwidth. In view of this, this application proposes a short training sequence design corresponding to a next-generation STF for a new channel bandwidth.

For ease of understanding the embodiments of this application, the following first briefly describes several nouns or terms in this application.

1. Tone

Wireless communications signals have limited bandwidths. A bandwidth may be divided, by using the OFDM technology, into a plurality of frequency components within a channel bandwidth at a specific frequency spacing. These components are referred to as tones.

2. Short Training Sequence

A short training sequence is mainly used for signal detection, automatic gain control (AGC), symbol timing, coarse frequency offset estimation, and the like. Different sequences may be defined for different maximum channel bandwidths. For example, the HE-STF defined in 802.11ax supports the maximum channel bandwidth of 160 MHz. In this application, for differentiation, a short training sequence whose channel bandwidth is greater than 160 MHz is referred to as an EHT-STF in the embodiments of this application. It should be understood that the EHT-STF is used to represent a short training field or a field for short training whose bandwidth is greater than 160 MHz, and a specific name of the short training field constitutes no limitation on the protection scope of the embodiments of this application.

The short training sequence may be constructed based on an M sequence. For example, it can be learned according to the standard 802.11ax that a high efficiency sequence (HES) of the HE-STF is constructed based on the M sequence through multiplexing, phase rotation, and joining. The M sequence is a most basic pseudo-noise sequence (PN sequence) used in a current CDMA system. The M sequence is short for a longest linear feedback shift register sequence. The M sequence is defined as M={−1, −1, −1, 1, 1, 1, −1, 1, 1, 1, −1, 1, 1, −1, 1} in the 802.11ax standard.

It should be understood that when the M sequence defined in a subsequent standard has another form, the M sequence is also applicable to this application.

It should be noted that a specific form of the M sequence constitutes no limitation on the protection scope of the embodiments of this application. For example, the M sequence may also be referred to as a frequency domain sequence.

3. Peak to Average Power Ratio

A peak to average power ratio may be a ratio, in a symbol, of an instantaneous power peak of continuous signals to an average value of signal power. The ratio may be represented as follows:

$$PAPR = 10\log_{10}\left(\frac{\max(X_i^2)}{\text{mean}(X_i^2)}\right).$$

$X_i$ represents time domain discrete values of a group of sequences;

max $(X_i^2)$ indicates a maximum value of squares of the time domain discrete values; and mean $(X_i^2)$ indicates an average value of the squares of the time domain discrete values.

It is specified in the protocol that a time domain waveform of the HE-STF includes five repetition periods, and is mainly used to enhance estimation of AGC in MIMO transmission. Therefore, a smaller PAPR of a sequence is required.

It should be noted that in the embodiments of this application, a "protocol" may be a standard protocol in the communications field, for example, may include an LTE protocol, an NR protocol, a WLAN protocol, and a related protocol applied to a subsequent communications system. This is not limited in this application.

It should be further noted that in the embodiments of this application, "pre-obtained" may include being indicated by a network device by using signaling or being predefined, for example, defined in a protocol. The "predefined" may be implemented in a manner in which corresponding code, a table, or other related indication information may be pre-stored in a device (for example, including a terminal device and a network device). A specific implementation of the "predefinition" is not limited in this application. For example, predefined may mean "defined in a protocol".

It should be further noted that "storing" in the embodiments of this application may refer to storing in one or more memories. The one or more memories may be separately disposed, or may be integrated into an encoder or a decoder, a processor, or a communications apparatus. Alternatively, some of the one or more memories may be separately disposed, and some of the one or more memories are integrated into a decoder, a processor, or a communications apparatus. The memory may be a storage medium in any form. This is not limited in this application.

It should be further noted that in the embodiments of this application, "of (of)", "corresponding (corresponding, relevant)", and "corresponding (corresponding)" are interchangeable sometimes. It should be noted that, when differences between the terms are not emphasized, meanings of the terms are the same.

It should be noted that the term "and/or" describes an association relationship for describing associated objects and represents that at least three relationships may exist. For example, A and/or B may represent the following three cases: Only A exists, both A and B exist, and only B exists. The character "/" generally indicates an "or" relationship between the associated objects. The term "at least one" means one or more. The term "at least one of A and B", similar to the term "A and/or B", describes an association relationship between associated objects and represents that three relationships may exist. For example, at least one of A and B may represent the following three cases: Only A exists, both A and B exist, and only B exists.

The technical solutions provided in this application are described in detail below with reference to the accompanying drawings.

Figure 5:
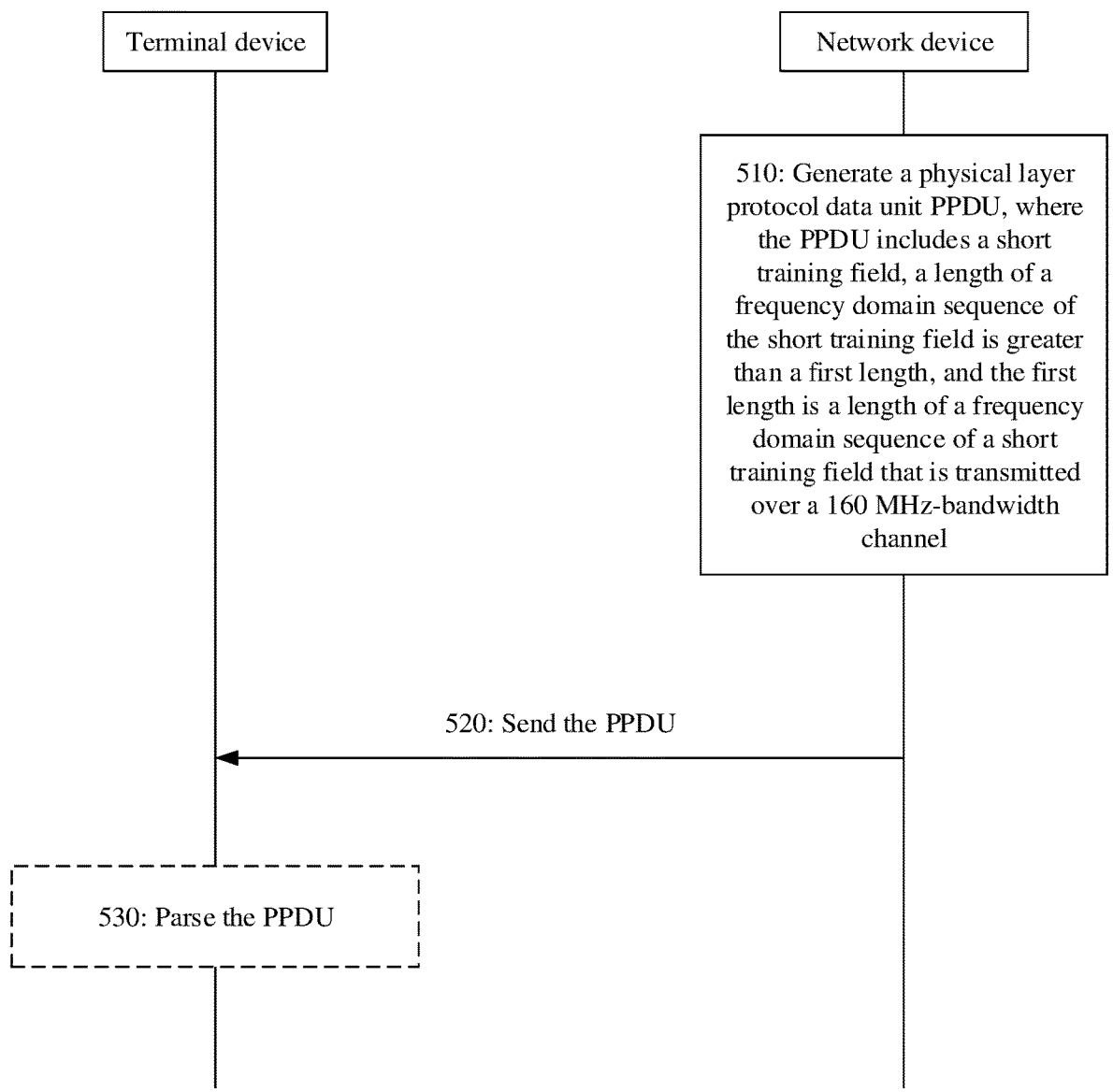
FIG. 5 is a example schematic diagram of a method for sending a physical layer protocol data unit according to an embodiment of this application.

FIG. 5 is a schematic block diagram of a method 500 for sending and receiving a physical layer protocol data unit according to an embodiment of this application. The method 500 shown in FIG. 5 may include the following steps.

510: A network device generates a physical layer protocol data unit PPDU, where the PPDU includes a short training field, a length of a frequency domain sequence of the short training field is greater than a first length, and the first length is a length of a frequency domain sequence of a short training field that is transmitted over a 160 MHz-bandwidth channel.

520: The network device sends the PPDU over a target channel, where a bandwidth of the target channel is greater than 160 MHz.

Correspondingly, a terminal device receives the PPDU over the target channel.

Optionally, the method 500 may further include step 530.

530: The terminal device parses the PPDU.

For a specific parsing manner, refer to a conventional technology as a non-limiting example. This is not limited.

The short training field may also be referred to as a field for short training, and is uniformly referred to as the short training field below.

In this embodiment of this application, to be distinguished from a legacy short training field, a short training field corresponding to the bandwidth of the target channel is represented as an EHT-STF. It should be understood that the EHT-STF is used to indicate a short training field corresponding to a bandwidth greater than 160 MHz, and a specific name of the short training field constitutes no limitation on the protection scope of the embodiments of this application.

The EHT-STF is obtained by using a frequency domain sequence of the EHT-STF. For example, the EHT-STF is obtained by performing IFFT on the frequency domain sequence or a frequency domain value of the EHT-STF. For ease of description in this application, the frequency domain sequence of the EHT-STF is represented as a short training sequence S. It should be understood that the short training sequence S is merely a name, and constitutes no limitation on the protection scope of the embodiments of this application. For example, the short training sequence S may also be referred to as a frequency domain sequence.

In this embodiment of this application, the first length is used to represent a length of a frequency domain sequence corresponding to a bandwidth of 160 MHz. The length of the frequency domain sequence of the short training field is greater than the first length. In other words, a length of the frequency domain sequence of the EHT-STF is greater than a length of a frequency domain sequence of an HE-STF whose channel bandwidth is 160 MHz. For example, the 160 MHz HE-STF may be obtained by joining two 80 MHz HE-STFs multiplied by a rotation factor, a 240 MHz EHT-STF may be obtained by joining three 80 MHz HE-STFs multiplied by the rotation factor, or a 320 MHz EHT-STF may be obtained by joining four 80 MHz HE-STFs multiplied by the rotation factor. Therefore, the length of the frequency domain sequence of the EHT-STF is greater than the length of the frequency domain sequence of the HE-STF whose channel bandwidth is 160 MHz.

The length of the frequency domain sequence of the short training field is greater than the first length, or it may be understood that a quantity of frequency domain values of the EHT-STF is greater than a quantity of frequency domain values of the 160 MHz HE-STF. For example, a bandwidth of 240 MHz has a total of 3072 tones, and the 3072 tones are corresponding to 3072 frequency domain values; and a bandwidth of 160 MHz bandwidth has a total of 1024 tones, and the 1024 tones are corresponding to 1024 frequency domain values. Therefore, the quantity of frequency domain values of the EHT-STF is greater than the quantity of frequency domain values of the 160 MHz HE-STF.

The length of the frequency domain sequence of the short training field is greater than the first length, or it may be understood that a quantity of tone numbers corresponding to the EHT-STF is greater than a quantity of tone numbers corresponding to the 160 MHz HE-STF. For example, a short training sequence corresponding to the 240 MHz EHT-STF may be represented as $S_{-1520:16:1520}$, and a short training sequence corresponding to the 160 MHz HE-STF may be represented as $HES_{-1008:16:1008}$. In this case, it may be learned that the quantity of tone numbers corresponding to the EHT-STF is greater than the quantity of tone numbers corresponding to the 160 MHz HE-STF.

In this embodiment of this application, a length of a sequence indicates a length of elements in the sequence. For example, a sequence 1 is: {0, 1, −1, 1}, and a length of the sequence 1 is 4. For another example, a sequence 2 is: {0, 1, −1, 1, 1, 1, 1}, and a length of the sequence 2 is 7. It can be learned that the length of the sequence 2 is greater than the length of the sequence 1. For another example, it is assumed that the length of the frequency domain sequence corresponding to the 160 MHz HE-STF is 2048. Therefore, the first length is 2048. In other words, the length of the frequency domain sequence of the short training field is greater than 2048.

The bandwidth of the target channel is greater than 160 MHz.

Alternatively, the bandwidth of the target channel may be any bandwidth greater than 160 MHz. For example, the bandwidth of the target channel is 200 MHz, 240 MHz, 280 MHz, or 320 MHz.

The following uses two examples in which the bandwidth of the target channel is 240 MHz and 320 MHz for description.

Example 1: The Bandwidth of the Target Channel is 240 MHz

The EHT-STF may include a plurality of periods, and a time length of each period may be 0.8 μs or 1.6 μs. For brevity, in this embodiment of this application, the time length of each period is denoted as a period length. In this embodiment of this application, two scenarios in which the period length is 0.8 μs and 1.6 μs are used to describe the EHT-STF of the bandwidth of the target channel.

Scenario 1: A Period Length of a Reference Channel is 0.8 μs.

In this embodiment of this application, the period length of the reference channel is a period length of transmitting the frequency domain sequence of the short training field over the reference channel.

In this embodiment of this application, a short training sequence S corresponding to the EHT-STF whose channel bandwidth is 240 MHz may be determined by using at least the following three methods.

The bandwidth of 240 MHz has a total of 1024*3=3072 tones. There are 12 and 11 guard tones on left and right edges respectively, and there are five direct current tones in the middle of the bandwidth. The short training sequence corresponding to the 240 MHz EHT-STF may be represented as $S_{-1520:16:1520}$ or $EHTS_{-1520:16:1520}$. −1520 and 1520 represent subscript numbers of start and end tones, and 16 represents a spacing. −1520:16:1520 indicates tones from a tone whose subscript is −1520 to a tone whose subscript is 1520 at a spacing of 16 tones. A value of the frequency domain sequence on another tone is 0.

$S_{-1520:16:1520}$ is used below to represent the short training sequence corresponding to the EHT-STF whose channel bandwidth is 240 MHz. Optionally, in this case, the period length may be 0.8 μs.

The short training sequence corresponding to the EHT-STF whose channel bandwidth is 240 MHz may be obtained by using any one of the following methods.

Method 1

The short training sequence S corresponding to the EHT-STF whose channel bandwidth is 240 MHz is determined based on a frequency domain sequence HES of the reference channel.

Optionally, a period length of the short training sequence S of the EHT-STF is 0.8 μs.

For the HES, in the standard, 802.11ax defines a value $HES_{a:b:c}$ of the HE-STF in frequency domain, where a and c represent subscript numbers of start and end tones, and b represents a spacing. a:b:c indicates tones from a tone a to a tone c at a spacing of b tones. On another tone, a value of the HES is 0. During transmission, inverse fast Fourier transformation is performed on a frequency domain value, to obtain a time domain waveform.

For example, a bandwidth of the reference channel is 80 MHz. Optionally, the short training sequence S of the EHT-STF whose channel bandwidth is 240 MHz may be represented as follows:

$\{HES_{-496:16:496'}, 1, -HES_{-496:16:496'}, 0,$
$-HES_{-496:16:496'}\}*(1+j)/\sqrt{2};$ $\{-HES_{-496:16:496'}, -1, HES_{-496:16:496'}, 0,$
$HES_{-496:16:496'}\}*(1+j)/\sqrt{2};$ $\{HES_{-496:16:496'}, 1, -HES_{-496:16:496'}, 1,$
$-HES_{-496:16:496'}\}*(1+j)/\sqrt{2};$ $\{-HES_{-496:16:496'}, -1, HES_{-496:16:496'},$
$-1, HES_{-496:16:496'}\}*(1+j)/\sqrt{2};$ $\{HES_{-496:16:496'}, 1, -HES_{-496:16:496'}, -1,$
$-HES_{-496:16:496'}\}*(1+j)/\sqrt{2};$ $\{-HES_{-496:16:496'}, -1, HES_{-496:16:496'}, 1,$
$HES_{-496:16:496'}\}*(1+j)/\sqrt{2};$ $\{HES_{-496:16:496'}, 1, HES_{-496:16:496'}, 1,$
$-HES_{-496:16:496'}\}*(1+j)/\sqrt{2};$ $\{-HES_{-496:16:496'}, -1, -HES_{-496:16:496'}, -1,$
$HES_{-496:16:496'}\}*(1+j)/\sqrt{2};$ $\{HES_{-496:16:496'}, 0, HES_{-496:16:496'}, 1,$
$-HES_{-496:16:496'}\}*(1+j)/\sqrt{2};$ or $\{-HES_{-496:16:496'}, 0, -HES_{-496:16:496'}, -1,$
$HES_{-496:16:496'}\}*(1+j)/\sqrt{2};$ $HES_{-496:16:496'} = HES_{-496:16:496} * \sqrt{2}/(1+j) = \{M, 1, -M, 0, -M, 1, -M\}$, and in other words, $HES_{-496:16:496'}$ is represented as $\{M, 1, -M, 0, -M, 1, -M\}$.

$HES_{-496:16:496}$ is an HES corresponding to 80 MHz and a period length of 0.8 μs, and $HES_{-496:16:496}$ is represented as {M,1,−M,0,−M,1,−M}*(1+j)/√2, where $M=\{-1,-1,-1,1,1,1,1,-1,1,1,1,1,-1,1,1,-1,1\}$.

As described above, the short training sequence corresponding to the 240 MHz EHT-STF may be represented as $S_{-1520:16:1520}$. Therefore, the values given in the foregoing short training sequence are corresponding to values of frequency domain sequences on tones from a tone whose subscript is −1520 to a tone whose subscript is 1520 at a spacing of 16 tones.

It should be understood that the short training sequence S corresponding to the EHT-STF whose channel bandwidth is 240 MHz may be represented in any one of the foregoing plurality of representation manners.

It can be learned from the foregoing that, in method 1, the short training sequence S corresponding to the 240 MHz EHT-STF may be obtained through transformation based on an HES specified in the standard.

Method 2

The short training sequence S corresponding to the EHT-STF whose channel bandwidth is 240 MHz is obtained through transformation based on an M sequence.

Specifically, $HES_{-496:16:496}$, represented as {M,1,−M,0,−M,1,−M} is substituted into the short training sequence S, and the short training sequence S corresponding to the 240 MHz EHT-STF may be represented as follows:

{M,1,−M,0,−M,1,−M,1,−M,−1,M,0,M,−1,M,0,−M,−1,M,0,M,−1,M}*(1+j)/√2;

{−M,−1,M,0,M,−1,M,−1,M,1,−M,0,−M,1,−M,0,M,1,−M,0,−M,1,−M}*(1+j)/√2;

{M,1,−M,0,−M,1,−M,1,−M,−1,M,0,M,−1,M,1,−M,−1,M,0,M,−1,M}*(1+j)/√2;

{−M,−1,M,0,M,−1,M,−1,M,1,−M,0,−M,1,−M,−1,M,1,−M,0,−M,1,−M}*(1+j)/√2;

{M,1,−M,0,−M,1,−M,−1,M,0,M,−1,M,−1,−M,−1,M,0,M,−1,M}*(1+j)/√2;

{−M,−1,M,0,M,−1,M,1,−M,0,−M,1,−M,1,M,1,−M,0,−M,1,−M}*(1+j)/√2;

{M,1,−M,0,−M,1,M,1,−M,0,−M,1,−M,−1,M,0,M,−1,M}*(1+j)/√2;

{−M,−1,M,0,M,−1,−M,−1,M,0,M,−1,M,1,−M,0,−M,1,−M}*(1+j)/√2;

{M,1,−M,0,−M,1,−M,0,M,1,−M,0,−M,1,−M,−1,M,0,M,−1,M}*(1+j)/√2; or

{−M,−1,M,0,M,−1,M,0,−M,−1,M,0,M,−1,M,1,−M,0,−M,1,−M}*(1+j)/√2.

Similarly, as described above, the short training sequence corresponding to the 240 MHz EHT-STF may be represented as $S_{-1520:16:1520}$. Therefore, the values given in the foregoing short training sequence are corresponding to values of frequency domain sequences on tones from atone whose subscript is −1520 to a tone whose subscript is 1520 at a spacing of 16 tones.

It should be noted that the short training sequence S corresponding to the EHT-STF whose channel bandwidth is 240 MHz may be represented in any one of the foregoing plurality of representation manners.

It can be learned from the foregoing that, in method 2, the short training sequence S corresponding to the EHT-STF whose channel bandwidth is 240 MHz may be obtained through transformation based on the M sequence.

Method 3

The short training sequence S corresponding to the EHT-STF in the foregoing method 1 or method 2 is directly cached or stored locally, and when being used, the short training sequence S corresponding to the EHT-STF is directly obtained locally.

It should be understood that the foregoing three methods are merely examples for description, and this application is not limited thereto. Any method for obtaining the short training sequence S of the EHT-STF whose channel bandwidth is 240 MHz falls within the protection scope of the embodiments of this application.

Optionally, in the foregoing three methods, the period length of the short training sequence S of the EHT-STF is 0.8 μs.

The short training sequence S of the EHT-STF whose channel bandwidth is 240 MHz may be obtained through simulation calculation. For example, if method 1 is used, the 240 MHz EHT-STF may be obtained through calculation according to a corresponding formula based on the stored HE-STF. For another example, if method 2 is used, the 240 MHz EHT-STF may be obtained, based on the M sequence that is stored or that is specified in the standard, through calculation according to a corresponding formula. Details are described below.

Specifically, in this embodiment of this application, the short training sequence corresponding to the bandwidth of the target channel may be designed based on a short training sequence of an existing channel bandwidth (namely, an example of the bandwidth of the reference channel). The short training sequence of the bandwidth of the reference channel is referred to as a reference short training sequence for short.

Without loss of generality, the following describes in detail a method for designing the short training sequence S corresponding to the 240 MHz EHT-STF in this embodiment of this application by using an example in which the reference short training field is the HE-STF and a target short training field is the EHT-STF.

A short training sequence HES corresponding to the HE-STF of the bandwidth of the reference channel may be obtained in advance. Alternatively, a short training sequence HES corresponding to an HE-STF of a bandwidth of an existing reference channel specified in the standard is directly used. This is not limited in this embodiment of this application. In this embodiment of this application, a short training sequence of a larger channel bandwidth is designed based on the short training sequence of the existing channel bandwidth.

According to this embodiment of this application, in consideration of backward compatibility, a short training sequence of a larger channel bandwidth, for example, the short training sequence S corresponding to the EHT-STF, is designed based on the short training sequence HES corresponding to the STF of the existing channel bandwidth, for example, the short training sequence HES corresponding to the HE-STF.

For ease of understanding, a design, in 802.11ax, of the short training sequence HES corresponding to the HE-STF is first briefly described.

Figure 6:
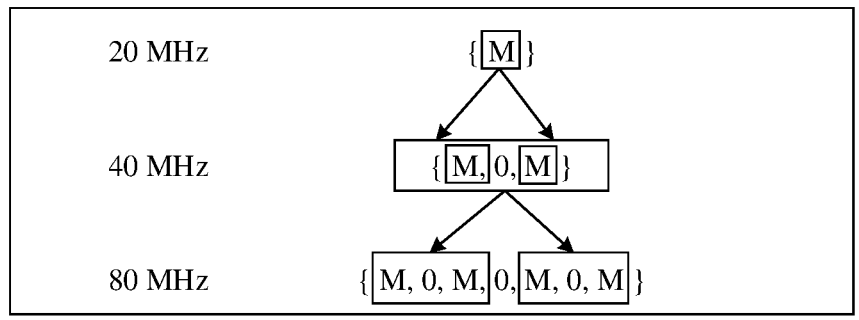
FIG. 6 is an example schematic diagram of constructing an HE-STF by using an M sequence.
Figure 6:
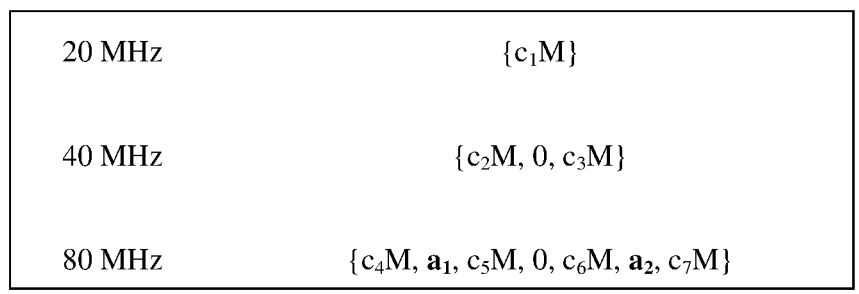

FIG. 6 is a schematic diagram of constructing an HE-STF by using an M sequence. FIG. (1) in FIG. 6 is a repeated structure. Specifically, a 20 MHz HE-STF includes one M sequence. A 40 MHz HE-STF is obtained by joining two 20 MHz HE-STFs (namely, two M sequences). Similarly, an 80

MHz HE-STF is obtained by joining four 20 MHz HE-STFs. To ensure that the HE-STF includes five repetition periods in time domain, and that a PAPR of the HE-STF is minimized, as shown in FIG. (2) in FIG. 6, an additional parameter set and a rotation factor may be used to adjust and optimize the HE-STF. Specifically, the 20 MHz HE-STF includes one M sequence. The 40 MHz HE-STF is obtained by joining two 20 MHz HE-STFs (namely, two M sequences) multiplied by the rotation factor C. Similarly, the 80 MHz HE-STF is obtained by joining four 20 MHz HE-STFs multiplied by the rotation factor. In addition, a parameter value needs to be inserted between every two M sequences, to ensure that the HE-STF includes the five repetition periods in time domain. An exception is that an OFDM modulation mode requires that a direct current tone needs to be 0. Therefore, the PAPR of the HE-STF can be minimized by optimizing A and C. In FIG. (2) in FIG. 6, the rotation factor C includes $\{c_1, c_2, c_3, c_4, \ldots\}$, and the parameter set A includes $\{a_1, a_2, a_3, a_4, \ldots\}$.

As described above, based on different frame structures defined in 802.11ax, 802.11ax defines HE-STFs with two period lengths, which are 0.8 μs and 1.6 μs respectively. In addition, 802.11ax supports a total of four channel bandwidths: 20 MHz, 40 MHz, 80 MHz, and 160 MHz. Each bandwidth and each length are corresponding to one HE-STF. Therefore, there are a total of eight frequency domain values $HES_{a:b:c}$ of the HE-STF.

The following separately describes optimized frequency domain sequences of different channel bandwidths in two cases where the length is 0.8 μs and 1.6 μs.

Case 1: A frequency domain sequence of a 0.8 μs HE-STF.

A 0.8 μs HE-STF whose channel bandwidth is 20 MHz has a total of 256 tones. A subscript range is from −127 to 128. A tone whose subscript is 0 is corresponding to a direct current component, and tones whose subscripts are a negative number and a positive number are corresponding to a frequency component lower than the direct current component and a frequency component higher than the direct current component respectively.

$HES_{-112:16:112}$ may be represented by using the following formula:

$$HES_{-112:16:112} = \{M\} * \sqrt{2}/(1+j).$$ $HES_0 = 0$, and values of frequency domain sequences on other tones are all 0.

$HES_{-112:16:112}$ represents a frequency domain sequence of the 20 MHz HE-STF, and specifically, values of tones that are in frequency domain and whose subscripts are −112, −96, −80, −64, −48, −32, −16, 0, 16, 32, 48, 64, 80, 96, and 112.

The other tones represent other tones with subscripts that are in the subscript range from −127 to 128 and that are other than the tones whose subscripts are −112, −96, −80, −64, −48, −32, −16, 0, 16, 32, 48, 64, 80, 96, and 112.

The foregoing formula is specifically as follows:

$$HES_{-112:16:112} = \{-(1+j)/\sqrt{2}, -(1+j)/\sqrt{2}, -(1+j)/\sqrt{2}, (1+j)/\sqrt{2}, (1+j)/\sqrt{2}, -(1+j)/\sqrt{2}, (1+j)/\sqrt{2}, (1+j)/\sqrt{2}, (1+j)/\sqrt{2}, \sqrt{2}, -(1+j)/\sqrt{2}, (1+j)/\sqrt{2}, (1+j)/\sqrt{2}, -(1+j)/\sqrt{2}, (1+j)/\sqrt{2}\}.$$

Therefore, the values of the tones that are in frequency domain and whose subscripts are −112, −96, −80, −64, −48, −32, −16, 0, 16, 32, 48, 64, 80, 96, and 112 are respectively:

$-(1+j)/\sqrt{2}, -(1+j)/\sqrt{2}, -(1+j)/\sqrt{2}, (1+j)/\sqrt{2}, (1+j)/\sqrt{2}, (1+j)/\sqrt{2}, -(1+j)/\sqrt{2}, (1+j)/\sqrt{2}, (1+j)/\sqrt{2}, (1+j)/\sqrt{2}, (1+j)/\sqrt{2}, \sqrt{2}, -(1+j)/\sqrt{2}, (1+j)/\sqrt{2}, (1+j)/\sqrt{2}, -(1+j)/\sqrt{2}$, and $(1+j)/\sqrt{2}$.

It should be noted that, in this embodiment of this application, a meaning of expression, used in a formula, similar to $HES_{-112:16:112}$ is similar to a meaning of $HES_{-112:16:112}$.

It should be further noted that in this embodiment of this application, in subsequent formula description, if not explicitly noted, values of other tones in frequency domain are all 0.

A 0.8 μs HE-STF whose channel bandwidth is 40 MHz has a total of 512 tones. A subscript range is from −255 to 256. $HES_{-240:16:240}$ may be represented by using the following formula:

$$HES_{-240:16:240} = \{M, 0, -M\} * (1+j)/\sqrt{2}.$$

$HES_{-240:16:240}$ represents a frequency domain sequence of the 40 MHz HE-STF.

A 0.8 μs HE-STF whose channel bandwidth is 80 MHz has a total of 1024 tones. A subscript range is from −511 to 512. $HES_{-496:16:496}$ may be represented by using the following formula:

$$HES_{-496:16:496} = \{M, 1, -M, 0, -M, 1, -M\} * (1+j)/\sqrt{2}.$$

$HES_{-496:16:496}$ represents a frequency domain sequence of the 80 MHz HE-STF.

A 0.8 μs HE-STF whose channel bandwidth is 160 MHz has a total of 2048 tones. A subscript range is from −1023 to 1024. $HES_{-1008:16:1008}$ may be represented by using the following formula:

$$HES_{-1008:16:1008} = \{M, 1, -M, 0, -M, 1, -M, 0, -M, -1, M, 0, -M, 1, -M\} * (1+j)/\sqrt{2}.$$

$HES_{-1008:16:1008}$ represents a frequency domain sequence of the 160 MHz HE-STF.

Case 2: A frequency domain sequence of a 1.6 μs HE-STF.

A 1.6 μs HE-STF whose channel bandwidth is 20 MHz has a total of 256 tones. A subscript range is from −127 to 128. $HES_{-112:8:112}$ may be represented by using the following formula:

$$HES_{-112:8:112} = \{M, 0, -M\} * (1+j)\sqrt{2}.$$ $HES_0 = 0$, and values of other tones in frequency domain are all 0.

This is similar to case 1.

$HES_{-112:8:112}$ represents a frequency domain sequence of the 20 MHz HE-STF, and specifically, values of tones that are in frequency domain and whose subscripts are −112, −104, −96, −88, −80, −72, −64, −56, −48, −40, −32, −24, −16, −8, 0, 8, 16, 24, 32, 40, 48, 56, 64, 72, 80, 88, 96, 104, and 112.

The other tones represent other tones with subscripts that are in the subscript range from −127 to 128 and that are other than the tones whose subscripts are −112, −104, −96, −88, −80, −72, −64, −56, −48, −40, −32, −24, −16, −8, 0, 8, 16, 24, 32, 40, 48, 56, 64, 72, 80, 88, 96, 104, and 112.

The foregoing formula is specifically as follows:

$$HES_{-112:8:112} = \{-(1+j)/\sqrt{2}, -(1+j)/\sqrt{2}, -(1+j)/\sqrt{2}, (1+j)/\sqrt{2}, (1+j)/\sqrt{2}, -(1+j)/\sqrt{2}, (1+j)/\sqrt{2}, (1+j)/\sqrt{2}, -(1+j)/\sqrt{2}, (1+j)/\sqrt{2}, (1+j)/\sqrt{2}, -(1+j)/\sqrt{2}, (1+j)/\sqrt{2}, -(1+j)/\sqrt{2}, (1+j)/\sqrt{2}, -(1+j)/\sqrt{2}, (1+j)/\sqrt{2}, -(1+j)/\sqrt{2}, (1+j)/\sqrt{2}, -(1+j)/\sqrt{2}, (1+j)/\sqrt{2}\}.$$

Therefore, the values of the tones that are in frequency domain and whose subscripts are −112, −104, −96, −88, −80, −72, −64, −56, −48, −40, −32, −24, −16, −8, 0, 8, 16, 24, 32, 40, 48, 56, 64, 72, 80, 88, 96, 104, and 112 are respectively:

−(1+j)/√2,−(1+j)/√2,−(1+j)/√2,(1+j)/√2,(1+j)/√2,(1+j)/
√2,−(1+j)/√2,(1+j)/√2,(1+j)/√2,(1+j)/√2,−(1+j)/
√2,(1+j)/√2,(1+j)/√2,−(1+j)/√2,(1+j)/√2,0,(1+j)/
√2,(1+j)/√2,−(1+j)/√2,−(1+j)/√2,−(1+j)/√2,(1+j)/
√2,−(1+j)/√2,−(1+j)/√2,−(1+j)/√2,(1+j)/√2, −(1+
j)/√2,−(1+j)/√2,(1+j)/√2, and −(1+j)/√2.

It should be noted that, in this embodiment of this application, a meaning of expression, used in a formula, similar to $HES_{-112:8:112}$ is similar to a meaning of $HES_{-112:8:112}$.

It should be further noted that in this embodiment of this application, in subsequent formula description, if not explicitly noted, values of other tones in frequency domain are all 0.

A 1.6 µs HE-STF whose channel bandwidth is 40 MHz has a total of 512 tones. A subscript range is from −255 to 256. $HES_{-248:8:248}$ may be represented by using the following formula:

$HES_{-248:8:248} = \{M,-1,-M,0,M,-1,M\}*(1+j)/\sqrt{2}$,
where $HES_{\pm 248} = 0$.

$HES_{-248:8:248}$ represents a frequency domain sequence of the 40 MHz HE-STF.

A 1.6 µs HE-STF whose channel bandwidth is 80 MHz has a total of 1024 tones. A subscript range is from −511 to 512. $HES_{-504:8:504}$ may be represented by using the following formula:

$HES_{-504:8:504} = \{M,-1,M,-1,-M,-1,M,0,-M,1,M,1,-M,1,-M\}*(1+j)/\sqrt{2}$, where $HES_{\pm 504} = 0$.

$HES_{-504:8:504}$ represents a frequency domain sequence of the 80 MHz HE-STF.

A 1.6 µs HE-STF whose channel bandwidth is 160 MHz has a total of 2048 tones. A subscript range is from −1023 to 1024. $HES_{-1016:8:1016}$ may be represented by using the following formula:

$HES_{-1016:8:1016} = \{M,-1,M,-M,-1,M,0,-M,1,M,1,-M,1,-M,0,-M,1,-M,1,M,1,-M,0,-M,1,M,1,-M,1,-M\}*(1+j)/\sqrt{2}$, where $HES_{\pm 8} = 0$, and $HES_{\pm 1016} = 0$.

$HES_{-1016:8:1016}$ represents a frequency domain sequence of the 160 MHz HE-STF.

In the foregoing formula, a geometric meaning of $(1+j)/\sqrt{2}$ on a complex plane is to rotate a value by 45 degrees counterclockwise and keep energy normalized. Similarly, $-(1+j)/\sqrt{2}$ is to rotate a value by 225 degrees counterclockwise. Therefore, HE-STFs of different channel bandwidths are obtained based on the M sequence, and the optimized PAPR is ensured. Table 1 lists PAPRs for the foregoing eight HE-STFs.

TABLE 1

| PAPR | 20 MHz | 40 MHZ | 80 MHz | 160 MHz |
|---|---|---|---|---|
| 0.8 µs | 1.89 | 4.40 | 4.53 | 5.05 |
| 1.6 µs | 4.40 | 5.22 | 4.79 | 6.34 |

In this embodiment of this application, the rotation factor C and the parameter set A are optimized, and an EHT-STF of a larger channel bandwidth (namely, an example of the bandwidth of the target channel) is designed.

Optionally, the rotation factor C and the parameter set A may be optimized based on the 80 MHz HE-STF, and the 240 MHz EHT-STF may be designed.

Specifically, a 240 MHz-bandwidth channel may be constructed by joining three 80 MHz channels. Before an EHT-STF design that supports the 240 MHz-bandwidth channel is described, a tone plan of the 240 MHz channel is first introduced.

As described above, a tone plan that is of an 80 MHz-bandwidth channel and that is specified in 802.11ax has a total of 1024 tones, and a subscript range is from −511 to 512. There are 12 and 11 guard tones on left and right edges of the bandwidth respectively. There are five direct current tones in the middle of the bandwidth. The tone plan of the 240 MHz-bandwidth channel designed in this application is obtained by directly combining tone plans of three existing 80 MHz channels. In other words, left- and right-edge tones of the three 80 MHz channels and direct current tones in the middle of the bandwidth are reserved. In this way, the bandwidth of 240 MHz has a total of 1024*3=3072 tones. There are 12 and 11 guard tones on the left and right edges respectively, and there are five direct current tones in the middle of the bandwidth.

Therefore, a frequency domain sequence S of the 240 MHz EHT-STF is designed based on a frequency domain sequence HES, defined in 802.11ax, of the 80 MHz HE-STF. As described above, the EHT-STF is obtained by performing IFFT transformation on the frequency domain sequence of the EHT-STF. The EHT-STF may include a plurality of periods, and a time length of each period may be 0.8 µs or 1.6 µs. Therefore, in this embodiment of this application, there may be two period lengths: 0.8 µs and 1.6 µs.

The short training sequence S corresponding to the 240 MHz EHT-STF may be represented as follows:

$S_{-1520:16:1520} = \{c_1*HES_{-496:16:496}, a_1, c_2*HES_{-496:16:496}, a_2, c_3*HES_{-496:16:496}\}*(1+j)/\sqrt{2}$.    Formula 1

Alternatively, the short training sequence S corresponding to the 240 MHz EHT-STF may be represented as follows:

$S_{-1528:8:1528} = \{c_1*HES_{-504:8:504}, a_1, c_2*HES_{-504:8:504}, a_2, c_3*HES_{-504:8:504'}\}*(1+j)/\sqrt{2}$,
where $S_{\pm 1528} = 0$.    Formula 2

A value of $a_i$ is {−1, 0, 1}, and i=1 and 2; and
a value of $c_j$ is {−1, 1}, and j=1, 2, and 3.

$S_{-1520:16:1520}$ indicates a frequency domain sequence of the EHT-STF when the channel bandwidth is 240 MHz. For example, 5-1520:16:1520 may further indicate a frequency domain sequence of the EHT-STF when the channel bandwidth is 240 MHz, and the period length is 0.8 µs.

$S_{-1528:8:1528}$ indicates a frequency domain sequence of the EHT-STF when the channel bandwidth is 240 MHz. For example, 5-1528:8:1528 may further indicate a frequency domain sequence of the EHT-STF when the channel bandwidth is 240 MHz, and the period length is 1.6 µs.

$HES_{-496:16:496}$ is an HES corresponding to the channel bandwidth of 80 MHz and the period length of 0.8 µs. $HES_{-496:16:496}$ is represented as {M,1,−M,0,−M,1,−M}*(1+j)/√2.

$HES_{-496:16:496} = HES_{-496:16:496}*\sqrt{2}/(1+j) = \{M,1,-M,0,-M,1,-M\}$. In other words, $HES_{-496:16:496'}$ is represented as {M,1,−M,0,−M,1,−M}, and correspondingly, $-HES_{-496:16:496'}$ is represented as {−M, −1, M, 0, M, −1, M}.

$HES_{-504:8:504}$ is an HES corresponding to the channel bandwidth of 80 MHz and the period length of 1.6 µs. $HES_{-504:8:504}$ is represented as {M, −1, M, −1, −M, −1, M, 0, −M, 1, M, 1, −M, 1, −M}*(1+j)/√2, where $HES_{\pm504}$=0.

$HES_{-504:8:504'}$=$HES_{-504:8:504}$*√2/(1+j)={M, −1, M, −1, −M, −1, M, 0, −M, 1, M, 1, −M, 1, −M}. In other words, $HES_{-504:8:504'}$ is represented as {M, −1, M, −1, −M, −1, M, 0, −M, 1, M, 1, −M, 1, −M}, and correspondingly, −$HES_{-504:8:504'}$ is represented as {−M, 1, −M, 1, M, 1, −M, 0, M, −1, −M, −1, M, −1, M}.

It should be noted that any variation of the foregoing formula 1 and any variation of the foregoing formula 1 fall within the protection scope of the embodiments of this application.

Therefore, based on the frequency domain sequence $HES_{-496:16:496}$ of the 80 MHz HE-STF, defined in 802.11ax, whose period length is 0.8 µs, a detailed design formula of the short training sequence corresponding to the 240 MHz EHT-STF may be the foregoing formula 1.

Therefore, when the short training sequence corresponding to the 240 MHz EHT-STF is obtained by using method 1, the short training sequence corresponding to the 240 MHz EHT-STF may be obtained based on the stored $HES_{-496:16:496}$ according to the foregoing formula 1. Alternatively, when the short training sequence corresponding to the 240 MHz EHT-STF is obtained by using method 2, the short training sequence corresponding to the 240 MHz EHT-STF may be obtained based on the M sequence according to the foregoing formula 1.

According to the foregoing formula 1, the short training sequence corresponding to the 240 MHz EHT-STF may be obtained. In addition, through simulation calculation, for example, adjusting $a_i$ and $c_j$, a PAPR corresponding to the short training sequence corresponding to the EHT-STF is less than or equal to a preset first threshold, so that a sequence with comparatively good performance can be obtained.

A preset threshold (namely, an example of the preset first threshold) may be set based on a minimum value of the PAPR (for example, a plurality of sets of results listed in Table 2 when the minimum PAPR is used) obtained in an exhaustive process in which exhaustive enumeration is performed on the parameter set A and a parameter set C. Alternatively, the preset threshold may be comprehensively set by combining a property of the sequence and the minimum value that is of the PAPR and that is obtained from exhaustive results. Alternatively, the preset threshold may be comprehensively set by combining a preset parameter and the minimum value that is of the PAPR and that is obtained from exhaustive results. Alternatively, the preset threshold may be pre-specified. Alternatively, the preset threshold may be obtained by performing a plurality of experiments.

Specifically, inverse fast Fourier transformation and 5× oversampling may be performed on S (namely, $S_{-1520:16:1520}$), to obtain a time domain discrete value X of each group of sequences, and then obtain the PAPR through calculation according to the following formula 3:

$$PAPR = 10\log_{10}\left(\frac{\max(X_i^2)}{\mathrm{mean}(X_i^2)}\right)$$

Specifically, after exhaustive retrieval, all possible $S_{-1520:16:1520}$ and corresponding PAPR values may be obtained, and finally, $S_{-1520:16:1520}$ with a minimum PAPR is obtained through comparison. Table 2 µshows $a_i$ and $c_j$ in a plurality of optimal groups of S when the short training sequence S corresponding to the 240 MHz EHT-STF is designed based on the short training sequence corresponding to the 80 MHz HE-STF whose period length is 0.8 µs.

TABLE 2

Parameter set values of the short training sequence S corresponding to the 240 MHz EHT-STF

| Sequence number | $a_1$ | $a_2$ | $c_1$ | $c_2$ | $c_3$ | PAPR (dB) | PAPR (sample (up_sample)) (dB) |
|---|---|---|---|---|---|---|---|
| 1 | 1 | 0 | 1 | −1 | −1 | 5.9468 | 6.6216 |
| 2 | −1 | 0 | −1 | 1 | 1 | 5.9468 | 6.6216 |
| 3 | 1 | 1 | 1 | −1 | −1 | 6.0585 | 6.6265 |
| 4 | −1 | −1 | −1 | 1 | 1 | 6.0585 | 6.6265 |
| 5 | 1 | −1 | 1 | −1 | −1 | 5.9566 | 6.6432 |
| 6 | −1 | 1 | −1 | 1 | 1 | 5.9566 | 6.6432 |
| 7 | 1 | 1 | 1 | 1 | −1 | 5.9236 | 6.6515 |
| 8 | −1 | −1 | −1 | −1 | 1 | 5.9236 | 6.6515 |
| 9 | 0 | 1 | 1 | 1 | −1 | 6.0816 | 6.845 |
| 10 | 0 | −1 | −1 | −1 | 1 | 6.0816 | 6.845 |

Optionally, Table 2 may be used to design the short training sequence S corresponding to the 240 MHz EHT-STF whose period length is 0.8 µs based on the short training sequence corresponding to the 80 MHz HE-STF whose period length is 0.8 µs.

Values of $a_i$ and $c_j$ in the obtained plurality of groups of results are separately used in the foregoing formula, and the obtained short training sequence corresponding to the EHT-STF whose channel bandwidth is 240 MHz may be represented as follows:

{$HES_{-496:16:496'}$,1,−$HES_{-496:16:496'}$,0,
 −$HES_{-496:16:496'}$}*(1+j)√2;

{−$HES_{-496:16:496'}$,−1,$HES_{-496:16:496'}$,0,
 $HES_{-496:16:496'}$}*(1+j)√2;

{$HES_{-496:16:496'}$,1,−$HES_{-496:16:496'}$,1,
 −$HES_{-496:16:496'}$}*(1+j)√2;

{−$HES_{-496:16:496'}$,−1,$HES_{-496:16:496'}$,−1,
 $HES_{-496:16:496'}$}*(1+j)√2;

{$HES_{-496:16:496'}$,1,−$HES_{-496:16:496'}$,−1,
 −$HES_{-496:16:496'}$}*(1+j)√2;

{−$HES_{-496:16:496'}$,−1,$HES_{-496:16:496'}$,1,
 $HES_{-496:16:496'}$}*(1+j)√2;

{$HES_{-496:16:496'}$,1,$HES_{-496:16:496'}$,1,
 −$HES_{-496:16:496'}$}*;

{−$HES_{-496:16:496'}$,−1,−$HES_{-496:16:496'}$,−1,
 $HES_{-496:16:496'}$}*(1+j)√2;

{$HES_{-496:16:496'}$,0,$HES_{-496:16:496'}$,1,
 −$HES_{-496:16:496'}$}*(1+j)√2; or

{−$HES_{-496:16:496'}$,0,−$HES_{-496:16:496'}$,−1,
 $HES_{-496:16:496'}$}*(1+j)√2.

$HES_{-496:16:496'}$ represented as {M,1,−M,0,−M,1,−M} and −$HES_{-496:16:496'}$ represented as {−M, −1, M, 0, M, −1, M} are substituted into the short training sequence. The short training sequence corresponding to the 240 MHz EHT-STF may be obtained.

It should be understood that the short training sequence S corresponding to the EHT-STF whose channel bandwidth is 240 MHz may be represented in any one of the foregoing plurality of representation manners.

It can be learned from the foregoing that the 240 MHz short training sequence is determined by using the sequence related to the short training sequence corresponding to the 80 MHz short training field whose period length is 0.8 μs. Therefore, the 240 MHz short training sequence may be compatible with the 80 MHz short training sequence. In addition, the 240 MHz short training sequence can support automatic gain control on a large channel bandwidth (e.g., a bandwidth greater than 160 MHz). After simulation verification is performed, the PAPRs in Table 2 are compared with the PAPRs (Table 1) in 802.11ax. Peak to average power ratios of these short training sequences are comparatively small, and the automatic gain control on the large channel bandwidth can be supported. In addition, an estimation effect of an automatic gain control circuit at a receive end can be improved, and a receive bit error rate is reduced. Therefore, the PAPR of the short training sequence provided in this solution of this application for the large channel bandwidth can be controlled to a very small value.

Scenario 2: A Period Length of a Reference Channel is 1.6 μs.

Similarly, in this embodiment of this application, a short training sequence S corresponding to the EHT-STF whose channel bandwidth is 240 MHz may be determined by using at least the following three methods.

A bandwidth of 240 MHz has a total of 1024*3=3072 tones. There are 12 and 11 guard tones on left and right edges respectively, and there are five direct current tones in the middle of the bandwidth. In addition, the short training sequence corresponding to the 240 MHz EHT-STF may be represented as $S_{-1528:8:1528}$ or $EHTS_{-1528:8:1528}$. For example, when a period length of the short training sequence S of the short training field is 1.6 μs, −1528 and 1528 represent subscript numbers of start and end tones, and 8 represents a spacing. −1528:8:1528 indicates tones from a tone whose subscript is −1528 to a tone whose subscript is 1528 at a spacing of 8 tones. On another tone, a value of the frequency domain sequence is 0.

$S_{-1528:8:1528}$ is used below to represent the short training sequence corresponding to the EHT-STF whose channel bandwidth is 240 MHz. Optionally, in this case, the period length is 1.6 μs.

The short training sequence corresponding to the EHT-STF whose channel bandwidth is 240 MHz may be obtained by using any one of the following methods.

Method 1

The short training sequence S corresponding to the EHT-STF whose channel bandwidth is 240 MHz is determined based on a frequency domain sequence HES of a bandwidth of the reference channel.

Optionally, the period length of the short training sequence S of the EHT-STF is 1.6 μs.

For example, the bandwidth of the reference channel is 80 MHz. Optionally, the short training sequence corresponding to the EHT-STF whose channel bandwidth is 240 MHz may be represented as follows:

$\{HES_{-504:8:504'}, 0, HES_{-504:8:504'}, 0, -HES_{-504:8:504'}\}*(1+j)\sqrt{2};$ $\{HES_{-504:8:504'}, 0, -HES_{-504:8:504'}, 0, -HES_{-504:8:504'}\}*(1+j)\sqrt{2};$ $\{-HES_{-504:8:504'}, 0, HES_{-504:8:504'}, 0, HES_{-504:8:504'}\}*(1+j)\sqrt{2};$ $\{-HES_{-504:8:504'}, 0, -HES_{-504:8:504'}, 0, HES_{-504:8:504'}\}*(1+j)\sqrt{2};$ $\{HES_{-504:8:504'}, -1, HES_{-504:8:504'}, 0, -HES_{-504:8:504'}\}*(1+j)\sqrt{2};$ $\{HES_{-504:8:504'}, 0, -HES_{-504:8:504'}, 1, -HES_{-504:8:504'}\}*(1+j)\sqrt{2};$ $\{-HES_{-504:8:504'}, 0, HES_{-504:8:504'}, -1, HES_{-504:8:504'}\}*(1+j)\sqrt{2};$ $\{-HES_{-504:8:504'}, 1, -HES_{-504:8:504'}, 0, HES_{-504:8:504'}\}*(1+j)\sqrt{2};$ $\{HES_{-504:8:504'}, 1, HES_{-504:8:504'}, 0, -HES_{-504:8:504'}\}*(1+j)\sqrt{2};$ $\{HES_{-504:8:504'}, 0, -HES_{-504:8:504'}, -1, -HES_{-504:8:504'}\}*(1+j)\sqrt{2};$ $\{-HES_{-504:8:504'}, 0, HES_{-504:8:504'}, 1, HES_{-504:8:504'}\}*(1+j)\sqrt{2};$ $\{-HES_{-504:8:504'}, -1, -HES_{-504:8:504'}, 0, HES_{-504:8:504'}\}*(1+j)\sqrt{2};$ $\{HES_{-504:8:504'}, 0, HES_{-504:8:504'}, 1, -HES_{-504:8:504'}\}*(1+j)\sqrt{2};$ $\{HES_{-504:8:504'}, -1, -HES_{-504:8:504'}, 0, -HES_{-504:8:504'}\}*(1+j)\sqrt{2};$ $\{-HES_{-504:8:504'}, 1, HES_{-504:8:504'}, 0, HES_{-504:8:504'}\}*(1+j)\sqrt{2};$ $\{-HES_{-504:8:504'}, 0, -HES_{-504:8:504'}, -1, HES_{-504:8:504'}\}*(1+j)\sqrt{2};$ $\{HES_{-504:8:504'}, -1, HES_{-504:8:504'}, -1, -HES_{-504:8:504'}\}*(1+j)\sqrt{2};$ $\{HES_{-504:8:504'}, 1, -HES_{-504:8:504'}, 1, -HES_{-504:8:504'}\}*(1+j)\sqrt{2};$ $\{-HES_{-504:8:504'}, -1, HES_{-504:8:504'}, -1, HES_{-504:8:504'}\}*(1+j)\sqrt{2};$ or $\{-HES_{-504:8:504'}, 1, -HES_{-504:8:504'}, 1, HES_{-504:8:504'}\}*(1+j)\sqrt{2};$ $HES_{-504:8:504'} = HES_{-504:8:504}*\sqrt{2}/(1+J) = \{M, -1, M, -1, -M, -1, M, 0, -M, 1, M, 1, -M, 1, -M\}$. In other words, $HES_{-504:8:504'}$ is represented as $\{M, -1, M, -1, -M, -1, M, 0, -M, 1, M, 1, -M, 1, -M\}$.

$HES_{-504:8:504}$ is an HES corresponding to 80 MHz and the period length of 1.6 μs. $HES_{-504:8:504}$ is represented as $\{M, -1, M, -1, -M, -1, M, 0, -M, 1, M, 1, -M, 1, -M\}*(1+j)\sqrt{2}$, where $HES_{\pm 504} = 0$.

As described above, the short training sequence corresponding to the 240 MHz EHT-STF may be represented as $S_{-1528:8:1528}$. Therefore, the values given in the foregoing short training sequence are corresponding to values of frequency domain sequences on tones from a tone whose subscript is −1528 to a tone whose subscript is 1528 at a spacing of 8 tones.

It should be understood that the short training sequence S corresponding to the EHT-STF whose channel bandwidth is 240 MHz may be represented in any one of the foregoing plurality of representation manners.

It can be learned from the foregoing that, in method 1, the short training sequence corresponding to the 240 MHz EHT-STF may be obtained through transformation based on an HES specified in the standard.

Method 2

The short training sequence S corresponding to the EHT-STF whose channel bandwidth is 240 MHz is obtained through transformation based on an M sequence.

Specifically, $HES_{-504:8:504}$ represented as {M, −1, M, −1, −M, −1, M, 0, −M, 1, M, 1, −M, 1, −M} is substituted into the short training sequence S, and the short training sequence S corresponding to the 240 MHz EHT-STF may be represented as follows:

{M,−1,M,−1,−M,−1,M,0,−M,1,M,1,−M,1,−M,0,M,−1,
M,−1,−M,−1,M,0,−M,1,M,1,−M,1,−M,0,−M,1,−
M,1,M,1,−M,0,M,−1,−M,−1,M,−1,M}*(1+j)√2;

{M,−1,M,−1,−M,−1,M,0,−M,1,M,1,−M,1,−M,0,−M,
1,−M,1,M,1,−M,0,M,−1,−M,−1,M,−1,M,0,−M,1,−
M,1,M,1,−M,0,M,−1,−M,−1,M,−1,M}*(1+j)√2;

{−M,1,−M,1,M,1,−M,0,M,−1,−M,−1,M,−1,M,0,M,−1,
M,−1,−M,−1,M,0,−M,1,M,1,−M,1,−M,0,M,−1,
M,−1,−M,−1,M,0,−M,1,M,1,−M,1,−M}*(1+j)√2;

{−M,1,−M,1,M,1,−M,0,M,−1,−M,−1,M,−1,M,0,−M,
1,−M,1,M,1,−M,0,M,−1,−M,−1,M,−1,M,0,M,−1,
M,−1,−M,−1,M,0,−M,1,M,1,−M,1,−M}*(1+j)√2;

{M,−1,M,−1,−M,−1,M,0,−M,1,M,1,−M,1,−M,−1,M,−
1,M,−1,−M,−1,M,0,−M,1,M,1,−M,1,−M,0,−M,1,−
M,1,M,1,−M,0,M,−1,−M,−1,M,−1,M}*(1+j)√2;

{M,−1,M,−1,−M,−1,M,0,−M,1,M,1,−M,1,−M,0,−M,
1,−M,1,M,1,−M,0,M,−1,−M,−1,M,−1,M,1,−M,1,−
M,1,M,1,−M,0,M,−1,−M,−1,M,−1,M}*(1+j)√2;

{−M,1,−M,1,M,1,−M,0,M,−1,−M,−1,M,−1,M,0,M,−1,
M,−1,−M,−1,M,0,−M,1,M,1,−M,1,−M,−1,M,−1,
M,−1,−M,−1,M,0,−M,1,M,1,−M,1,−M}*(1+j)√2;

{−M,1,−M,1,M,1,−M,0,M,−1,−M,−1,M,−1,M,1,−M,
1,−M,1,M,1,−M,0,M,−1,−M,−1,M,−1,M,0,M,−1,
M,−1,−M,−1,M,0,−M,1,M,1,−M,1,−M}*(1+j)√2;

{M,−1,M,−1,−M,−1,M,0,−M,1,M,1,−M,1,−M,1,M,−1,
M,−1,−M,−1,M,0,−M,1,M,1,−M,1,−M,0,−M,1,−
M,1,M,1,−M,0,M,−1,−M,−1,M,−1,M}*(1+j)√2;

{M,−1,M,−1,−M,−1,M,0,−M,1,M,1,−M,1,−M,0,−M,
1,−M,1,M,1,−M,0,M,−1,−M,−1,M,−1,M,−1,−M,
1,−M,1,M,1,−M,0,M,−1,−M,−1,M,−1,M}*(1+j)
√2;

{−M,1,−M,1,M,1,−M,0,M,−1,−M,−1,M,−1,M,0,M,−1,
M,−1,−M,−1,M,0,−M,1,M,1,−M,1,−M,1,M,−1,
M,−1,−M,−1,M,0,−M,1,M,1,−M,1,−M}*(1+j)√2;

{−M,1,−M,1,M,1,−M,0,M,−1,−M,−1,M,−1,−M,
1,−M,1,M,1,−M,0,M,−1,−M,−1,M,−1,M,0,M,−1,
M,−1,−M,−1,M,0,−M,1,M,1,−M,1,−M}*(1+j)√2;

{M,−1,M,−1,−M,−1,M,0,−M,1,M,1,−M,1,−M,0,M,−1,
M,−1,−M,−1,M,0,−M,1,M,1,−M,1,−M,1,−
M,1,M,1,−M,0,M,−1,−M,−1,M,−1,M}*(1+j)√2;

{M,−1,M,−1,−M,−1,M,0,−M,1,M,1,−M,1,−1,−M,
1,−M,1,M,1,−M,0,M,−1,−M,−1,M,−1,M,0,−
M,1,−M,1,M,1,−M,0,M,−1,−M,−1,M,−1,M}*(1+
j)√2;

{−M,1,−M,1,M,1,−M,0,M,−1,−M,−1,M,−1,M,1,M,−
1,M,−1,−M,−1,M,0,−M,1,M,1,−M,1,−M,0,M,−1,
M,−1,−M,−1,M,0,−M,1,M,1,−M,1,−M}*(1+j)
√2;

{M,−1,M,−1,−M,−1,M,0,−M,1,M,1,−M,1,−M,−
1,−M,−1,M,−1,M,0,−M,1,M,1,−M,1,M,1,−
M,1,−M,1,M,0,M,−1,−M,−1,M,−1,−M,−1,M}*(1+j)√2;

{−M,−1,−M,−1,−M,−1,−M,0,−M,−1,−M,−1,−M,−1,−
M,1,−M,1,−M,1,M,1,−M,0,M,−1,M,−1,−M,−1,
M,−M,1,M,1,−M,1,−M,1,M,−1,M,−1,−M,−1,M}*
(1+j)√2;

{−M,1,−M,1,M,1,−M,0,M,−1,−M,−1,M,−1,M,−
1,M,−1,−M,−1,M, 0,−M,1,M,1,−M,1,−M,−1,M,−
1,M,−1,−M,−1,M,0,−M,1,M,1,−M,1,−M}*(1+j)
√2; or

{−M,1,−M,1,M,1,−M,0,M,−1,−M,−1,M,−1,M,1,−M,
1,−M,1,M,1,−M,0,M,−1,−M,−1,M,−1,M,1,M,−1,
M,−1,−M,−1,M,0,−M,1,M,1,−M,1,−M}*(1+j)√2.

As described above, the short training sequence corresponding to the 240 MHz EHT-STF may be represented as $S_{-1528:8:1528}$. Therefore, the values given in the foregoing short training sequence are corresponding to values of frequency domain sequences on tones from a tone whose subscript is −1528 to a tone whose subscript is 1528 at a spacing of 8 tones.

It should be understood that the short training sequence S corresponding to the EHT-STF whose channel bandwidth is 240 MHz may be represented in any one of the foregoing plurality of representation manners.

It can be learned from the foregoing that, in method 2, the short training sequence corresponding to the 240 MHz EHT-STF may be obtained through transformation based on the M sequence.

Method 3

The short training sequence corresponding to the EHT-STF in the foregoing method 1 or method 2 is directly cached or stored locally, and when being used, the short training sequence corresponding to the EHT-STF is directly obtained locally.

It should be understood that the foregoing three methods are merely examples for description, and this application is not limited thereto. Any method for obtaining the short training sequence corresponding to the 240 MHz EHT-STF falls within the protection scope of the embodiments of this application.

Optionally, in the foregoing three methods, the period length of the short training sequence S of the EHT-STF is 1.6 μs.

Similar to scenario 1, the short training sequence corresponding to the 240 MHz EHT-STF may be obtained through simulation calculation. For example, if method 1 is used, the short training sequence corresponding to the 240 MHz EHT-STF may be obtained through calculation according to a corresponding formula based on the stored short training sequence corresponding to the HE-STF. For another example, if method 2 is used, the short training sequence corresponding to the 240 MHz EHT-STF may be obtained, based on the M sequence that is stored or that is specified in the standard, through calculation according to a corresponding formula.

Specifically, the foregoing plurality of groups of sequences may alternatively be designed based on the frequency domain sequence $HES_{-504:8:504}$ of the 80 MHz HE-STF, defined in 802.11ax, whose period length is 1.6 μs. A detailed design formula is the foregoing formula 2, namely:

$S_{-1528:8:1528} = \{c_1 * HES_{-504:8:504}, a_1, c_2 * HES_{-504:8:504}, a_2, c_3 * HES_{-504:8:504}\} * (1+j)\sqrt{2}$, where $S_{\pm 1528} = 0$.

Similarly, a value of $a_i$ is {−1, 0, 1}, and i=1 and 2; and a value of $c_j$ is {−1, 1}, and j=1, 2, and 3.

Similarly, when the short training sequence corresponding to the EHT-STF whose channel bandwidth is 240 MHz is obtained by using method 1, the short training sequence may be obtained based on the stored $HES_{-504:8:504}$ according to the foregoing formula 2. Alternatively, when the short training sequence corresponding to the EHT-STF whose channel bandwidth is 240 MHz is obtained by using method 2, the short training sequence corresponding to EHT-STF whose channel bandwidth is 240 MHz may be obtained based on the M sequence according to the foregoing formula 2.

According to the foregoing formula 2, the short training sequence corresponding to the 240 MHz EHT-STF may be obtained. In addition, through simulation calculation, for example, adjusting $a_i$ and $c_j$, a PAPR corresponding to the short training sequence corresponding to the EHT-STF is less than or equal to a preset second threshold, so that a sequence with comparatively good performance can be obtained.

A preset threshold (namely, an example of the preset second threshold) may be set based on a minimum value of the PAPR (for example, a plurality of sets of results listed in Table 3 when the minimum PAPR is used) obtained in an exhaustive process in which exhaustive enumeration is performed on a parameter set A and a parameter set C. Alternatively, the preset threshold may be comprehensively set by combining a property of the sequence and a minimum value that is of the PAPR and that is obtained from exhaustive results. Alternatively, the preset threshold may be comprehensively set by combining a preset parameter and the minimum value that is of the PAPR and that is obtained from exhaustive results. Alternatively, the preset threshold may be pre-specified. Alternatively, the preset threshold may be obtained by performing a plurality of experiments.

Specifically, after exhaustive retrieval, all possible $S_{-1528:8:1528}$ and corresponding PAPR values may be obtained, and finally, $S_{-1528:8:1528}$ with the minimum PAPR is obtained through comparison. Table 3 μshows $a_i$ and $c_j$ in a plurality of optimal groups of S when the short training sequence corresponding to the 240 MHz and 1.6 μs EHT-STF is designed based on the short training sequence corresponding to the 80 MHz and 1.6 μs HE-STF.

TABLE 3

Parameter set values of the short training sequence S corresponding to the 240 MHZ EHT-STF

| Sequence number | $a_1$ | $a_2$ | $c_1$ | $c_2$ | $c_3$ | PAPR (dB) | PAPR (up_sample) (dB) |
|---|---|---|---|---|---|---|---|
| 1 | 0 | 0 | 1 | 1 | −1 | 7.8257 | 8.8118 |
| 2 | 0 | 0 | 1 | −1 | −1 | 7.8257 | 8.8117 |
| 3 | 0 | 0 | −1 | 1 | 1 | 7.8257 | 8.8117 |
| 4 | 0 | 0 | −1 | −1 | 1 | 7.8257 | 8.8118 |
| 5 | −1 | 0 | 1 | 1 | −1 | 7.9052 | 8.8322 |
| 6 | 0 | 1 | 1 | −1 | −1 | 7.9052 | 8.8321 |
| 7 | 0 | −1 | −1 | 1 | 1 | 7.9052 | 8.8321 |
| 8 | 1 | 0 | −1 | −1 | 1 | 7.9052 | 8.8322 |
| 9 | 1 | 0 | 1 | 1 | −1 | 7.9001 | 8.8348 |
| 10 | 0 | −1 | 1 | −1 | −1 | 7.9001 | 8.8347 |
| 11 | 0 | 1 | −1 | 1 | 1 | 7.9001 | 8.8347 |
| 12 | −1 | 0 | −1 | −1 | 1 | 7.9001 | 8.8348 |
| 13 | 0 | 1 | 1 | 1 | −1 | 7.9242 | 8.8719 |
| 14 | −1 | 0 | 1 | −1 | −1 | 7.9242 | 8.8718 |
| 15 | 1 | 0 | −1 | 1 | 1 | 7.9242 | 8.8718 |
| 16 | 0 | −1 | −1 | −1 | 1 | 7.9242 | 8.8719 |
| 17 | −1 | −1 | 1 | 1 | −1 | 7.8793 | 8.9197 |
| 18 | 1 | 1 | 1 | −1 | −1 | 7.8793 | 8.9196 |
| 19 | −1 | −1 | −1 | 1 | 1 | 7.8793 | 8.9196 |
| 20 | 1 | 1 | −1 | −1 | 1 | 7.8793 | 8.9197 |

Optionally, Table 3 may be used to design the short training sequence S corresponding to the 240 MHz EHT-STF whose period length is 1.6 μs based on the short training sequence corresponding to the 80 MHz HE-STF whose period length is 1.6 μs.

Values of $a_i$ and $c_j$ in the obtained plurality of groups of results are separately used in the foregoing formula 2, and the short training sequence corresponding to the EHT-STF whose channel bandwidth is 240 MHz may be represented as follows:

$\{HES_{-504:8:504'}, 0, HES_{-504:8:504'}, 0, -HES_{-504:8:504'}\} * (1+j)/\sqrt{2}$;

$\{HES_{-504:8:504'}, 0, -HES_{-504:8:504'}, 0, -HES_{-504:8:504'}\} * (1+j)/\sqrt{2}$;

$\{-HES_{-504:8:504'}, 0, HES_{-504:8:504'}, 0, HES_{-504:8:504'}\} * (1+j)/\sqrt{2}$;

$\{-HES_{-504:8:504'}, 0, -HES_{-504:8:504'}, 0, HES_{-504:8:504'}\} * (1+j)/\sqrt{2}$;

$\{HES_{-504:8:504'}, -1, HES_{-504:8:504'}, 0, -HES_{-504:8:504'}\} * (1+j)/\sqrt{2}$;

$\{HES_{-504:8:504'}, 0, -HES_{-504:8:504'}, 1, -HES_{-504:8:504'}\} * (1+j)/\sqrt{2}$;

$\{-HES_{-504:8:504'}, 0, HES_{-504:8:504'}, -1, HES_{-504:8:504'}\} * (1+j)/\sqrt{2}$;

$\{-HES_{-504:8:504'}, 1, -HES_{-504:8:504'}, 0, HES_{-504:8:504'}\} * (1+j)/\sqrt{2}$;

$\{HES_{-504:8:504'}, 1, HES_{-504:8:504'}, 0, -HES_{-504:8:504'}\} * (1+j)/\sqrt{2}$;

$\{HES_{-504:8:504'}, 0, -HES_{-504:8:504'}, -1, -HES_{-504:8:504'}\} * (1+j)/\sqrt{2}$;

$\{-HES_{-504:8:504'}, 0, HES_{-504:8:504'}, 1, HES_{-504:8:504'}\} * (1+j)/\sqrt{2}$;

$\{-HES_{-504:8:504'}, -1, -HES_{-504:8:504'}, 0, HES_{-504:8:504'}\} * (1+j)/\sqrt{2}$;

$\{HES_{-504:8:504'}, 0, HES_{-504:8:504'}, 1, -HES_{-504:8:504'}\} * (1+j)/\sqrt{2}$;

$\{HES_{-504:8:504'}, -1, -HES_{-504:8:504'}, 0, -HES_{-504:8:504'}\} * (1+j)/\sqrt{2}$;

$\{-HES_{-504:8:504'}, 1, HES_{-504:8:504'}, 0, HES_{-504:8:504'}\} * (1+j)/\sqrt{2}$;

$\{-HES_{-504:8:504'}, 0, -HES_{-504:8:504'}, -1, HES_{-504:8:504'}\} * (1+j)/\sqrt{2}$;

$\{HES_{-504:8:504'}, -1, HES_{-504:8:504'}, -1, -HES_{-504:8:504'}\} * (1+j)/\sqrt{2}$;

$\{HES_{-504:8:504'}, 1, -HES_{-504:8:504'}, 1, -HES_{-504:8:504'}\} * (1+j)/\sqrt{2}$;

$\{-HES_{-504:8:504'}, -1, HES_{-504:8:504'}, -1, HES_{-504:8:504'}\} * (1+j)/\sqrt{2}$; or $\{-HES_{-504:8:504'}, 1, -HES_{-504:8:504'}, 1, HES_{-504:8:504'}\} * (1+j)/\sqrt{2}$.

$HES_{-504:8:504'}$ represented as {M, −1, M, −1, −M, −1, M, 0, −M, 1, M, 1, −M, 1, −M} and $-HES_{-504:8:504'}$ represented as {−M, 1, −M, 1, M, 1, −M, 0, M, −1, −M, −1, M, −1, M} are substituted into the short training sequence. The short training sequence corresponding to the 240 MHz EHT-STF may be obtained.

It should be understood that the short training sequence S corresponding to the EHT-STF whose channel bandwidth is 240 MHz may be represented in any one of the foregoing plurality of representation manners.

It can be learned from the foregoing that the 240 MHz short training sequence is determined by using a sequence related to the short training sequence corresponding to the 80 MHz short training field whose period length is 1.6 μs. Therefore, the 240 MHz short training sequence may be compatible with the 80 MHz short training sequence. In addition, the 240 MHz short training sequence can support automatic gain control on a large channel bandwidth (e.g., a bandwidth greater than 160 MHz). After simulation verification is performed, the PAPRs in Table 3 are compared with the PAPRs (Table 1) in 802.11ax. Peak to average power ratios of these short training sequences are comparatively small, and the automatic gain control on the large channel bandwidth can be supported. In addition, an estimation effect of an automatic gain control circuit at a receive end can be improved, and a receive bit error rate is reduced. Therefore, the PAPR of the short training sequence provided in this solution of this application for the large channel bandwidth can be controlled to a very small value.

Example 2: The Bandwidth of the Target Channel is 320 MHz

The following still uses two scenarios where the period length is 0.8 μs and 1.6 μs to describe the short training sequence S corresponding to the EHT-STF whose channel bandwidth is 320 MHz.

Scenario 1: A Period Length of a Reference Channel is 0.8 μs.

When a bandwidth of the target channel is 320 MHz, different representations of the 320 MHz EHT-STF are described with reference to manner A and manner B.

Manner A

The short training sequence S corresponding to the 320 MHz EHT-STF is obtained based on the short training sequence corresponding to the 80 MHz HE-STF whose period length is 0.8 μs.

A bandwidth of 320 MHz has a total of 1024*4=4096 tones. There are 12 and 11 guard tones on left and right edges respectively, and there are 11+12=23 direct current tones in the middle of the bandwidth. The short training sequence may be represented as $S_{-2032:16:2032}$ or $EHTS_{-2032:16:2032}$. For example, when a period length of the short training sequence S of the short training field is 0.8 μs, −2032 and 2032 represent subscript numbers of start and end tones, and 16 represents a spacing. −2032:16:2032 indicates tones from a tone whose subscript is −2032 to a tone whose subscript is 2032 at a spacing of 16 tones. On another tone, a value of the frequency domain sequence is 0.

$S_{-2032:16:2032}$ is used below to represent the short training sequence corresponding to the EHT-STF whose channel bandwidth is 320 MHz. Optionally, in this case, the period length is 0.8 μs.

Similarly, in this embodiment of this application, the short training sequence S corresponding to the EHT-STF whose channel bandwidth is 320 MHz may be determined by using at least the following three methods.

Method 1

The short training sequence S corresponding to the EHT-STF whose channel bandwidth is 320 MHz is determined based on a frequency domain sequence HES of the reference channel.

Optionally, the period length of the short training sequence S of the EHT-STF is 0.8 μs.

Optionally, the short training sequence S corresponding to the EHT-STF whose channel bandwidth is 320 MHz may be represented as follows:

$\{HES_{-496:16:496'},1,-HES_{-496:16:496'},0,$
$-HES_{-496:16:496'},0,-HES_{-496:16:496'}\}*(1+j)\sqrt{2};$ $\{-HES_{-496:16:496'},-1,HES_{-496:16:496'},0,$
$HES_{-496:16:496'},0,HES_{-496:16:496'}\}*(1+j)\sqrt{2};$ $\{HES_{-496:16:496'},0,-HES_{-496:16:496'},0,$
$-HES_{-496:16:496'},-1,-HES_{-496:16:496'}\}*(1+j)\sqrt{2};$ $\{-HES_{-496:16:496'},0,HES_{-496:16:496'},0,HES_{-496:16:496'},$
$1,HES_{-496:16:496'}\}*(1+j)\sqrt{2};$ $\{HES_{-496:16:496'},1,-HES_{-496:16:496'},0,$
$-HES_{-496:16:496'},1,-HES_{-496:16:496'}\}*(1+j)\sqrt{2};$ $\{-HES_{-496:16:496'},-1,HES_{-496:16:496'},0,$
$HES_{-496:16:496'},-1,HES_{-496:16:496'}\}*(1+j)\sqrt{2};$ $\{HES_{-496:16:496'},1,-HES_{-496:16:496'},0,$
$-HES_{-496:16:496'},-1,-HES_{-496:16:496'}\}*(1+j)\sqrt{2};$ $\{-HES_{-496:16:496'},-1,HES_{-496:16:496'},0,HES_{-496:16:496'},1,$
$HES_{-496:16:496'}\}*(1+j)\sqrt{2};$ $\{HES_{-496:16:496'},0,-HES_{-496:16:496'},0,$
$-HES_{-496:16:496'},0,-HES_{-496:16:496'}\}*(1+j)\sqrt{2};$ or $\{-HES_{-496:16:496'},0,HES_{-496:16:496'},0,HES_{-496:16:496'},$
$0,HES_{-496:16:496'}\}*(1+j)\sqrt{2};$ $HES_{-496:16:496'}=HES_{-496:16:496}*\sqrt{2}/(1+j)=\{M,1,-M,0,-M,1,-M\}$, and in other words, $HES_{-496:16:496'}$ is represented as $\{M,1,-M,0,-M,1,-M\}$.

$HES_{-496:16:496}$ is an HES corresponding to the channel bandwidth of 80 MHz and the period length of 0.8 μs. $HES_{-496:16:496}$ is represented as $\{M,1,-M,0,-M,1,-M\}*(1+j)\sqrt{2};$ Therefore, the values given in the foregoing short training sequence are corresponding to values of frequency domain sequences on tones from a tone whose subscript is −2032 to a tone whose subscript is 2032 at a spacing of 16 tones.

It should be understood that the short training sequence S corresponding to the EHT-STF whose channel bandwidth is 320 MHz may be represented in any one of the foregoing plurality of representation manners.

It can be learned from the foregoing that, in method 1, the short training sequence S corresponding to the EHT-STF whose channel bandwidth is 320 MHz may be obtained through transformation based on an HES specified in the standard.

Method 2

The short training sequence S corresponding to the EHT-STF whose channel bandwidth is 320 MHz is obtained through transformation based on an M sequence.

Specifically, $HES_{-496:16:496'}$ represented as $\{M,1,-M,0,-M,1,-M\}$ is substituted into the short training sequence S, and the short training sequence S corresponding to the EHT-STF whose channel bandwidth is 320 MHz may be represented as follows:

$\{M,1,-M,0,-M,1,-M,1,-M,-1,M,0,M,-1,M,0,-M,-1,$
$M,0,M,-1,M,0,-M,-1,M,0,M,-1,M\}*(1+j)\sqrt{2};$ $\{-M,-1,M,0,M,-1,M,-1,M,1,-M,0,-M,1,-M,0,M,1,-$
$M,0,-M,1,-M,0,M,1,-M,0,-M,1,-M\}*(1+j)\sqrt{2};$ $\{M,1,-M,0,-M,1,-M,0,-M,-1,M,0,M,-1,M,0,-M,-1,$
$M,0,M,-1,M,-1, -M,-1,M,0,M,-1,M\}*(1+j)\sqrt{2};$ {−M,−1,M,0,M,−1,M,0,M,1,−M,0,−M,1,−M,0,M,1,−
M,0,−M,1,−M,1,M,1,−M,0,−M,1,−M}*(1+j)√2;

{M,1,−M,0,−M,1,−M,1,−M,−1,M,0,M,−1,M,0,−M,−1,
M,0,M,−1,M,1, −M,−1,M,0,M,−1,M}*(1+j)√2;

{−M,−1,M,0,M,−1,M,−1,M,1,−M,0,−M,1,−M,0,M,1,−
M,0,−M,1,−M, −1,M,1,−M,0,−M,1,−M}*(1+j)√2;

{M,1,−M,0,−M,1,−M,1,−M,−1,M,0,M,−1,M,0,−M,−1,
M,0,M,−1,M,−1, −M,−1,M,0,M,−1,M}*(1+j)√2;

{−M,−1,M,0,M,−1,M,−1,M,1,−M,0,−M,1,−M,0,M,1,−
M,0,−M,1,−M,1,M,1,−M,0,−M,1,−M}*(1+j)√2;

{M,1,−M,0,−M,1,−M,0,−M,−1,M,0,M,−1,M,0,−M,−1,
M,0,M,−1,M,0, −M,−1,M,0,M,−1,M}*(1+j)√2; or

{−M,−1,M,0,M,−1,M,0,M,1,−M,0,−M,1,−M,0,M,1,−
M,0,−M,1,−M,0,M,1,−M,0,−M,1,−M}*(1+j)√2.

Therefore, the values given in the foregoing short training sequence are corresponding to values of frequency domain sequences on tones from a tone whose subscript is −2032 to a tone whose subscript is 2032 at a spacing of 16 tones.

It should be understood that the short training sequence S corresponding to the EHT-STF whose channel bandwidth is 320 MHz may be represented in any one of the foregoing plurality of representation manners.

It can be learned from the foregoing that, in method 2, the short training sequence S corresponding to the 320 MHz EHT-STF may be obtained through transformation based on the M sequence.

Method 3

The short training sequence corresponding to the EHT-STF in the foregoing method 1 or method 2 is directly cached or stored locally, and when being used, the short training sequence corresponding to the EHT-STF is directly obtained locally.

It should be understood that the foregoing three methods are merely examples for description, and this application is not limited thereto. Any method for obtaining the short training sequence corresponding to the 320 MHz EHT-STF falls within the protection scope of the embodiments of this application.

Optionally, in the foregoing three methods, the period length of the short training sequence S of the EHT-STF is 0.8 μs.

The short training sequence corresponding to the EHT-STF whose channel bandwidth is 320 MHz may be obtained through simulation calculation. For example, if method 1 is used, the short training sequence corresponding to the 320 MHz EHT-STF may be obtained through calculation according to a corresponding formula based on the stored frequency domain sequence HES corresponding to the HE-STF. For another example, if method 2 is used, the 320 MHz EHT-STF may be obtained, based on the M sequence that is stored or that is specified in the standard, through calculation according to a corresponding formula.

Specifically, similar to the design of the EHT-STF whose channel bandwidth is 240 MHz, in this solution of this application, for a channel bandwidth of 320 MHz, the EHT-STF whose channel bandwidth is 320 MHz is designed based on the HE-STF whose channel bandwidth is 80 MHz. First, a tone plan that is of a 320 MHz-bandwidth channel is obtained by joining four tone plans that are of an 80 MHz-bandwidth channel. Similar to a 240 MHz channel, left and right guard tones and a middle direct current tone that are of each 80 MHz channel are reserved. In this way, a bandwidth of 320 MHz has a total of 1024*4=4096 tones. There are 12 and 11 guard tones on left and right edges respectively, and there are 11+12=23 direct current tones in the middle of the bandwidth.

Based on the frequency domain sequence $HES_{-496:16:496}$ of the 80 MHz HE-STF, defined in 802.11ax, whose period length is 0.8 μs, a detailed design formula of the short training sequence S corresponding to the 320 MHz EHT-STF is as follows:

$$S_{-2032:16:2032} = \{c_1 * HES_{-496:16:496}, a_1, c_2^* \\ HES_{-496:16:496}, 0, c_3 * HES_{-496:16:496}, a_2, c_4^* \\ HES_{-496:16:496}\} * (1+j)\sqrt{2}. \quad \text{Formula 4}$$

Similarly,
a value of $a_i$ is {−1, 0, 1}, and i=1 and 2; and
a value of $c_j$ is {−1, 1}, and j=1, 2, and 3, 4.

Therefore, when the short training sequence corresponding to the EHT-STF whose channel bandwidth is 320 MHz is obtained by using method 1, the short training sequence corresponding to the EHT-STF whose channel bandwidth is 320 MHz may be obtained based on the stored $HES_{-496:16:496}$ according to the foregoing formula 4. Alternatively, when the short training sequence corresponding to the EHT-STF whose channel bandwidth is 320 MHz is obtained by using method 2, the short training sequence corresponding to EHT-STF whose channel bandwidth is 320 MHz may be obtained based on the M sequence according to the foregoing formula 4.

According to formula 4, the short training sequence corresponding to the EHT-STF whose channel bandwidth is 320 MHz may be obtained. In addition, through simulation calculation, for example, adjusting $a_i$ and $c_j$, a PAPR corresponding to the short training sequence corresponding to the EHT-STF is less than or equal to a preset third threshold, so that a sequence with comparatively good performance can be obtained.

A preset threshold (namely, an example of the preset third threshold) may be set based on a minimum value of the PAPR (for example, a plurality of sets of results listed in Table 4 when the minimum PAPR is used) obtained in an exhaustive process in which exhaustive enumeration is performed on a parameter set A and a parameter set C. Alternatively, the preset threshold may be comprehensively set by combining a property of the sequence and a minimum value that is of the PAPR and that is obtained from exhaustive results. Alternatively, the preset threshold may be comprehensively set by combining a preset parameter and the minimum value that is of the PAPR and that is obtained from exhaustive results. Alternatively, the preset threshold may be pre-specified. Alternatively, the preset threshold may be obtained by performing a plurality of experiments.

Specifically, after exhaustive retrieval, all possible $S_{-2032:16:2032}$ and corresponding PAPR values may be obtained, and finally, $S_{-2032:16:2032}$ with the minimum PAPR is obtained through comparison. Table 4 μshows $a_i$ and $c_j$ in a plurality of optimal groups of S when the short training sequence S corresponding to the 320 MHz EHT-STF is designed based on the frequency domain sequence HES of the 80 MHz HE-STF whose period length is 0.8 μs.

TABLE 4

Parameter set values of the short training sequence S corresponding to the 320 MHZ EHT-STF

| Sequence number | $a_1$ | $a_2$ | $c_1$ | $c_2$ | $c_3$ | $c_4$ | PAPR (dB) | PAPR (dB) |
|---|---|---|---|---|---|---|---|---|
| 1 | 1 | 0 | 1 | −1 | −1 | −1 | 4.6924 | 5.8737 |
| 2 | −1 | 0 | −1 | 1 | 1 | 1 | 4.6924 | 5.8737 |
| 3 | 0 | −1 | 1 | −1 | −1 | −1 | 5.2885 | 5.9779 |
| 4 | 0 | 1 | −1 | 1 | 1 | 1 | 5.2885 | 5.9779 |
| 5 | 1 | 1 | 1 | −1 | −1 | −1 | 4.6781 | 6.0478 |
| 6 | −1 | −1 | −1 | 1 | 1 | 1 | 4.6781 | 6.0478 |
| 7 | 1 | −1 | 1 | −1 | −1 | −1 | 4.9777 | 6.0743 |
| 8 | −1 | 1 | −1 | 1 | 1 | 1 | 4.9777 | 6.0743 |
| 9 | 0 | 0 | 1 | −1 | −1 | −1 | 5.0126 | 6.1671 |
| 10 | 0 | 0 | −1 | 1 | 1 | 1 | 5.0126 | 6.1671 |

Optionally, Table 4 may be used to design the short training sequence S corresponding to the 320 MHz EHT-STF whose period length is 0.8 μs based on the short training sequence corresponding to the 80 MHz HE-STF whose period length is 0.8 μs.

Values of $a_i$ and $c_j$ in the obtained plurality of groups of results are separately used in the foregoing formula 4, and the short training sequence corresponding to the 320 MHz EHT-STF may be represented as follows:

$\{HES_{-496:16:496'}, 1, -HES_{-496:16:496'}, 0, -HES_{-496:16:496'}, 0, -HES_{-496:16:496'}\}*(1+j)\sqrt{2};$ $\{-HES_{-496:16:496'}, -1, HES_{-496:16:496'}, 0, HES_{-496:16:496'}, 0, HES_{-496:16:496'}\}*(1+j)\sqrt{2};$ $\{HES_{-496:16:496'}, 0, -HES_{-496:16:496'}, 0, -HES_{-496:16:496'}, -1, -HES_{-496:16:496'}\}*(1+j)\sqrt{2};$ $\{-HES_{-496:16:496'}, 0, HES_{-496:16:496'}, 0, HES_{-496:16:496'}, 1, HES_{-496:16:496'}\}*(1+j)\sqrt{2};$ $\{HES_{-496:16:496'}, 1, -HES_{-496:16:496'}, 0, -HES_{-496:16:496'}, 1, -HES_{-496:16:496'}\}*(1+j)\sqrt{2};$ $\{-HES_{-496:16:496'}, -1, HES_{-496:16:496'}, 0, HES_{-496:16:496'}, -1, HES_{-496:16:496'}\}*(1+j)\sqrt{2};$ $\{HES_{-496:16:496'}, 1, -HES_{-496:16:496'}, 0, -HES_{-496:16:496'}, -1, -HES_{-496:16:496'}\}*(1+j)\sqrt{2};$ $\{-HES_{-496:16:496'}, -1, HES_{-496:16:496'}, 0, HES_{-496:16:496'}, 1, HES_{-496:16:496'}\}*(1+j)\sqrt{2};$ $\{HES_{-496:16:496'}, 0, -HES_{-496:16:496'}, 0, -HES_{-496:16:496'}, 0, -HES_{-496:16:496'}\}*(1+j)\sqrt{2};$ or $\{-HES_{-496:16:496'}, 0, HES_{-496:16:496'}, 0, HES_{-496:16:496'}, 0, HES_{-496:16:496'}\}*(1+j)\sqrt{2}.$ $HES_{-496:16:496'}$ represented as $\{M,1,-M,0,-M,1,-M\}$ and $-HES_{-496:16:496'}$ represented as $\{-M, -1, M, 0, M, -1, M\}$ are substituted into the short training sequence. The short training sequence corresponding to the EHT-STF whose channel bandwidth is 320 MHz may be obtained.

It should be understood that the short training sequence S corresponding to the EHT-STF whose channel bandwidth is 320 MHz may be represented in any one of the foregoing plurality of representation manners.

It can be learned from the foregoing that the 320 MHz short training sequence is determined by using a sequence related to the short training sequence corresponding to the short training field whose channel bandwidth is 80 MHz and period length is 0.8 μs. Therefore, the 320 MHz short training sequence may be compatible with the 80 MHz short training sequence. In addition, the 320 MHz short training sequence can support automatic gain control on a large channel bandwidth (e.g., a bandwidth greater than 160 MHz). After simulation verification is performed, the PAPRs in Table 4 are compared with the PAPRs (Table 1) in 802.11ax. Peak to average power ratios of these short training sequences are comparatively small, and the automatic gain control on the large channel bandwidth can be supported. In addition, an estimation effect of an automatic gain control circuit at a receive end can be improved, and a receive bit error rate is reduced. Therefore, the PAPR of the short training sequence provided in this solution of this application for the large channel bandwidth can be controlled to a very small value.

Manner B

The short training sequence S corresponding to the EHT-STF whose channel bandwidth is 320 MHz is obtained based on the frequency domain sequence HES of the HE-STF whose period length is 0.8 μs and channel bandwidth is 80 MHz, and values of $a_i$ are all 0.

Similarly, in this embodiment of this application, the short training sequence corresponding to the EHT-STF whose channel bandwidth is 320 MHz may be determined by using at least the following three methods.

Method 1

The short training sequence S corresponding to the EHT-STF whose channel bandwidth is 320 MHz is determined based on a frequency domain sequence HES of a bandwidth of the reference channel.

Optionally, the period length of the short training sequence S of the EHT-STF is 0.8 μs.

Optionally, the short training sequence corresponding to the EHT-STF whose channel bandwidth is 320 MHz may be represented as follows:

$\{HES_{-496:16:496'}, 0, HES_{-496:16:496'}, 0, HES_{-496:16:496'}, 0, -HES_{-496:16:496'}\}*(1+j)\sqrt{2};$ or $\{-HES_{-496:16:496'}, 0, -HES_{-496:16:496'}, 0, -HES_{-496:16:496'}, 0, HES_{-496:16:496'}\}*(1+j)\sqrt{2};$ $HES_{-496:16:496'} = HES_{-496:16:496} * \sqrt{2}/(1+J) = \{M,1,-M,0,-M,1,-M\}$, and in other words, $HES_{-496:16:496'}$ is represented as $\{M,1,-M,0,-M,1,-M\}$.

$HES_{-496:16:496}$ is an HES corresponding to the channel bandwidth of 80 MHz and the period length of 0.8 μs. $HES_{-496:16:496}$ is represented as $\{M,1,-M,0,-M,1,-M\}*(1+j)\sqrt{2}$.

Therefore, the values given in the foregoing short training sequence are corresponding to values of frequency domain sequences on tones from a tone whose subscript is −2032 to a tone whose subscript is 2032 at a spacing of 16 tones.

It should be understood that the short training sequence S corresponding to the EHT-STF whose channel bandwidth is 320 MHz may be represented in any one of the foregoing two representation manners.

It can be learned from the foregoing that, in method 1, the short training sequence corresponding to the EHT-STF whose channel bandwidth is 320 MHz may be obtained through transformation based on an HES specified in the standard.

Method 2

The short training sequence S corresponding to the EHT-STF whose channel bandwidth is 320 MHz is obtained through transformation based on an M sequence.

Specifically, $HES_{-496:16:496'}$ represented as $\{M,1,-M,0,-M,1,-M\}$ is substituted into the short training sequence S, and the short training sequence S corresponding to the EHT-STF whose channel bandwidth is 320 MHz may be represented as follows:

$\{M,1,-M,0,-M,1,-M,0,M,1,-M,0,-M,1,-M,0,M,1,-M,0,-M,1,-M,0,-M,-1,M,0,M,-1,M\}*(1+j)\sqrt{2};$
or $\{-M,-1,M,0,M,-1,M,0,-M,-1,M,0,M,-1,M,0,-M,-1,M,0,M,-1,M,0,M,1,-M,0,-M,1,-M\}*(1+j)\sqrt{2}.$ Therefore, the values given in the foregoing short training sequence are corresponding to values of frequency domain sequences on tones from a tone whose subscript is −2032 to a tone whose subscript is 2032 at a spacing of 16 tones.

It should be understood that the short training sequence S corresponding to the EHT-STF whose channel bandwidth is 320 MHz may be represented in any one of the foregoing two representation manners.

It can be learned from the foregoing that, in method 2, the short training sequence S corresponding to the EHT-STF whose channel bandwidth is 320 MHz may be obtained through transformation based on the M sequence.

Method 3

The short training sequence corresponding to the EHT-STF in the foregoing method 1 or method 2 is directly cached or stored locally, and when being used, the short training sequence corresponding to the EHT-STF is directly obtained locally.

Optionally, in the foregoing three methods, the period length of the short training sequence S of the EHT-STF is 0.8 μs.

It should be understood that the foregoing three methods are merely examples for description, and this application is not limited thereto. Any method for obtaining the short training sequence corresponding to the EHT-STF whose channel bandwidth is 320 MHz falls within the protection scope of the embodiments of this application.

Similar to scenario 1, the short training sequence S corresponding to the EHT-STF whose channel bandwidth is 320 MHz may be obtained through simulation calculation. For example, if method 1 is used, the short training sequence S corresponding to the EHT-STF whose channel bandwidth is 320 MHz may be obtained through calculation according to a corresponding formula based on the stored frequency domain sequence HES corresponding to the HE-STF. For another example, if method 2 is used, the short training sequence S corresponding to the EHT-STF whose channel bandwidth is 320 MHz may be obtained, based on the M sequence that is stored or that is specified in the standard, through calculation according to a corresponding formula.

Specifically, the EHT-STF whose bandwidth is 320 MHz may alternatively be constructed by rotating and joining the HE-STF whose bandwidth is 80 MHz. Specifically, the short training sequence S corresponding to the 320 MHz EHT-STF may be designed based on the frequency domain sequence $HES_{-496:16:496}$ of the 80 MHz HE-STF, defined in 802.11ax, whose period length is 0.8 μs. A detailed design formula of the short training sequence S corresponding to the 320 MHz EHT-STF is as follows:

$S_{-2032:16:2032} = \{c_1*HES_{-496:16:496}, 0, c_2*HES_{-496:16:496}, 0, c_3*HES_{-496:16:496}, 0, c_4*HES_{-496:16:496}\}*(1+j)\sqrt{2}.$   Formula 5

Similarly, a value of $c_j$ is $\{-1, 1\}$, and j=1, 2, and 3, 4.

Therefore, when the short training sequence corresponding to the 320 MHz EHT-STF is obtained by using method 1, the short training sequence corresponding to the 320 MHz EHT-STF may be obtained based on the stored $HES_{-496:16:496}$ according to the foregoing formula 5. Alternatively, when the short training sequence corresponding to the 320 MHz EHT-STF is obtained by using method 2, the short training sequence corresponding to the 320 MHz EHT-STF may be obtained based on the M sequence according to the foregoing formula 5.

According to formula 5, the short training sequence corresponding to the EHT-STF whose channel bandwidth is 320 MHz may be obtained. In addition, through simulation calculation, for example, adjusting $c_j$, a PAPR corresponding to the short training sequence corresponding to the EHT-STF is less than or equal to a preset fourth threshold, so that a sequence with comparatively good performance can be obtained.

A preset threshold (namely, an example of the preset fourth threshold) may be set based on a minimum value of the PAPR (for example, a plurality of sets of results listed in Table 5 when the minimum PAPR is used) obtained in an exhaustive process in which exhaustive enumeration is performed on a parameter set A and a parameter set C. Alternatively, the preset threshold may be comprehensively set by combining a property of the sequence and a minimum value that is of the PAPR and that is obtained from exhaustive results. Alternatively, the preset threshold may be comprehensively set by combining a preset parameter and the minimum value that is of the PAPR and that is obtained from exhaustive results. Alternatively, the preset threshold may be pre-specified. Alternatively, the preset threshold may be obtained by performing a plurality of experiments.

Specifically, after exhaustive retrieval, all possible $S_{-2032:16:2032}$ and corresponding PAPR values may be obtained, and finally, $S_{-2032:16:2032}$ with the minimum PAPR is obtained through comparison. Table 5 μshows $c_j$ in a plurality of optimal groups of S when the short training sequence S corresponding to the 320 MHz EHT-STF is designed based on the frequency domain sequence HES of the 80 MHz HE-STF whose period length is 0.8 μs.

TABLE 5

Parameter set values of the short training sequence S corresponding to the 320 MHz EHT-STF

| Sequence number | $c_1$ | $c_2$ | $c_3$ | $c_4$ | PAPR (dB) | PAPR (up_sample) (dB) |
|---|---|---|---|---|---|---|
| 1 | 1 | 1 | 1 | −1 | 5.0398 | 6.4763 |
| 2 | 1 | 1 | 1 | −1 | 5.0398 | 6.4763 |
| 3 | 1 | 1 | 1 | −1 | 5.0398 | 6.4763 |
| 4 | 1 | 1 | 1 | −1 | 5.0398 | 6.4763 |
| 5 | 1 | 1 | 1 | −1 | 5.0398 | 6.4763 |
| 6 | 1 | 1 | 1 | −1 | 5.0398 | 6.4763 |
| 7 | 1 | 1 | 1 | −1 | 5.0398 | 6.4763 |
| 8 | 1 | 1 | 1 | −1 | 5.0398 | 6.4763 |
| 9 | 1 | 1 | 1 | −1 | 5.0398 | 6.4763 |
| 10 | −1 | −1 | −1 | 1 | 5.0398 | 6.4763 |
| 11 | −1 | −1 | −1 | 1 | 5.0398 | 6.4763 |
| 12 | −1 | −1 | −1 | 1 | 5.0398 | 6.4763 |
| 13 | −1 | −1 | −1 | 1 | 5.0398 | 6.4763 |
| 14 | −1 | −1 | −1 | 1 | 5.0398 | 6.4763 |
| 15 | −1 | −1 | −1 | 1 | 5.0398 | 6.4763 |
| 16 | −1 | −1 | −1 | 1 | 5.0398 | 6.4763 |
| 17 | −1 | −1 | −1 | 1 | 5.0398 | 6.4763 |
| 18 | −1 | −1 | −1 | 1 | 5.0398 | 6.4763 |

Optionally, Table 5 may be used to design the short training sequence S corresponding to the 320 MHz EHT-STF whose period length is 0.8 μs based on the short training sequence corresponding to the 80 MHz HE-STF whose period length is 0.8 μs.

Values of $c_j$ in the obtained plurality of groups of results are separately used in the foregoing formula 5, and the short training sequence corresponding to the EHT-STF whose channel bandwidth is 320 MHz may be represented as follows:

$$\{HES_{-496:16:496'}, 0, HES_{-496:16:496'}, 0, HES_{-496:16:496'}, 0, -HES_{-496:16:496'}\}*(1+j)/\sqrt{2};$$

$$\{HES_{-496:16:496'}, 0, HES_{-496:16:496'}, 0, HES_{-496:16:496'}, 0, -HES_{-496:16:496'}\}*(1+j)/\sqrt{2};$$

$$\{HES_{-496:16:496'}, 0, HES_{-496:16:496'}, 0, HES_{-496:16:496'}, 0, -HES_{-496:16:496'}\}*(1+j)/\sqrt{2};$$

$$\{HES_{-496:16:496'}, 0, HES_{-496:16:496'}, 0, HES_{-496:16:496'}, 0, -HES_{-496:16:496'}\}*(1+j)/\sqrt{2};$$

$$\{HES_{-496:16:496'}, 0, HES_{-496:16:496'}, 0, HES_{-496:16:496'}, 0, -HES_{-496:16:496'}\}*(1+j)/\sqrt{2};$$

$$\{HES_{-496:16:496'}, 0, HES_{-496:16:496'}, 0, HES_{-496:16:496'}, 0, -HES_{-496:16:496'}\}*(1+j)/\sqrt{2};$$

$$\{HES_{-496:16:496'}, 0, HES_{-496:16:496'}, 0, HES_{-496:16:496'}, 0, -HES_{-496:16:496'}\}*(1+j)/\sqrt{2};$$

$$\{HES_{-496:16:496'}, 0, HES_{-496:16:496'}, 0, HES_{-496:16:496'}, 0, -HES_{-496:16:496'}\}*(1+j)/\sqrt{2};$$

$$\{HES_{-496:16:496'}, 0, HES_{-496:16:496'}, 0, HES_{-496:16:496'}, 0, -HES_{-496:16:496'}\}*(1+j)/\sqrt{2};$$

$$\{-HES_{-496:16:496'}, 0, -HES_{-496:16:496'}, 0, -HES_{-496:16:496'}, 0, HES_{-496:16:496'}\}*(1+j)/\sqrt{2};$$

$$\{-HES_{-496:16:496'}, 0, -HES_{-496:16:496'}, 0, -HES_{-496:16:496'}, 0, HES_{-496:16:496'}\}*(1+j)/\sqrt{2};$$

$$\{-HES_{-496:16:496'}, 0, -HES_{-496:16:496'}, 0, -HES_{-496:16:496'}, 0, HES_{-496:16:496'}\}*(1+j)/\sqrt{2};$$

$$\{-HES_{-496:16:496'}, 0, -HES_{-496:16:496'}, 0, -HES_{-496:16:496'}, 0, HES_{-496:16:496'}\}*(1+j)/\sqrt{2};$$

$$\{-HES_{-496:16:496'}, 0, -HES_{-496:16:496'}, 0, -HES_{-496:16:496'}, 0, HES_{-496:16:496'}\}*(1+j)/\sqrt{2};$$

$$\{-HES_{-496:16:496'}, 0, -HES_{-496:16:496'}, 0, -HES_{-496:16:496'}, 0, HES_{-496:16:496'}\}*(1+j)/\sqrt{2};$$

$$\{-HES_{-496:16:496'}, 0, -HES_{-496:16:496'}, 0, -HES_{-496:16:496'}, 0, HES_{-496:16:496'}\}*(1+j)/\sqrt{2};$$

$$\{-HES_{-496:16:496'}, 0, -HES_{-496:16:496'}, 0, -HES_{-496:16:496'}, 0, HES_{-496:16:496'}\}*(1+j)/\sqrt{2}; \text{ or}$$

$$\{-HES_{-496:16:496'}, 0, -HES_{-496:16:496'}, 0, -HES_{-496:16:496'}, 0, HES_{-496:16:496'}\}*(1+j)/\sqrt{2};$$

$HES_{-496:16:496'}$ represented as $\{M, 1, -M, 0, -M, 1, -M\}$ and $-HES_{-496:16:496'}$ represented as $\{-M, -1, M, 0, M, -1, M\}$ are substituted into the short training sequence. The short training sequence corresponding to the EHT-STF whose channel bandwidth is 320 MHz may be obtained.

It should be understood that the short training sequence S corresponding to the EHT-STF whose channel bandwidth is 320 MHz may be represented in any one of the foregoing plurality of representation manners.

It can be learned from the foregoing that the 320 MHz short training sequence is determined by using a sequence related to the short training sequence corresponding to the 80 MHz short training field whose period length is 0.8 μs. Therefore, the 320 MHz short training sequence may be compatible with the 80 MHz short training sequence. In addition, the 320 MHz short training sequence can support automatic gain control on a large channel bandwidth (e.g., a bandwidth greater than 160 MHz). After simulation verification is performed, the PAPRs in Table 5 are compared with the PAPRs (Table 1) in 802.11ax. Peak to average power ratios of these short training sequences are comparatively small, and the automatic gain control on the large channel bandwidth can be supported. In addition, an estimation effect of an automatic gain control circuit at a receive end can be improved, and a receive bit error rate is reduced. Therefore, the PAPR of the short training sequence provided in this solution of this application for the large channel bandwidth can be controlled to a very small value.

Scenario 2: A Period Length is 1.6 μs.

When the period length is 1.6 μs and a bandwidth of the target channel is 320 MHz, different representations of the 320 MHz EHT-STF are described with reference to manner A and manner B.

Manner A

The short training sequence S corresponding to the 320 MHz EHT-STF is obtained based on the frequency domain sequence HES whose period length is 1.6 μs and channel bandwidth is 80 MHz.

A bandwidth of 320 MHz has a total of 1024*4=4096 tones. There are 12 and 11 guard tones on left and right edges respectively, and there are 11+12=23 direct current tones in the middle of the bandwidth. The short training sequence may be represented as $S_{-2024:8:2024}$ or $EHTS_{-2024:8:2024}$. For example, when a period length of the short training sequence S of the short training field is 1.6 μs, −2024 and 2024 represent subscript numbers of start and end tones, and 8 represents a spacing. −2024:8:2024 indicates tones from a tone whose subscript is −2024 to a tone whose subscript is 2024 at a spacing of 8 tones. On another tone, a value of the frequency domain sequence is 0.

$S_{-2024:8:2024}$ is used below to represent the short training sequence corresponding to the EHT-STF whose channel bandwidth is 320 MHz. Optionally, in this case, the period length is 1.6 μs.

Similarly, in this embodiment of this application, the short training sequence S corresponding to the EHT-STF whose channel bandwidth is 320 MHz may be determined by using at least the following three methods.

Method 1

The short training sequence S corresponding to the EHT-STF whose channel bandwidth is 320 MHz is determined based on a frequency domain sequence HES of a bandwidth of the reference channel.

Optionally, the period length of the short training sequence S of the EHT-STF is 1.6 μs.

Optionally, the short training sequence S corresponding to the EHT-STF whose channel bandwidth is 320 MHz may be represented as follows:

$$\{HES_{-504:8:504'}, 1, HES_{-504:8:504'}, 0, HES_{-504:8:504'}, 1, -HES_{-504:8:504'}\}*(1+j)/\sqrt{2};$$

$$\{HES_{-504:8:504'}, -1, -HES_{-504:8:504'}, 0, -HES_{-504:8:504'}, -1, -HES_{-504:8:504'}\}*(1+j)/\sqrt{2};$$

$$\{-HES_{-504:8:504'}, 1, HES_{-504:8:504'}, 0, HES_{-504:8:504'}, 1, HES_{-504:8:504'}\}*(1+j)/\sqrt{2};$$

$$\{-HES_{-504:8:504'}, 1, HES_{-504:8:504'}, 0, HES_{-504:8:504'}, 1, HES_{-504:8:504'}\}*(1+j)/\sqrt{2};$$

$$\{-HES_{-504:8:504'}, 0, HES_{-504:8:504'}, 0, HES_{-504:8:504'}, 0, -HES_{-504:8:504'}\}*(1+j)/\sqrt{2};$$

$\{HES_{-504:8:504'},0,HES_{-504:8:504'},0,HES_{-504:8:504'},0,-HES_{-504:8:504'}\}*(1+j)\sqrt{2};$ $\{-HES_{-504:8:504'},0,HES_{-504:8:504'},0,HES_{-504:8:504'},0,HES_{-504:8:504'}\}*(1+j)\sqrt{2};$ $\{-HES_{-504:8:504'},0,HES_{-504:8:504'},0,HES_{-504:8:504'},0,HES_{-504:8:504'}\}*(1+j)\sqrt{2};$ $\{HES_{-504:8:504'},0,HES_{-504:8:504'},0,HES_{-504:8:504'},1,-HES_{-504:8:504'}\}*(1+j)\sqrt{2};$ $\{HES_{-504:8:504'},1,-HES_{-504:8:504'},0,-HES_{-504:8:504'},0,HES_{-504:8:504'}\}*(1+j)\sqrt{2};$ $\{-HES_{-504:8:504'},1,HES_{-504:8:504'},0,HES_{-504:8:504'},0,HES_{-504:8:504'}\}*(1+j)\sqrt{2};$ $\{HES_{-504:8:504'},0,-HES_{-504:8:504'},0,-HES_{-504:8:504'},1,HES_{-504:8:504'}\}*(1+j)\sqrt{2};$ $\{HES_{-504:8:504'},-1,HES_{-504:8:504'},0,HES_{-504:8:504'},1,HES_{-504:8:504'}\}*(1+j)\sqrt{2};$ $\{HES_{-504:8:504'},1,-HES_{-504:8:504'},0,-HES_{-504:8:504'},1,HES_{-504:8:504'}\}*(1+j)\sqrt{2};$ $\{HES_{-504:8:504'},-1,HES_{-504:8:504'},0,HES_{-504:8:504'},-1,HES_{-504:8:504'}\}*(1+j)\sqrt{2};$ $\{HES_{-504:8:504'},1,-HES_{-504:8:504'},0,-HES_{-504:8:504'},1,HES_{-504:8:504'}\}*(1+j)\sqrt{2};$ $\{HES_{-504:8:504'},-1,HES_{-504:8:504'},0,HES_{-504:8:504'},0,-HES_{-504:8:504'}\}*(1+j)\sqrt{2};$ $\{HES_{-504:8:504'},0,-HES_{-504:8:504'},0,-HES_{-504:8:504'},1,-HES_{-504:8:504'}\}*(1+j)\sqrt{2};$ $\{-HES_{-504:8:504'},0,HES_{-504:8:504'},0,HES_{-504:8:504'},-1,HES_{-504:8:504'}\}*(1+j)\sqrt{2};$ or $\{-HES_{-504:8:504'},1,-HES_{-504:8:504'},0,-HES_{-504:8:504'},0,HES_{-504:8:504'}\}*(1+j)\sqrt{2};$ $HES_{-504:8:504'} = HES_{-504:8:504}*\sqrt{2}/(+J) = \{M, -1, M, -1, -M, -1, M, 0, -M, 1, M, 1, -M, 1, -M\}$. In other words, $HES_{-504:8:504'}$ is represented as $\{M, -1, M, -1, -M, -1, M, 0, -M, 1, M, 1, -M, 1, -M\}$.

$HES_{-504:8:504}$ is an HES corresponding to 80 MHz and the period length of 1.6 μs. $HES_{-504:8:504}$ is represented as $\{M, -1, M, -1, -M, -1, M, 0, -M, 1, M, 1, -M, 1, -M\}*(1+j)/\sqrt{2}$, where $HES_{\pm 504} = 0$.

Therefore, the values given in the foregoing short training sequence are corresponding to values of frequency domain sequences on tones from a tone whose subscript is −2024 to a tone whose subscript is 2024 at a spacing of 8 tones.

It should be understood that the short training sequence S corresponding to the EHT-STF whose channel bandwidth is 320 MHz may be represented in any one of the foregoing plurality of representation manners.

It can be learned from the foregoing that, in method 1, the short training sequence S corresponding to the EHT-STF whose channel bandwidth is 320 MHz may be obtained through transformation based on an HES specified in the standard.

Method 2

The short training sequence S corresponding to the EHT-STF whose channel bandwidth is 320 MHz is obtained through transformation based on an M sequence.

Specifically, $HES_{-504:8:504'}$ represented as $\{M, -1, M, -1, -M, -1, M, 0, -M, 1, M, 1, -M, 1, -M\}$ may be substituted into the short training sequence S, and the short training sequence S corresponding to the EHT-STF whose channel bandwidth is 320 MHz may be represented as follows:

$\{M,-1,M,-1,-M,-1,M,0,-M,1,M,1,-M,1,-M,1,M,-1,$
$M,-1,-M,-1,M,0,-M,1,M,1,-M,1,M,-1,-M,-1,$
$M,-1,-M,-1,M,0,-M,1,M,1,-M,1,-M,1,-M,1,$
$-M,1,M,1,-M,0,M,-1,-M,-1,M,-1,M\}*(1+j)\sqrt{2};$ $\{M,-1,M,-1,-M,-1,M,0,-M,1,M,1,-M,1,-M,-1,-M,$
$1,-M,1,M,1,-M,0,M,-1,-M,-1,M,-1,M,0,-M,1,-$
$M,1,M,1,-M,0,M,-1,-M,-1,M,-1,M,-1,-M,1,$
$-M,1,M,1,-M,0,M,-1,-M,-1,M,-1,M\}*(1+j)\sqrt{2};$ $\{-M,1,-M,1,M,1,-M,0,M,-1,-M,-1,M,-1,M,1,M,-1,$
$M,-1,-M,-1,M,0,-M,1,M,1,-M,1,-M,1,-M,0,M,-1,$
$M,-1,-M,-1,M,0,-M,1,M,1,-M,1,-M,1,M,1,-M,$
$-1,-M,-1,M,0,-M,1,M,1,-M,1,-M\}*(1+j)\sqrt{2};$ $\{-M,1,-M,1,M,1,-M,0,M,-1,-M,-1,M,-1,-1,-M,$
$1,-M,1,M,1,-M,0,M,-1,-M,-1,M,-1,M,0,-M,1,-$
$M,1,M,1,-M,0,M,-1,-M,-1,M,-1,M,-1,M,-1,$
$M,-1,-M,-1,M,0,-M,1,M,1,-M,1,-M\}*(1+j)\sqrt{2};$ $\{M,-1,M,-1,-M,-1,M,0,-M,1,M,1,-M,1,-M,0,M,-1,$
$M,-1,-M,-1,M,0,-M,1,M,1,-M,1,-M,0,M,-1,$
$M,-1,-M,-1,M,0,-M,1,M,1,-M,1,-M,0,-M,1,$
$-M,1,M,1,-M,0,M,-1,-M,-1,M,-1,M\}*(1+j)\sqrt{2};$ $\{M,-1,M,-1,-M,-1,M,0,-M,1,M,1,-M,1,-M,0,-M,$
$1,-M,1,M,1,-M,0,M,-1,-M,-1,M,-1,M,0,-M,1,-$
$M,1,M,1,-M,0,M,-1,-M,-1,M,-1,M,0,-M,1,-M,$
$1,M,1,-M,0,M,-1,-M,-1,M,-1,-M\}*(1+j)\sqrt{2};$ $\{-M,1,-M,1,M,1,-M,0,M,-1,-M,-1,M,-1,M,0,M,-1,$
$M,-1,-M,-1,M,0,-M,1,M,1,-M,1,-M,0,M,-1,$
$M,-1,-M,-1,M,0,-M,1,M,1,-M,1,-M,0,M,-1,M,$
$-1,-M,-1,M,0,-M,1,M,1,-M,1,-M\}*(1+j)\sqrt{2};$ $\{-M,1,-M,1,M,1,-M,0,M,-1,-M,-1,M,-1,M,0,-M,$
$1,-M,1,M,1,-M,0,M,-1,-M,-1,M,-1,M,0,-M,1,-$
$M,1,M,1,-M,0,M,-1,-M,-1,M,-1,M,0,-M,1,-M,$
$-1,-M,-1,M,0,-M,1,M,1,-M,1,-M\}*(1+j)\sqrt{2};$ $\{M,-1,M,-1,-M,-1,M,0,-M,1,M,1,-M,1,-M,0,M,-1,$
$M,-1,-M,-1,M,0,-M,1,M,1,-M,1,-M,0,M,-1,$
$M,-1,-M,-1,M,0,-M,1,M,1,-M,1,-M,1,-M,1,$
$-M,1,M,1,-M,0,M,-1,-M,-1,M,-1,-M\}*(1+j)\sqrt{2};$ $\{M,-1,M,-1,-M,-1,M,0,-M,1,M,1,-M,1,-M,-1,-M,$
$1,-M,1,M,1,-M,0,M,-1,-M,-1,M,-1,M,0,-M,1,$
$M,1,M,1,-M,0,M,-1,-M,-1,M,-1,M,0,-M,1,$
$-M,1,M,1,-M,0,M,-1,-M,-1,M,-1,-M\}*(1+j)\sqrt{2};$ $\{-M,1,-M,1,M,1,-M,0,M,-1,-M,-1,M,1,M,-1,$
$M,-1,-M,-1,M,0,-M,1,M,1,-M,1,-M,0,M,-1,$
$M,-1,-M,-1,M,0,-M,1,M,1,-M,1,-M,0,M,-1,-M,$
$-1,-M,-1,M,0,-M,1,M,1,-M,1,-M\}*(1+j)\sqrt{2};$ $\{-M,1,-M,1,M,1,-M,0,M,-1,-M,-1,M,-1,M,0,-M,$
$1,-M,1,M,1,-M,0, M,-1,-M,-1,M,-1,M,0,-M,$
$1,-M,1,M,1,-M,0,M,-1,-M,-1,M,-1,M,-1,M,-1,$
$M,-1,-M,-1,M,0,-M,1,M,1,-M,1,-M\}*(1+j)\sqrt{2};$ $\{M,-1,M,-1,-M,-1,M,0,-M,1,M,1,-M,1,-M,-1,M,-$
$1,M,-1,-M,-1,M,0,-M,1,M,1,-M,1,-M,0,M,-1,$
$M,-1,-M,-1,M,0,-M,1,M,1,-M,1,-M,-1,-M,1,$
$-M,1,M,1,-M,0,M,-1,-M,-1,M,-1,-M\}*(1+j)\sqrt{2};$ $\{M,-1,M,-1,-M,-1,M,0,-M,1,M,1,-M,1,-M,1,-M,$
$1,-M,1,M,1,-M,0,M,-1,-M,-1,M,-1,M,0,-M,1,-$
$M,1,M,1,-M,0,M,-1,-M,-1,M,-1,M,1,-M,$
$1,M,1,-M,0,M,-1,-M,-1,M,-1,-M\}*(1+j)\sqrt{2};$ $\{-M,1,-M,1,M,1,-M,0,M,-1,-M,-1,M,-1,M,-$
$1,M,-1,-M,-1,M,0,-M,1,M,1,-M,1,-M,0,M,-1,$
$M,-1,-M,-1,M,0,-M,1,M,1,-M,1,-M,-1,-M,-1,$
$M,-1,-M,-1,M,0,-M,1,M,1,-M,1,-M\}*(1+j)\sqrt{2};$ {−M,1,−M,1,M,1,−M,0,M,−1,−M,−1,M,−1,M,1,−M,
1,−M,1,M,1,−M,0,M,−1,−M,−1,M,−1,M,0,−M,1,−
M,1,M,1,−M,0,M,−1,−M,−1,M,−1,M,1,M,−1,M,
−1,−M,−1,M,0,−M,1,M,1,−M,1,−M}*(1+j)√2;

{M,−1,M,−1,−M,−1,M,0,−M,1,M,1,−M,1,−M,−1,M,−
1,M,−1,−M,−1,M,0,−M,1,M,1,−M,1,−M,0,M,−1,
M,−1,−M,−1,M,0,−M,1,M,1,−M,1,−M,0,−M,1,
−M,1,M,1,−M,0,M,−1,−M,−1,M,−1,M}*(1+j)√2;

{M,−1,M,−1,−M,−1,M,0,−M,1,M,1,−M,1,−M,0,−M,
1,−M,1,M,1,−M,0,M,−1,−M,−1,M,−1,M,0,−M,1,−
M,1,M,1,−M,0,M,−1,−M,−1,M,−1,M,1,−M,1,−M,
1,M,1,−M,0,M,−1,−M,−1,M,−1,M}*(1+j)√2;

{−M,1,−M,1,M,1,−M,0,M,−1,−M,−1,M,−1,M,0,M,−1,
M,−1,−M,−1,M,0,−M,1,M,1,−M,1,−M,0,M,−1,
M,−1,−M,−1,M,0,−M,1,M,1,−M,1,−M,−1,M,−1,
M,−1,−M,−1,M,0,−M,1,M,1,−M,1,−M}*(1+j)√2;
or

{−M,1,−M,1,M,1,−M,0,M,−1,−M,−1,M,−1,M,1,−M,
1,−M,1,M,1,−M,0,M,−1,−M,−1,M,−1,M,0,−M,1,−
M,1,M,1,−M,0,M,−1,−M,−1,M,−1,M,0,M,−1,M,
−1,−M,−1,M,0,−M,1,M,1,−M,1,−M}*(1+j)√2.

Therefore, the values given in the foregoing short training sequence are corresponding to values of frequency domain sequences on tones from a tone whose subscript is −2024 to a tone whose subscript is 2024 at a spacing of 8 tones.

It should be noted that the short training sequence S corresponding to the EHT-STF whose channel bandwidth is 320 MHz may be represented in any one of the foregoing plurality of representation manners.

It can be learned from the foregoing that, in method 2, the short training sequence S corresponding to the EHT-STF whose channel bandwidth is 320 MHz may be obtained through transformation based on the M sequence.

Method 3

The short training sequence corresponding to the EHT-STF in the foregoing method 1 or method 2 is directly cached or stored locally, and when being used, the short training sequence corresponding to the EHT-STF is directly obtained locally.

It should be understood that the foregoing three methods are merely examples for description, and this application is not limited thereto. Any method for obtaining the short training sequence corresponding to the EHT-STF whose channel bandwidth is 320 MHz falls within the protection scope of the embodiments of this application.

Optionally, in the foregoing three methods, the period length of the short training sequence S of the EHT-STF is 1.6 µs.

The short training sequence S corresponding to the EHT-STF whose channel bandwidth is 320 MHz may be obtained through simulation calculation. For example, if method 1 is used, the short training sequence S corresponding to the EHT-STF whose channel bandwidth is 320 MHz may be obtained through calculation by using a corresponding formula based on the stored frequency domain sequence HES corresponding to the HE-STF. For another example, if method 2 is used, the short training sequence S corresponding to the EHT-STF whose channel bandwidth is 320 MHz may be obtained, based on the M sequence that is stored or that is specified in the standard, through calculation by using a corresponding formula.

Specifically, the foregoing sequence is designed based on the frequency domain sequence $HES_{-504:8:504}$ of the 80 MHz HE-STF, defined in 802.11ax, whose period length is 1.6 µs. A detailed design formula of the short training sequence S corresponding to the EHT-STF whose channel bandwidth is 320 MHz is as follows:

$$S_{-2024:8:2024} = \{c_1*HES_{-504:8:504}, a_1, c_2*HES_{-504:8:504},$$
$$0, c_3*HES_{-504:8:504}, a_2, c_4*HES_{-504:8:504}\}*(1+j)$$
$$\sqrt{2}, \text{ where } S_{\pm 2024}=0. \qquad \text{Formula 6}$$

Similarly, a value of $a_i$ is $\{-1, 0, 1\}$, and i=1 and 2; and a value of $c_j$ is $\{-1, 1\}$, and j=1, 2, and 3, 4.

Therefore, when the short training sequence corresponding to the EHT-STF whose channel bandwidth is 320 MHz is obtained by using method 1, the short training sequence corresponding to the EHT-STF whose channel bandwidth is 320 MHz may be obtained based on the stored $HES_{-504:8:504}$ according to the foregoing formula 6. Alternatively, when the short training sequence corresponding to the EHT-STF whose channel bandwidth is 320 MHz is obtained by using method 2, the short training sequence corresponding to EHT-STF whose channel bandwidth is 320 MHz may be obtained based on the M sequence according to the foregoing formula 6.

According to formula 6, the short training sequence corresponding to the EHT-STF whose channel bandwidth is 320 MHz may be obtained. In addition, through simulation calculation, for example, adjusting $a_i$ and $c_j$, a PAPR corresponding to the short training sequence corresponding to the EHT-STF is less than or equal to a preset fifth threshold, so that a sequence with comparatively good performance can be obtained.

A preset threshold (namely, an example of the preset fifth threshold) may be set based on a minimum value of the PAPR (for example, a plurality of sets of results listed in Table 6 when the minimum PAPR is used) obtained in an exhaustive process in which exhaustive enumeration is performed on a parameter set A and a parameter set C. Alternatively, the preset threshold may be comprehensively set by combining a property of the sequence and a minimum value that is of the PAPR and that is obtained from exhaustive results. Alternatively, the preset threshold may be comprehensively set by combining a preset parameter and the minimum value that is of the PAPR and that is obtained from exhaustive results. Alternatively, the preset threshold may be pre-specified. Alternatively, the preset threshold may be obtained by performing a plurality of experiments.

Specifically, after exhaustive retrieval, all possible $S_{-2024:8:2024}$ and corresponding PAPR values may be obtained, and finally, $S_{-2024:8:2024}$ with the minimum PAPR is obtained through comparison. Table 6 µshows $a_i$ and $c_j$ in a plurality of optimal groups of S when the short training sequence S corresponding to the 320 MHz EHT-STF is designed based on the frequency domain sequence HES corresponding to the 80 MHz and 1.6 µs HE-STF.

Optionally, Table 6 may be used to design the short training sequence S corresponding to the 320 MHz EHT-STF whose period length is 1.6 µs based on the short training sequence corresponding to the 80 MHz HE-STF whose period length is 1.6 µs.

TABLE 6

Parameter set values of the short training sequence S corresponding to the 320 MHz EHT-STF

| Sequence number | $a_1$ | $a_2$ | $c_1$ | $c_2$ | $c_3$ | $c_4$ | PAPR (dB) | PAPR (up_sample) (dB) |
|---|---|---|---|---|---|---|---|---|
| 1 | 1 | 1 | 1 | 1 | 1 | −1 | 7.1654 | 8.2094 |
| 2 | −1 | −1 | 1 | −1 | −1 | −1 | 7.1654 | 8.2093 |

TABLE 6-continued

Parameter set values of the short training sequence
S corresponding to the 320 MHz EHT-STF

| Sequence number | $a_1$ | $a_2$ | $c_1$ | $c_2$ | $c_3$ | $c_4$ | PAPR (dB) | PAPR (up_sample) (dB) |
|---|---|---|---|---|---|---|---|---|
| 3  | 1  | 1  | −1 | 1  | 1  | 1  | 7.1654 | 8.2093 |
| 4  | −1 | −1 | −1 | −1 | −1 | 1  | 7.1654 | 8.2094 |
| 5  | 0  | 0  | 1  | 1  | 1  | −1 | 6.8805 | 8.2714 |
| 6  | 0  | 0  | 1  | −1 | −1 | −1 | 6.8805 | 8.2712 |
| 7  | 0  | 0  | −1 | 1  | 1  | 1  | 6.8805 | 8.2712 |
| 8  | 0  | 0  | −1 | −1 | −1 | 1  | 6.8805 | 8.2714 |
| 9  | 0  | 1  | 1  | 1  | 1  | −1 | 7.0238 | 8.3171 |
| 10 | −1 | 0  | 1  | −1 | −1 | −1 | 7.0238 | 8.317 |
| 11 | 1  | 0  | −1 | 1  | 1  | 1  | 7.0238 | 8.317 |
| 12 | 0  | −1 | −1 | −1 | −1 | 1  | 7.0238 | 8.3171 |
| 13 | −1 | −1 | 1  | 1  | 1  | −1 | 7.1654 | 8.3214 |
| 14 | 1  | 1  | 1  | −1 | −1 | −1 | 7.1654 | 8.3212 |
| 15 | −1 | −1 | −1 | 1  | 1  | 1  | 7.1654 | 8.3212 |
| 16 | 1  | 1  | −1 | −1 | −1 | 1  | 7.1654 | 8.3214 |
| 17 | −1 | 0  | 1  | 1  | 1  | −1 | 7.0238 | 8.3281 |
| 18 | 0  | 1  | 1  | −1 | −1 | −1 | 7.0238 | 8.3279 |
| 19 | 0  | −1 | −1 | 1  | 1  | 1  | 7.0238 | 8.3279 |
| 20 | 1  | 0  | −1 | −1 | −1 | 1  | 7.0238 | 8.3281 |

Values of $a_i$ and $c_j$ in the obtained plurality of groups of results are separately used in the foregoing formula 6, and the short training sequence S corresponding to the 320 MHz EHT-STF may be represented as follows:

$\{HES_{-504:8:504'}, 1, HES_{-504:8:504'}, 0, HES_{-504:8:504'}, 1, -HES_{-504:8:504'}\}*(1+j)\sqrt{2};$ $\{HES_{-504:8:504'}, -1, -HES_{-504:8:504'}, 0, -HES_{-504:8:504'}, -1, -HES_{-504:8:504'}\}*(1+j)\sqrt{2};$ $\{-HES_{-504:8:504'}, 1, HES_{-504:8:504'}, 0, HES_{-504:8:504'}, 1, HES_{-504:8:504'}\}*(1+j)\sqrt{2};$ $\{-HES_{-504:8:504'}, -1, -HES_{-504:8:504'}, 0, -HES_{-504:8:504'}, -1, HES_{-504:8:504'}\}*(1+j)\sqrt{2};$ $\{HES_{-504:8:504'}, 0, HES_{-504:8:504'}, 0, HES_{-504:8:504'}, 0, -HES_{-504:8:504'}\}*(1+j)\sqrt{2};$ $\{HES_{-504:8:504'}, 0, -HES_{-504:8:504'}, 0, -HES_{-504:8:504'}, 0, -HES_{-504:8:504'}\}*(1+j)\sqrt{2};$ $\{-HES_{-504:8:504'}, 0, HES_{-504:8:504'}, 0, HES_{-504:8:504'}, 0, HES_{-504:8:504'}\}*(1+j)\sqrt{2};$ $\{-HES_{-504:8:504'}, 0, -HES_{-504:8:504'}, 0, -HES_{-504:8:504'}, 0, HES_{-504:8:504'}\}*(1+j)\sqrt{2};$ $\{HES_{-504:8:504'}, 0, HES_{-504:8:504'}, 0, HES_{-504:8:504'}, 1, -HES_{-504:8:504'}\}*(1+j)\sqrt{2};$ $\{HES_{-504:8:504'}, -1, -HES_{-504:8:504'}, 0, -HES_{-504:8:504'}, 0, -HES_{-504:8:504'}\}*(1+j)\sqrt{2};$ $\{-HES_{-504:8:504'}, 1, HES_{-504:8:504'}, 0, HES_{-504:8:504'}, 0, HES_{-504:8:504'}\}*(1+j)\sqrt{2};$ $\{-HES_{-504:8:504'}, 0, -HES_{-504:8:504'}, 0, -HES_{-504:8:504'}, -1, HES_{-504:8:504'}\}*(1+j)\sqrt{2};$ $\{HES_{-504:8:504'}, -1, HES_{-504:8:504'}, 0, HES_{-504:8:504'}, -1, -HES_{-504:8:504'}\}*(1+j)\sqrt{2};$ $\{HES_{-504:8:504'}, 1, -HES_{-504:8:504'}, 0, -HES_{-504:8:504'}, 1, -HES_{-504:8:504'}\}*(1+j)\sqrt{2};$ $\{-HES_{-504:8:504'}, -1, HES_{-504:8:504'}, 0, HES_{-504:8:504'}, -1, HES_{-504:8:504'}\}*(1+j)\sqrt{2};$ $\{-HES_{-504:8:504'}, 1, -HES_{-504:8:504'}, 0, -HES_{-504:8:504'}, 1, HES_{-504:8:504'}\}*(1+j)\sqrt{2};$ $\{HES_{-504:8:504'}, -1, HES_{-504:8:504'}, 0, HES_{-504:8:504'}, 0, -HES_{-504:8:504'}\}*(1+j)\sqrt{2};$ $\{HES_{-504:8:504'}, 0, -HES_{-504:8:504'}, 0, -HES_{-504:8:504'}, -1, HES_{-504:8:504'}\}*(1+j)\sqrt{2};$ or $\{-HES_{-504:8:504'}, 1, -HES_{-504:8:504'}, 0, -HES_{-504:8:504'}, 0, HES_{-504:8:504'}\}*(1+j)\sqrt{2}.$ $HES_{-504:8:504'}$ represented as $\{M, -1, M, -1, -M, -1, M, 0, -M, 1, M, 1, -M, 1, -M\}$ and $-HES_{-504:8:504'}$ represented as $\{-M, 1, -M, 1, M, 1, -M, 0, M, -1, -M, -1, M, -1, M\}$ are substituted into the short training sequence S. The short training sequence corresponding to the EHT-STF whose channel bandwidth is 320 MHz may be obtained.

It should be understood that the short training sequence S corresponding to the EHT-STF whose channel bandwidth is 320 MHz may be represented in any one of the foregoing plurality of representation manners.

It can be learned from the foregoing that the 320 MHz short training sequence is determined by using a sequence related to the short training sequence corresponding to the 80 MHz short training field whose period length is 0.8 μs. Therefore, the 320 MHz short training sequence may be compatible with the 80 MHz short training sequence. In addition, the 320 MHz short training sequence can support automatic gain control on a large channel bandwidth (e.g., a bandwidth greater than 160 MHz). After simulation verification is performed, the PAPRs in Table 6 are compared with the PAPRs (Table 1) in 802.11ax. Peak to average power ratios of these short training sequences are comparatively small, and the automatic gain control on the large channel bandwidth can be supported. In addition, an estimation effect of an automatic gain control circuit at a receive end can be improved, and a receive bit error rate is reduced. Therefore, the PAPR of the short training sequence provided in this solution of this application for the large channel bandwidth can be controlled to a very small value.

Manner B

The short training sequence S corresponding to the EHT-STF whose period length is 1.6 μs and channel bandwidth is 320 MHz is obtained based on the frequency domain sequence HES of the HE-STF whose period length is 1.6 μs and channel bandwidth is 80 MHz, and values of $a_i$ are all 0.

Similarly, in this embodiment of this application, the short training sequence corresponding to the EHT-STF whose channel bandwidth is 320 MHz may be determined by using at least the following three methods.

Method 1

The short training sequence S corresponding to the EHT-STF whose channel bandwidth is 320 MHz is determined based on a frequency domain sequence HES of a bandwidth of the reference channel.

Optionally, the period length of the short training sequence S of the EHT-STF is 1.6 μs.

Optionally, the short training sequence corresponding to the EHT-STF whose channel bandwidth is 320 MHz may be represented as follows:

$\{HES_{-504:8:504'}, 0, HES_{-504:8:504'}, 0, HES_{-504:8:504'}, 0, -HES_{-504:8:504'}\}*(1+j)\sqrt{2};$ {HES$_{-504:8:504'}$,0,−HES$_{-504:8:504'}$,0,−HES$_{-504:8:504'}$,
    0,−HES$_{-504:8:504'}$}*(1+j)√2;

{−HES$_{-504:8:504'}$,0,HES$_{-504:8:504'}$,0,HES$_{-504:8:504'}$,0,
    HES$_{-504:8:504'}$}*(1+j)√2; or

{−HES$_{-504:8:504'}$,0,−HES$_{-504:8:504'}$,0,−HES$_{-504:8:504'}$,
    0,HES$_{-504:8:504'}$}*(1+j)√2.

HES$_{-504:8:504'}$=HES$_{-504:8:504}$*√2/(1+j)={M, −1, M, −1, −M, −1, M, 0, −M, 1, M, 1, −M, 1, −M}. In other words, HES$_{-504:8:504'}$ is represented as {M, −1, M, −1, −M, −1, M, 0, −M, 1, M, 1, −M, 1, −M}.

HES$_{-504:8:504}$ is an HES corresponding to 80 MHz and the period length of 1.6 μs. HES$_{-504:8:504}$ is represented as {M, −1, M, −1, −M, −1, M, 0, −M, 1, M, 1, −M, 1, −M}*(1+j)√2, where HES$_{±504}$=0.

Therefore, the values given in the foregoing short training sequence are corresponding to values of frequency domain sequences on tones from a tone whose subscript is −2024 to a tone whose subscript is 2024 at a spacing of 8 tones.

It should be understood that the short training sequence S corresponding to the EHT-STF whose channel bandwidth is 320 MHz may be represented in any one of the foregoing plurality of representation manners.

It can be learned from the foregoing that, in method 1, the short training sequence corresponding to the EHT-STF whose channel bandwidth is 320 MHz may be obtained through transformation based on an HES specified in the standard.

Method 2

The short training sequence S corresponding to the EHT-STF whose channel bandwidth is 320 MHz is obtained through transformation based on an M sequence.

Specifically, HES$_{-504:8:504'}$ represented as {M, −1, M, −1, −M, −1, M, 0, −M, 1, M, 1, −M, 1, −M} is substituted into the short training sequence S, and the short training sequence S corresponding to the 320 MHz EHT-STF may be represented as follows:

{$M$,−1,$M$,−1,−$M$,−1,$M$,0,−$M$,1,$M$,1,−$M$,1,−$M$,0,$M$,−1,
    $M$,−1,−$M$,−1,$M$,0,−$M$,1,$M$,1,−$M$,1,−$M$,0,$M$,−1,
    $M$,−1,−$M$,−1,$M$,0,−$M$,1,$M$,1,−$M$,1,−$M$,0,−$M$,1,
    −$M$,1,$M$,1,−$M$,0,$M$,−1,−$M$,−1,$M$,−1,$M$}*(1+j)√2;

{$M$,−1,$M$,−1,−$M$,−1,$M$,0,−$M$,1,$M$,1,−$M$,1,−$M$,0,−$M$,
    1,−$M$,1,$M$,1,−$M$,0,$M$,−1,−$M$,−1,$M$,−1,$M$,0,−$M$,1,−
    $M$,1,$M$,1,−$M$,0,$M$,−1,−$M$,−1,$M$,−1,$M$,0,−$M$,1,−$M$,
    1,$M$,1,−$M$,0,$M$,−1,−$M$,−1,$M$,−1,$M$}*(1+j)√2;

{−$M$,1,−$M$,1,$M$,1,−$M$,0,$M$,−1,−$M$,−1,$M$,−1,$M$,0,$M$,−1,
    $M$,−1,−$M$,−1,$M$,0,−$M$,1,$M$,1,−$M$,1,−$M$,0,$M$,−1,
    $M$,−1,−$M$,−1,$M$,0,−$M$,1,$M$,1,−$M$,1,−$M$,0,$M$,−1,$M$,
    −1,−$M$,−1,$M$,0,−$M$,1,$M$,1,−$M$,1,−$M$}*(1+j)√2; or

{−$M$,1,−$M$,1,$M$,1,−$M$,0,$M$,−1,−$M$,−1,$M$,−1,$M$,0,−$M$,
    1,−$M$,1,$M$,1,−$M$,0,$M$,−1,−$M$,−1,$M$,−1,$M$,0,−$M$,1,−
    $M$,1,$M$,1,−$M$,0,$M$,−1,−$M$,−1,$M$,−1,$M$,0,−$M$,1,−$M$,
    1,$M$,1,−$M$,0,$M$,−1,−$M$,−1,$M$,−1,$M$}*(1+j)√2.

Therefore, the values given in the foregoing short training sequence are corresponding to values of frequency domain sequences on tones from a tone whose subscript is −2024 to a tone whose subscript is 2024 at a spacing of 8 tones.

It should be noted that the short training sequence S corresponding to the EHT-STF whose channel bandwidth is 320 MHz may be represented in any one of the foregoing plurality of representation manners.

It can be learned from the foregoing that, in method 2, the short training sequence S corresponding to the EHT-STF whose channel bandwidth is 320 MHz may be obtained through transformation based on the M sequence.

Method 3

The short training sequence corresponding to the EHT-STF in the foregoing method 1 or method 2 is directly cached or stored locally, and when being used, the short training sequence corresponding to the EHT-STF is directly obtained locally.

It should be understood that the foregoing three methods are merely examples for description, and this application is not limited thereto. Any method for obtaining the short training sequence corresponding to the EHT-STF whose channel bandwidth is 320 MHz falls within the protection scope of the embodiments of this application.

Optionally, in the foregoing three methods, the period length of the short training sequence S of the EHT-STF is 1.6 μs.

The short training sequence S corresponding to the 320 MHz EHT-STF may be obtained through simulation calculation. For example, if method 1 is used, the short training sequence S corresponding to the 320 MHz EHT-STF may be obtained through calculation by using a corresponding formula based on the stored frequency domain sequence HES corresponding to the HE-STF. For another example, if method 2 is used, the short training sequence S corresponding to the 320 MHz EHT-STF may be obtained, based on the M sequence that is stored or that is specified in the standard, through calculation by using a corresponding formula.

Specifically, the foregoing sequence is designed based on the frequency domain sequence HES$_{-504:8:504}$ of the 80 MHz HE-STF, defined in 802.11ax, whose period length is 1.6 μs. A detailed design formula of the short training sequence S corresponding to the EHT-STF whose channel bandwidth is 320 MHz is as follows:

$S_{-2024:8:2024}$={$c_1$*HES$_{-504:8:504'}$,0,$c_2$*HES$_{-504:8:504'}$,
    0,$c_3$*HES$_{-504:8:504'}$,0,$c_4$*HES$_{-504:8:504'}$}*(1+j)
    √2, where $S_{±2024}$=0.   Formula 7

Similarly, a value of $c_j$ is {−1, 1}, and j=1, 2, and 3, 4.

Therefore, when the short training sequence corresponding to the EHT-STF whose channel bandwidth is 320 MHz is obtained by using method 1, the short training sequence corresponding to the EHT-STF whose channel bandwidth is 320 MHz may be obtained based on the stored HES$_{-504:8:504}$ according to the foregoing formula 7. Alternatively, when the short training sequence corresponding to the EHT-STF whose channel bandwidth is 320 MHz is obtained by using method 2, the short training sequence corresponding to EHT-STF whose channel bandwidth is 320 MHz may be obtained based on the M sequence according to the foregoing formula 7.

According to formula 7, the short training sequence S corresponding to the EHT-STF whose channel bandwidth is 320 MHz may be obtained. In addition, through simulation calculation, for example, adjusting $c_j$, a PAPR corresponding to the short training sequence S corresponding to the EHT-STF is less than or equal to a preset sixth threshold, so that a sequence with comparatively good performance can be obtained.

A preset threshold (namely, an example of the preset sixth threshold) may be set based on a minimum value of the PAPR (for example, a plurality of sets of results listed in Table 7 when the minimum PAPR is used) obtained in an exhaustive process in which exhaustive enumeration is performed on a parameter set A and a parameter set C. Alternatively, the preset threshold may be comprehensively set by combining a property of the sequence and a minimum value that is of the PAPR and that is obtained from exhaustive results. Alternatively, the preset threshold may be comprehensively set by combining a preset parameter and the minimum value that is of the PAPR and that is obtained from exhaustive results. Alternatively, the preset threshold may be pre-specified. Alternatively, the preset threshold may be obtained by performing a plurality of experiments.

Specifically, after exhaustive retrieval, all possible $S_{-2024:8:2024}$ and corresponding PAPR values may be obtained, and finally, $S_{-2024:8:2024}$ with the minimum PAPR is obtained through comparison. Table 7 μshows $c_j$ in a plurality of optimal groups of S when the short training sequence S corresponding to the 320 MHz EHT-STF is designed based on the short training sequence corresponding to the 80 MHz HE-STF whose period length is 1.6 μs.

TABLE 7

Parameter set values of the short training sequence S corresponding to the 320 MHz EHT-STF

| Sequence number | $c_1$ | $c_2$ | $c_3$ | $c_4$ | PAPR (dB) | PAPR (up_sample) (dB) |
|---|---|---|---|---|---|---|
| 1 | 1 | 1 | 1 | −1 | 6.8805 | 8.2714 |
| 2 | 1 | 1 | 1 | −1 | 6.8805 | 8.2714 |
| 3 | 1 | 1 | 1 | −1 | 6.8805 | 8.2714 |
| 4 | 1 | 1 | 1 | −1 | 6.8805 | 8.2714 |
| 5 | 1 | 1 | 1 | −1 | 6.8805 | 8.2714 |
| 6 | 1 | 1 | 1 | −1 | 6.8805 | 8.2714 |
| 7 | 1 | 1 | 1 | −1 | 6.8805 | 8.2714 |
| 8 | 1 | 1 | 1 | −1 | 6.8805 | 8.2714 |
| 9 | 1 | 1 | 1 | −1 | 6.8805 | 8.2714 |
| 10 | 1 | −1 | −1 | −1 | 6.8805 | 8.2712 |
| 11 | 1 | −1 | −1 | −1 | 6.8805 | 8.2712 |
| 12 | 1 | −1 | −1 | −1 | 6.8805 | 8.2712 |
| 13 | 1 | −1 | −1 | −1 | 6.8805 | 8.2712 |
| 14 | 1 | −1 | −1 | −1 | 6.8805 | 8.2712 |
| 15 | 1 | −1 | −1 | −1 | 6.8805 | 8.2712 |
| 16 | 1 | −1 | −1 | −1 | 6.8805 | 8.2712 |
| 17 | 1 | −1 | −1 | −1 | 6.8805 | 8.2712 |
| 18 | 1 | −1 | −1 | −1 | 6.8805 | 8.2712 |
| 19 | −1 | 1 | 1 | 1 | 6.8805 | 8.2712 |
| 20 | −1 | 1 | 1 | 1 | 6.8805 | 8.2712 |
| 21 | −1 | 1 | 1 | 1 | 6.8805 | 8.2712 |
| 22 | −1 | 1 | 1 | 1 | 6.8805 | 8.2712 |
| 23 | −1 | 1 | 1 | 1 | 6.8805 | 8.2712 |
| 24 | −1 | 1 | 1 | 1 | 6.8805 | 8.2712 |
| 25 | −1 | 1 | 1 | 1 | 6.8805 | 8.2712 |
| 26 | −1 | 1 | 1 | 1 | 6.8805 | 8.2712 |
| 27 | −1 | 1 | 1 | 1 | 6.8805 | 8.2712 |
| 28 | −1 | −1 | −1 | 1 | 6.8805 | 8.2714 |
| 29 | −1 | −1 | −1 | 1 | 6.8805 | 8.2714 |
| 30 | −1 | −1 | −1 | 1 | 6.8805 | 8.2714 |
| 31 | −1 | −1 | −1 | 1 | 6.8805 | 8.2714 |
| 32 | −1 | −1 | −1 | 1 | 6.8805 | 8.2714 |
| 33 | −1 | −1 | −1 | 1 | 6.8805 | 8.2714 |
| 34 | −1 | −1 | −1 | 1 | 6.8805 | 8.2714 |
| 35 | −1 | −1 | −1 | 1 | 6.8805 | 8.2714 |
| 36 | −1 | −1 | −1 | 1 | 6.8805 | 8.2714 |

Optionally, Table 7 may be used to design the short training sequence S corresponding to the 320 MHz EHT-STF whose period length is 1.6 is based on the short training sequence corresponding to the 80 MHz HE-STF whose period length is 1.6 vis.

Values of $c_j$ in the obtained plurality of groups of results are separately used in the foregoing formula 7, and the short training sequence corresponding to the 320 MHz EHT-STF may be represented as follows:

$\{HES_{-504:8:504'}, 0, HES_{-504:8:504'}, 0, HES_{-504:8:504'}, 0, -HES_{-504:8:504'}\}*(1+j)\sqrt{2};$ $\{HES_{-504:8:504'}, 0, HES_{-504:8:504'}, 0, HES_{-504:8:504'}, 0, -HES_{-504:8:504'}\}*(1+j)\sqrt{2};$ $\{HES_{-504:8:504'}, 0, HES_{-504:8:504'}, 0, HES_{-504:8:504'}, 0, -HES_{-504:8:504'}\}*(1+j)\sqrt{2};$ $\{HES_{-504:8:504'}, 0, HES_{-504:8:504'}, 0, HES_{-504:8:504'}, 0, -HES_{-504:8:504'}\}*(1+j)\sqrt{2};$ $\{HES_{-504:8:504'}, 0, HES_{-504:8:504'}, 0, HES_{-504:8:504'}, 0, -HES_{-504:8:504'}\}*(1+j)\sqrt{2};$ $\{HES_{-504:8:504'}, 0, HES_{-504:8:504'}, 0, HES_{-504:8:504'}, 0, -HES_{-504:8:504'}\}*(1+j)\sqrt{2};$ $\{HES_{-504:8:504'}, 0, HES_{-504:8:504'}, 0, HES_{-504:8:504'}, 0, -HES_{-504:8:504'}\}*(1+j)\sqrt{2};$ $\{HES_{-504:8:504'}, 0, HES_{-504:8:504'}, 0, HES_{-504:8:504'}, 0, -HES_{-504:8:504'}\}*(1+j)\sqrt{2};$ $\{HES_{-504:8:504'}, 0, HES_{-504:8:504'}, 0, HES_{-504:8:504'}, 0, -HES_{-504:8:504'}\}*(1+j)\sqrt{2};$ $\{HES_{-504:8:504'}, 0, -HES_{-504:8:504'}, 0, -HES_{-504:8:504'}, 0, -HES_{-504:8:504'}\}*(1+j)\sqrt{2};$ $\{HES_{-504:8:504'}, 0, -HES_{-504:8:504'}, 0, -HES_{-504:8:504'}, 0, -HES_{-504:8:504'}\}*(1+j)\sqrt{2};$ $\{HES_{-504:8:504'}, 0, -HES_{-504:8:504'}, 0, -HES_{-504:8:504'}, 0, -HES_{-504:8:504'}\}*(1+j)\sqrt{2};$ $\{HES_{-504:8:504'}, 0, -HES_{-504:8:504'}, 0, -HES_{-504:8:504'}, 0, -HES_{-504:8:504'}\}*(1+j)\sqrt{2};$ $\{HES_{-504:8:504'}, 0, -HES_{-504:8:504'}, 0, -HES_{-504:8:504'}, 0, -HES_{-504:8:504'}\}*(1+j)\sqrt{2};$ $\{HES_{-504:8:504'}, 0, -HES_{-504:8:504'}, 0, -HES_{-504:8:504'}, 0, -HES_{-504:8:504'}\}*(1+j)\sqrt{2};$ $\{HES_{-504:8:504'}, 0, -HES_{-504:8:504'}, 0, -HES_{-504:8:504'}, 0, -HES_{-504:8:504'}\}*(1+j)\sqrt{2};$ $\{HES_{-504:8:504'}, 0, -HES_{-504:8:504'}, 0, -HES_{-504:8:504'}, 0, -HES_{-504:8:504'}\}*(1+j)\sqrt{2};$ $\{-HES_{-504:8:504'}, 0, HES_{-504:8:504'}, 0, HES_{-504:8:504'}, 0, HES_{-504:8:504'}\}*(1+j)\sqrt{2};$ $\{-HES_{-504:8:504'}, 0, HES_{-504:8:504'}, 0, HES_{-504:8:504'}, 0, HES_{-504:8:504'}\}*(1+j)\sqrt{2};$ $\{-HES_{-504:8:504'}, 0, HES_{-504:8:504'}, 0, HES_{-504:8:504'}, 0, HES_{-504:8:504'}\}*(1+j)\sqrt{2};$ $\{-HES_{-504:8:504'}, 0, HES_{-504:8:504'}, 0, HES_{-504:8:504'}, 0, HES_{-504:8:504'}\}*(1+j)\sqrt{2};$ $\{-HES_{-504:8:504'}, 0, HES_{-504:8:504'}, 0, HES_{-504:8:504'}, 0, HES_{-504:8:504'}\}*(1+j)\sqrt{2};$ $\{-HES_{-504:8:504'}, 0, HES_{-504:8:504'}, 0, HES_{-504:8:504'}, 0, HES_{-504:8:504'}\}*(1+j)\sqrt{2};$ $\{-HES_{-504:8:504'}, 0, HES_{-504:8:504'}, 0, HES_{-504:8:504'}, 0, HES_{-504:8:504'}\}*(1+j)\sqrt{2};$ $\{-HES_{-504:8:504'}, 0, HES_{-504:8:504'}, 0, HES_{-504:8:504'}, 0, HES_{-504:8:504'}\}*(1+j)\sqrt{2};$ $\{-HES_{-504:8:504'}, 0, HES_{-504:8:504'}, 0, HES_{-504:8:504'}, 0, HES_{-504:8:504'}\}*(1+j)\sqrt{2};$ $\{-HES_{-504:8:504'}, 0, -HES_{-504:8:504'}, 0, -HES_{-504:8:504'}, 0, HES_{-504:8:504'}\}*(1+j)\sqrt{2};$ $\{-HES_{-504:8:504'}, 0, -HES_{-504:8:504'}, 0, -HES_{-504:8:504'}, 0, HES_{-504:8:504'}\}*(1+j)\sqrt{2};$ $\{-HES_{-504:8:504'}, 0, -HES_{-504:8:504'}, 0, -HES_{-504:8:504'}, 0, HES_{-504:8:504'}\}*(1+j)\sqrt{2};$ $\{-HES_{-504:8:504'}, 0, -HES_{-504:8:504'}, 0, -HES_{-504:8:504'}, 0, HES_{-504:8:504'}\}*(1+j)\sqrt{2};$ $\{-HES_{-504:8:504'}, 0, -HES_{-504:8:504'}, 0, -HES_{-504:8:504'}, 0, HES_{-504:8:504'}\}*(1+j)\sqrt{2};$ $\{-HES_{-504:8:504'}, 0, -HES_{-504:8:504'}, 0, -HES_{-504:8:504'}, 0, HES_{-504:8:504'}\}*(1+j)\sqrt{2};$ $\{-HES_{-504:8:504'}, 0, -HES_{-504:8:504'}, 0, -HES_{-504:8:504'}, 0, HES_{-504:8:504'}\}*(1+j)\sqrt{2};$ $\{-HES_{-504:8:504'}, 0, -HES_{-504:8:504'}, 0, -HES_{-504:8:504'}, 0, HES_{-504:8:504'}\}*(1+j)\sqrt{2};$ or $\{-HES_{-504:8:504'}, 0, -HES_{-504:8:504'}, 0, -HES_{-504:8:504'}, 0, HES_{-504:8:504'}\}*(1+j)\sqrt{2}.$ $HES_{-504:8:504'}$ represented as $\{M, -1, M, -1, -M, -1, M, 0, -M, 1, M, 1, -M, 1, -M\}$ and $-HES_{-504:8:504'}$ represented as $\{-M, 1, -M, 1, M, 1, -M, 0, M, -1, -M, -1, M, -1, M\}$ are substituted into the short training sequence. The short training sequence corresponding to the EHT-STF whose channel bandwidth is 320 MHz may be obtained.

It should be understood that the short training sequence S corresponding to the EHT-STF whose channel bandwidth is 320 MHz may be represented in any one of the foregoing plurality of representation manners.

It can be learned from the foregoing that the 320 MHz short training sequence is determined by using a sequence related to the short training sequence corresponding to the 80 MHz short training field whose period length is 0.8 μs. Therefore, the 320 MHz short training sequence may be compatible with the 80 MHz short training sequence. In addition, the 320 MHz short training sequence can support automatic gain control on a large channel bandwidth (e.g., a bandwidth greater than 160 MHz). After simulation verification is performed, the PAPRs in Table 7 are compared with the PAPRs (Table 1) in 802.11ax. Peak to average power ratios of these short training sequences are comparatively small, and the automatic gain control on the large channel bandwidth can be supported. In addition, an estimation effect of an automatic gain control circuit at a receive end can be improved, and a receive bit error rate is reduced. Therefore, the PAPR of the short training sequence provided in this solution of this application for the large channel bandwidth can be controlled to a very small value.

It can be learned from the foregoing that, in the embodiments of this application, short training sequences corresponding to 240 MHz and 320 MHz EHT-STFs are proposed in the embodiments of this application, and the short training sequence corresponding to the EHT-STF may be directly stored at a local end. Alternatively, the M sequence may be stored at a local end or specified in the protocol, and the short training sequence corresponding to the EHT-STF is obtained through calculation based on the M sequence by using a corresponding formula. Alternatively, the short training sequence corresponding to the HE-STF may be stored, and the short training sequence corresponding to the EHT-STF is obtained through calculation based on the short training sequence corresponding to the HE-STF according to a corresponding formula. This is not limited in the embodiments of this application.

It should be noted that the foregoing describes in detail the method provided in this application by using only 240 MHz and 320 MHz as examples. However, this should not constitute a limitation on a channel bandwidth to which the method provided in this application is applicable. Other short training sequences corresponding to bandwidths, for example, 200 MHz, 280 MHz, and the like, that are greater than 160 MHz, may all be obtained based on the short training sequence design method provided in the embodiments of this application, and may all be compatible with the existing 80 MHz short training sequence (or a rotation factor). Based on the short training sequence design method provided in this application, a person skilled in the art may easily think that a change or replacement of the method may be applied to a channel bandwidth of another size.

It can be learned from the foregoing that for 240 MHz and 320 MHz, period lengths are 0.8 μs and 1.6 μs. Short training sequences S corresponding to a plurality of groups of EHT-STFs are proposed based on frequency domain sequences HES corresponding to HE-STFs whose bandwidths are 80 MHz and 160 MHz. Therefore, the EHT-STF of the channel whose bandwidth is 240 MHz and the EHT-STF of the channel whose bandwidth is 320 MHz are considered to be compatible with the HE-STF, in the existing 802.11ax, whose bandwidth is 80 MHz. In addition, in the embodiments of this application, for channels whose bandwidths are 240 MHz and 320 MHz, exhaustive simulation verification is performed on parameters, to compare the PAPRs in Table 2 to Table 7 with the PAPRs (Table 1) in 802.11ax. The peak to average power ratio corresponding to the short training sequence provided in the embodiments of this application is comparatively small, and has comparatively good performance. Therefore, the estimation effect of the automatic gain control circuit at the receive end is improved, and the receive bit error rate is reduced. Therefore, the PAPR of the short training sequence provided in this solution of this application for the large channel bandwidth can be controlled to a very small value.

Figure 7:
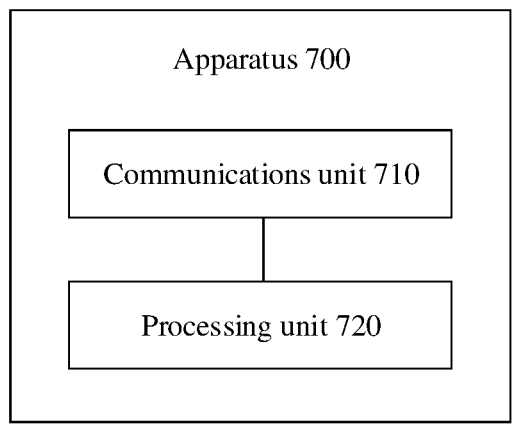
FIG. 7 is an example schematic block diagram of an apparatus for sending a physical layer protocol data unit according to an embodiment of this application.
Figure 8:
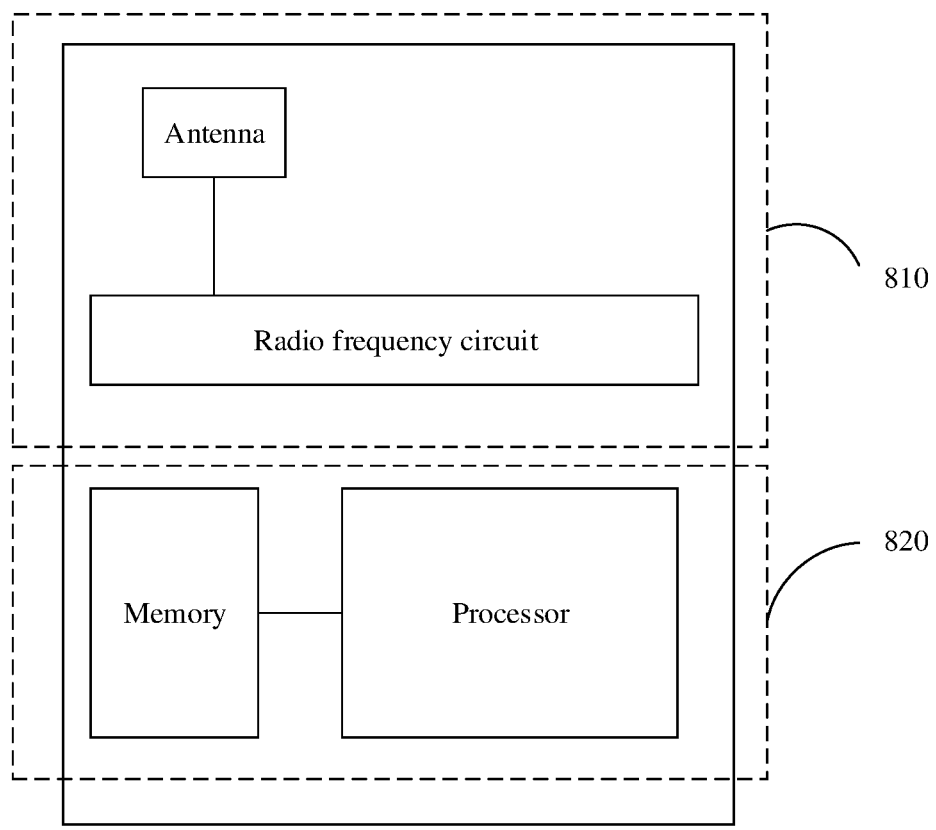
FIG. 8 is an example schematic structural diagram of a network device according to an embodiment of this application.
Figure 9:
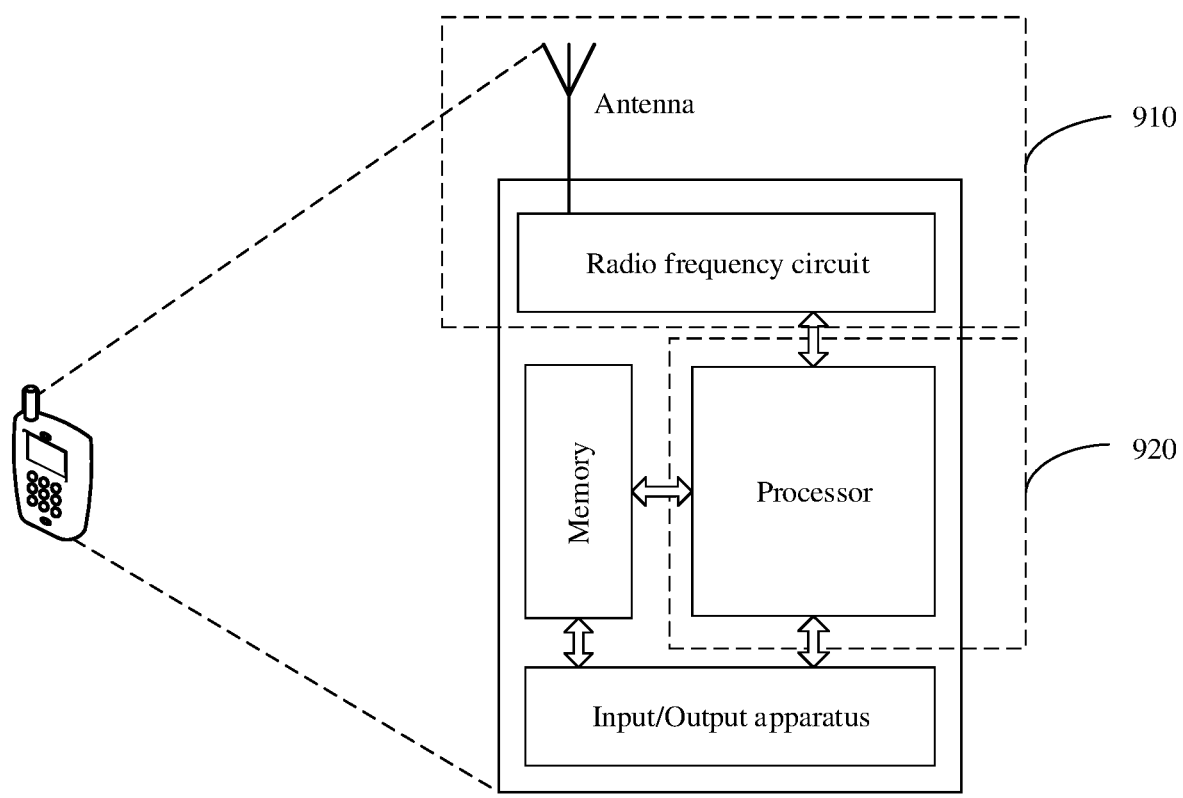
FIG. 9 is an example schematic structural diagram of a terminal device according to an embodiment of this application.

With reference to FIG. 1 to FIG. 6, the foregoing describes in detail the method for sending and receiving a physical layer protocol data unit provided in the embodiments of this application. With reference to FIG. 7 to FIG. 9, the following describes in detail apparatuses for sending and receiving a physical layer protocol data unit provided in the embodiments of this application.

FIG. 7 is a schematic block diagram of an apparatus for sending and receiving a physical layer protocol data unit according to an embodiment of this application. As shown in FIG. 7, the apparatus 700 may include a communications unit 710 and a processing unit 720. The communications unit 710 may communicate with the outside, and the processing unit 720 is configured to process data. The communications unit 710 may also be referred to as a communications interface or a transceiver unit.

In a possible design, the apparatus 700 may implement a step or a procedure performed by the network device in the foregoing method embodiments, for example, may be a network device, or a chip or a circuit configured in a network device. In this case, the apparatus 700 may be referred to as a network device. The communications unit 710 is configured to perform a sending/receiving-related operation on a network device side in the foregoing method embodiments, and the processing unit 720 is configured to perform a processing-related operation of the network device in the foregoing method embodiments.

In a possible implementation, the processing unit 720 is configured to generate a physical layer protocol data unit (PPDU). The PPDU includes a short training field, and a length of a frequency domain sequence of the short training field is greater than a first length. The first length is a length of a frequency domain sequence of a short training field that is transmitted over a 160 MHz-bandwidth channel. The communications unit 710 is configured to send the PPDU over a target channel, where a bandwidth of the target channel is greater than 160 MHz.

Optionally, the bandwidth of the target channel is 240 MHz, and the frequency domain sequence of the short training field is any one of the following:

$$\{HES_{-496:16:496'}, 1, -HES_{-496:16:496'}, 0, -HES_{-496:16:496'}\}*(1+j)\sqrt{2};$$

$$\{-HES_{-496:16:496'}, -1, HES_{-496:16:496'}, 0, HES_{-496:16:496'}\}*(1+j)\sqrt{2};$$

$$\{HES_{-496:16:496'}, 1, -HES_{-496:16:496'}, 1, -HES_{-496:16:496'}\}*(1+j)\sqrt{2};$$

$$\{-HES_{-496:16:496'}, -1, HES_{-496:16:496'}, -1, HES_{-496:16:496'}\}*(1+j)\sqrt{2};$$

$$\{HES_{-496:16:496'}, 1, -HES_{-496:16:496'}, -1, -HES_{-496:16:496'}\}*(1+j)\sqrt{2};$$

$$\{-HES_{-496:16:496'}, -1, HES_{-496:16:496'}, 1, HES_{-496:16:496'}\}*(1+j)\sqrt{2};$$

$$\{HES_{-496:16:496'}, 1, HES_{-496:16:496'}, 1, -HES_{-496:16:496'}\}*(1+j)\sqrt{2};$$

$$\{-HES_{-496:16:496'}, -1, -HES_{-496:16:496'}, -1, HES_{-496:16:496'}\}*(1+j)\sqrt{2};$$

$$\{HES_{-496:16:496'}, 0, HES_{-496:16:496'}, 1, -HES_{-496:16:496'}\}*(1+j)\sqrt{2}; \text{ or}$$

$$\{-HES_{-496:16:496'}, 0, -HES_{-496:16:496'}, -1, HES_{-496:16:496'}\}*(1+j)\sqrt{2}.$$

$HES_{-496:16:496'}$ is represented as $\{M,1,-M,0,-M,1,-M\}$, and $M=\{-1, -1, -1, 1, 1, 1, -1, 1, 1, 1, -1, 1, 1, -1, 1\}$.

Optionally, the bandwidth of the target channel is 240 MHz, and the frequency domain sequence of the short training field is any one of the following:

$$\{HES_{-504:8:504'}, 0, HES_{-504:8:504'}, 0, -HES_{-504:8:504'}\}*(1+j)\sqrt{2};$$

$$\{HES_{-504:8:504'}, 0, -HES_{-504:8:504'}, 0, -HES_{-504:8:504'}\}*(1+j)\sqrt{2};$$

$$\{-HES_{-504:8:504'}, 0, HES_{-504:8:504'}, 0, HES_{-504:8:504'}\}*(1+j)\sqrt{2};$$

$$\{-HES_{-504:8:504'}, 0, -HES_{-504:8:504'}, 0, HES_{-504:8:504'}\}*(1+j)\sqrt{2};$$

$$\{HES_{-504:8:504'}, -1, HES_{-504:8:504'}, 0, -HES_{-504:8:504'}\}*(1+j)\sqrt{2};$$

$$\{HES_{-504:8:504'}, 0, -HES_{-504:8:504'}, 1, -HES_{-504:8:504'}\}*(1+j)\sqrt{2};$$

$$\{-HES_{-504:8:504'}, 0, HES_{-504:8:504'}, -1, HES_{-504:8:504'}\}*(1+j)\sqrt{2};$$

$$\{-HES_{-504:8:504'}, 1, -HES_{-504:8:504'}, 0, HES_{-504:8:504'}\}*(1+j)\sqrt{2};$$

$$\{HES_{-504:8:504'}, 1, HES_{-504:8:504'}, 0, -HES_{-504:8:504'}\}*(1+j)\sqrt{2};$$

$$\{HES_{-504:8:504'}, 0, -HES_{-504:8:504'}, -1, -HES_{-504:8:504'}\}*(1+j)\sqrt{2};$$

$$\{HES_{-504:8:504'}, 0, HES_{-504:8:504'}, 1, HES_{-504:8:504'}\}*(1+j)\sqrt{2};$$

$$\{-HES_{-504:8:504'}, -1, -HES_{-504:8:504'}, 0, -HES_{-504:8:504'}\}*(1+j)\sqrt{2};$$

$$\{-HES_{-504:8:504'}, 1, HES_{-504:8:504'}, 0, HES_{-504:8:504'}\}*(1+j)\sqrt{2};$$

$$\{-HES_{-504:8:504'}, 0, -HES_{-504:8:504'}, -1, HES_{-504:8:504'}\}*(1+j)\sqrt{2};$$

$$\{HES_{-504:8:504'}, -1, HES_{-504:8:504'}, -1, -HES_{-504:8:504'}\}*(1+j)\sqrt{2};$$

$$\{HES_{-504:8:504'}, 1, -HES_{-504:8:504'}, 1, -HES_{-504:8:504'}\}*(1+j)\sqrt{2};$$

$$\{-HES_{-504:8:504'}, -1, HES_{-504:8:504'}, -1, HES_{-504:8:504'}\}*(1+j)\sqrt{2}; \text{ or}$$

$$\{-HES_{-504:8:504'}, 1, -HES_{-504:8:504'}, 1, HES_{-504:8:504'}\}*(1+j)\sqrt{2};$$

$HES_{-504:8:504'}$ is represented as $\{M, -1, M, -1, -M, -1, M, 0, -M, 1, M, 1, -M, 1, -M\}$, and $M=\{-1, -1, -1, 1, 1, 1, -1, 1, 1, 1, -1, 1, 1, -1, 1\}$.

Optionally, the bandwidth of the target channel is 320 MHz, and the frequency domain sequence of the short training field is any one of the following:

$$\{HES_{-496:16:496'}, 1, -HES_{-496:16:496'}, 0, -HES_{-496:16:496'}, 0, -HES_{-496:16:496'}\}*(1+j)\sqrt{2};$$

$$\{HES_{-496:16:496'}, 1, HES_{-496:16:496'}, 0, HES_{-496:16:496'}, 0, HES_{-496:16:496'}\}*(1+j)\sqrt{2};$$

$$\{HES_{-496:16:496'}, 0, HES_{-496:16:496'}, 0, HES_{-496:16:496'}, -1, -HES_{-496:16:496'}\}*(1+j)\sqrt{2};$$

$$\{HES_{-496:16:496'}, 0, HES_{-496:16:496'}, 0, HES_{-496:16:496'}, 1, HES_{-496:16:496'}\}*(1+j)\sqrt{2};$$

$$\{HES_{-496:16:496'}, 1, -HES_{-496:16:496'}, 0, -HES_{-496:16:496'}, 1, -HES_{-496:16:496'}\}*(1+j)\sqrt{2};$$

$$\{-HES_{-496:16:496'}, -1, HES_{-496:16:496'}, 0, HES_{-496:16:496'}, -1, HES_{-496:16:496'}\}*(1+j)\sqrt{2};$$

$$\{HES_{-496:16:496'}, 1, -HES_{-496:16:496'}, 0, -HES_{-496:16:496'}, -1, -HES_{-496:16:496'}\}*(1+j)\sqrt{2};$$

$$\{HES_{-496:16:496'}, 1, -HES_{-496:16:496'}, 0, -HES_{-496:16:496'}, 1, HES_{-496:16:496'}\}*(1+j)\sqrt{2};$$

$$\{HES_{-496:16:496'}, 0, -HES_{-496:16:496'}, 0, -HES_{-496:16:496'}, 0, -HES_{-496:16:496'}\}*(1+j)\sqrt{2}; \text{ or}$$

$$\{-HES_{-496:16:496'}, 0, HES_{-496:16:496'}, 0, HES_{-496:16:496'}, 0, HES_{-496:16:496'}\}*(1+j)\sqrt{2}.$$

$HES_{-496:16:496'}$ is represented as $\{M,1,-M,0,-M,1,-M\}$, and $M=\{-1, -1, -1, 1, 1, 1, -1, 1, 1, 1, -1, 1, 1, -1, 1\}$.

Optionally, the bandwidth of the target channel is 320 MHz, and the frequency domain sequence of the short training field is any one of the following:

$\{HES_{-496:16:496'}, 0, HES_{-496:16:496'}, 0, HES_{-496:16:496'}, 0, -HES_{-496:16:496'}\} * (1+j)\sqrt{2}$; or $\{-HES_{-496:16:496'}, 0, -HES_{-496:16:496'}, 0, -HES_{-496:16:496'}, 0, HES_{-496:16:496'}\} * (1+j)\sqrt{2}$;

$HES_{-496:16:496'}$ is represented as $\{M, 1, -M, 0, -M, 1, -M\}$.

Optionally, the bandwidth of the target channel is 320 MHz, and the frequency domain sequence of the short training field is any one of the following:

$\{HES_{-504:8:504'}, 1, HES_{-504:8:504'}, 0, HES_{-504:8:504'}, 1, -HES_{-504:8:504'}\} * (1+j)\sqrt{2}$;

$\{HES_{-504:8:504'}, -1, -HES_{-504:8:504'}, 0, -HES_{-504:8:504'}, -1, -HES_{-504:8:504'}\} * (1+j)\sqrt{2}$;

$\{-HES_{-504:8:504'}, 1, HES_{-504:8:504'}, 0, HES_{-504:8:504'}, 1, HES_{-504:8:504'}\} * (1+j)\sqrt{2}$;

$\{-HES_{-504:8:504'}, -1, -HES_{-504:8:504'}, 0, -HES_{-504:8:504'}, -1, HES_{-504:8:504'}\} * (1+j)\sqrt{2}$;

$\{HES_{-504:8:504'}, 0, HES_{-504:8:504'}, 0, HES_{-504:8:504'}, 0, -HES_{-504:8:504'}\} * (1+j)\sqrt{2}$;

$\{HES_{-504:8:504'}, 0, -HES_{-504:8:504'}, 0, -HES_{-504:8:504'}, 0, -HES_{-504:8:504'}\} * (1+j)\sqrt{2}$;

$\{-HES_{-504:8:504'}, 0, -HES_{-504:8:504'}, 0, HES_{-504:8:504'}, 0, HES_{-504:8:504'}\} * (1+j)\sqrt{2}$;

$\{-HES_{-504:8:504'}, 0, -HES_{-504:8:504'}, 0, -HES_{-504:8:504'}, 0, HES_{-504:8:504'}\} * (1+j)\sqrt{2}$;

$\{HES_{-504:8:504'}, 0, HES_{-504:8:504'}, 0, HES_{-504:8:504'}, 1, -HES_{-504:8:504'}\} * (1+j)\sqrt{2}$;

$\{HES_{-504:8:504'}, -1, -HES_{-504:8:504'}, 0, -HES_{-504:8:504'}, 0, -HES_{-504:8:504'}\} * (1+j)\sqrt{2}$;

$\{-HES_{-504:8:504'}, 1, HES_{-504:8:504'}, 0, HES_{-504:8:504'}, 0, HES_{-504:8:504'}\} * (1+j)\sqrt{2}$;

$\{-HES_{-504:8:504'}, 0, -HES_{-504:8:504'}, 0, -HES_{-504:8:504'}, -1, HES_{-504:8:504'}\} * (1+j)\sqrt{2}$;

$\{HES_{-504:8:504'}, -1, HES_{-504:8:504'}, 0, HES_{-504:8:504'}, -1, -HES_{-504:8:504'}\} * (1+j)\sqrt{2}$;

$\{HES_{-504:8:504'}, 1, -HES_{-504:8:504'}, 0, -HES_{-504:8:504'}, 1, -HES_{-504:8:504'}\} * (1+j)\sqrt{2}$;

$\{-HES_{-504:8:504'}, -1, HES_{-504:8:504'}, 0, HES_{-504:8:504'}, -1, HES_{-504:8:504'}\} * (1+j)\sqrt{2}$;

$\{-HES_{-504:8:504'}, 1, -HES_{-504:8:504'}, 0, -HES_{-504:8:504'}, 1, HES_{-504:8:504'}\} * (1+j)\sqrt{2}$;

$\{HES_{-504:8:504'}, -1, HES_{-504:8:504'}, 0, HES_{-504:8:504'}, 0, -HES_{-504:8:504'}\} * (1+j)\sqrt{2}$;

$\{HES_{-504:8:504'}, 0, -HES_{-504:8:504'}, 0, -HES_{-504:8:504'}, 1, -HES_{-504:8:504'}\} * (1+j)\sqrt{2}$;

$\{-HES_{-504:8:504'}, 0, HES_{-504:8:504'}, 0, HES_{-504:8:504'}, -1, HES_{-504:8:504'}\} * (1+j)\sqrt{2}$; or $\{-HES_{-504:8:504'}, 1, -HES_{-504:8:504'}, 0, -HES_{-504:8:504'}, 0, HES_{-504:8:504'}\} * (1+j)\sqrt{2}$.

$HES_{-504:8:504'}$ is represented as $\{M, -1, M, -1, -M, -1, M, 0, -M, 1, M, 1, -M, 1, -M\}$, and $M=\{-1, -1, -1, 1, 1, 1, -1, 1, 1, 1, -1, 1, 1, -1, 1\}$.

Optionally, the bandwidth of the target channel is 320 MHz, and the frequency domain sequence of the short training field is any one of the following:

$\{HES_{-504:8:504'}, 0, HES_{-504:8:504'}, 0, HES_{-504:8:504'}, 0, -HES_{-504:8:504'}\} * (1+j)\sqrt{2}$;

$\{HES_{-504:8:504'}, 0, -HES_{-504:8:504'}, 0, -HES_{-504:8:504'}, 0, -HES_{-504:8:504'}\} * (1+j)\sqrt{2}$;

$\{-HES_{-504:8:504'}, 0, HES_{-504:8:504'}, 0, HES_{-504:8:504'}, 0, HES_{-504:8:504'}\} * (1+j)\sqrt{2}$; or $\{-HES_{-504:8:504'}, 0, -HES_{-504:8:504'}, 0, -HES_{-504:8:504'}, 0, HES_{-504:8:504'}\} * (1+j)\sqrt{2}$.

$HES_{-504:8:504'}$ is represented as $\{M, -1, M, -1, -M, -1, M, 0, -M, 1, M, 1, -M, 1, -M\}$, and $M=\{-1, -1, -1, 1, 1, 1, -1, 1, 1, 1, -1, 1, 1, -1, 1\}$.

Optionally, a period length of the frequency domain sequence of the short training field is 0.8 μs or 1.6 μs.

Specifically, the apparatus 700 may include a module configured to perform the method performed by the network device in the method 500. In addition, the modules in the apparatus 700 and the foregoing other operations and/or functions are respectively used to implement corresponding procedures of the method 500 in FIG. 5.

When the apparatus 700 is configured to perform the method 500 in FIG. 5, the processing unit 720 may be configured to perform step 510 in the method 500 and the step of generating a short training sequence, and the communications unit 710 may be configured to perform step 520 in the method 500.

It should be understood that, a specific process of performing a corresponding step by each module has been described in detail in the foregoing method embodiments.

It should be further understood that the processing unit 720 in the apparatus 700 may correspond to a processor 820 in a network device 800 shown in FIG. 8, and the communications unit 710 may correspond to a transceiver 810 in the network device 800 shown in FIG. 8.

In a possible design, the apparatus 700 may implement a step or a procedure performed by the terminal device in the foregoing method embodiments, for example, may be a terminal device, or a chip or a circuit configured in a terminal device. In this case, the apparatus 700 may be referred to as a terminal device. The communications unit 710 is configured to perform a sending/receiving-related operation on a terminal device side in the foregoing method embodiments, and the processing unit 720 is configured to perform a processing-related operation of the terminal device in the foregoing method embodiments.

In a possible implementation, the communications unit 710 is configured to receive a physical layer protocol data unit (PPDU) over a target channel. The PPDU includes a short training field, and a length of a frequency domain sequence of the short training field is greater than a first length. The first length is a length of a frequency domain sequence of a short training field that is transmitted over a 160 MHz-bandwidth channel, and a bandwidth of the target channel is greater than 160 MHz. The processing unit 720 is configured to parse the PPDU.

Optionally, the bandwidth of the target channel is 240 MHz, and the frequency domain sequence of the short training field is any one of the following:

$\{HES_{-496:16:496'},1,-HES_{-496:16:496'},0,$
$\quad -HES_{-496:16:496'}\}*(1+j)\sqrt{2};$ $\{-HES_{-496:16:496'},-1,HES_{-496:16:496'},0,$
$\quad HES_{-496:16:496'}\}*(1+j)\sqrt{2};$ $\{HES_{-496:16:496'},1,-HES_{-496:16:496'},1,$
$\quad -HES_{-496:16:496'}\}*(1+j)\sqrt{2};$ $\{-HES_{-496:16:496'},-1,HES_{-496:16:496'},-1,$
$\quad HES_{-496:16:496'}\}*(1+j)\sqrt{2};$ $\{HES_{-496:16:496'},1,-HES_{-496:16:496'},-1,$
$\quad -HES_{-496:16:496'}\}*(1+j)\sqrt{2};$ $\{-HES_{-496:16:496'},-1,HES_{-496:16:496'},1,$
$\quad HES_{-496:16:496'}\}*(1+j)\sqrt{2};$ $\{HES_{-496:16:496'},1,HES_{-496:16:496'},1,$
$\quad -HES_{-496:16:496'}\}*(1+j)\sqrt{2};$ $\{-HES_{-496:16:496'},-1,-HES_{-496:16:496'},$
$\quad -1,HES_{-496:16:496'}\}*(1+j)\sqrt{2};$ $\{HES_{-496:16:496'},0,HES_{-496:16:496'},1,$
$\quad -HES_{-496:16:496'}\}*(1+j)\sqrt{2};$ or $\{-HES_{-496:16:496'},0,-HES_{-496:16:496'},-1,$
$\quad HES_{-496:16:496'}\}*(1+j)\sqrt{2};$ $HES_{-496:16:496'}$ is represented as $\{M,1,-M,0,-M,1,-M\}$, and $M=\{-1, -1, -1, 1, 1, 1, -1, 1, 1, 1, -1, 1, 1, -1, 1\}$.

Optionally, the bandwidth of the target channel is 240 MHz, and the frequency domain sequence of the short training field is any one of the following:

$\{HES_{-504:8:504'},0,HES_{-504:8:504'},0,-HES_{-504:8:504'}\}*$
$\quad (1+j)\sqrt{2};$ $\{HES_{-504:8:504'},0,-HES_{-504:8:504'},0,-HES_{-504:8:504'}\}*$
$\quad (1+j)\sqrt{2};$ $\{-HES_{-504:8:504'},0,HES_{-504:8:504'},0,HES_{-504:8:504'}\}*$
$\quad (1+j)\sqrt{2};$ $\{-HES_{-504:8:504'},0,-HES_{-504:8:504'},0,HES_{-504:8:504'}\}*$
$\quad (1+j)\sqrt{2};$ $\{HES_{-504:8:504'},-1,HES_{-504:8:504'},0,-HES_{-504:8:504'}\}*$
$\quad (1+j)\sqrt{2};$ $\{HES_{-504:8:504'},0,-HES_{-504:8:504'},1,-HES_{-504:8:504'}\}*$
$\quad (1+j)\sqrt{2};$ $\{-HES_{-504:8:504'},0,-HES_{-504:8:504'},-1,HES_{-504:8:504'}\}*$
$\quad (1+j)\sqrt{2};$ $\{-HES_{-504:8:504'},1,HES_{-504:8:504'},0,HES_{-504:8:504'}\}*$
$\quad (1+j)\sqrt{2};$ $\{HES_{-504:8:504'},1,HES_{-504:8:504'},0,-HES_{-504:8:504'}\}*$
$\quad (1+j)\sqrt{2};$ $\{HES_{-504:8:504'},0,-HES_{-504:8:504'},-1,$
$\quad -HES_{-504:8:504'}\}*(1+j)\sqrt{2};$ $\{-HES_{-504:8:504'},0,HES_{-504:8:504'},1,HES_{-504:8:504'}\}*$
$\quad (1+j)\sqrt{2};$ $\{-HES_{-504:8:504'},-1,-HES_{-504:8:504'},0,$
$\quad -HES_{-504:8:504'}\}*(1+j)\sqrt{2};$ $\{-HES_{-504:8:504'},1,HES_{-504:8:504'},0,HES_{-504:8:504'}\}*$
$\quad (1+j)\sqrt{2};$ $\{-HES_{-504:8:504'},0,-HES_{-504:8:504'},-1,$
$\quad HES_{-504:8:504'}\}*(1+j)\sqrt{2};$ $\{HES_{-504:8:504'},-1,HES_{-504:8:504'},-1,$
$\quad -HES_{-504:8:504'}\}*(1+j)\sqrt{2};$ $\{HES_{-504:8:504'},1,-HES_{-504:8:504'},1,-HES_{-504:8:504'}\}*$
$\quad (1+j)\sqrt{2};$ $\{-HES_{-504:8:504'},-1,HES_{-504:8:504'},-1,$
$\quad HES_{-504:8:504'}\}*(1+j)\sqrt{2};$ or $\{-HES_{-504:8:504'},1,-HES_{-504:8:504'},1,HES_{-504:8:504'}\}*$
$\quad (1+j)\sqrt{2};$ $HES_{-504:8:504'}$ is represented as $\{M, -1, M, -1, -M, -1, M, 0, -M, 1, M, 1, -M, 1, -M\}$, and $M=\{-1, -1, -1, 1, 1, 1, -1, 1, 1, 1, -1, 1, 1, -1, 1\}$.

Optionally, the bandwidth of the target channel is 320 MHz, and the frequency domain sequence of the short training field is any one of the following:

$\{HES_{-496:16:496'},1,-HES_{-496:16:496'},0,$
$\quad -HES_{-496:16:496'},0,-HES_{-496:16:496'}\}*(1+j)\sqrt{2};$ $\{-HES_{-496:16:496'},1,HES_{-496:16:496'},0,HES_{-496:16:496'},$
$\quad 0,HES_{-496:16:496'}\}*(1+j)\sqrt{2};$ $\{HES_{-496:16:496'},0,-HES_{-496:16:496'},0,$
$\quad -HES_{-496:16:496'},-1,-HES_{-496:16:496'}\}*(1+j)\sqrt{2};$ $\{-HES_{-496:16:496'},0,HES_{-496:16:496'},0,HES_{-496:16:496'},$
$\quad 1,HES_{-496:16:496'}\}*(1+j)\sqrt{2};$ $\{HES_{-496:16:496'},1,-HES_{-496:16:496'},0,$
$\quad -HES_{-496:16:496'},1,-HES_{-496:16:496'}\}*(1+j)\sqrt{2};$ $\{-HES_{-496:16:496'},-1,HES_{-496:16:496'},0,$
$\quad HES_{-496:16:496'},-1,HES_{-496:16:496'}\}*(1+j)\sqrt{2};$ $\{HES_{-496:16:496'},1,-HES_{-496:16:496'},0,$
$\quad -HES_{-496:16:496'},-1,-HES_{-496:16:496'}\}*(1+j)\sqrt{2};$ $\{-HES_{-496:16:496'},-1,HES_{-496:16:496'},0,$
$\quad HES_{-496:16:496'},1,HES_{-496:16:496'}\}*(1+j)\sqrt{2};$ $\{HES_{-496:16:496'},0,-HES_{-496:16:496'},0,$
$\quad -HES_{-496:16:496'},0,-HES_{-496:16:496'}\}*(1+j)\sqrt{2};$ or $\{-HES_{-496:16:496'},0,HES_{-496:16:496'},0,HES_{-496:16:496'},$
$\quad 0,HES_{-496:16:496'}\}*(1+j)\sqrt{2};$ $HES_{-496:16:496'}$ is represented as $\{M,1,-M,0,-M,1,-M\}$, and $M=\{-1, -1, -1, 1, 1, 1, -1, 1, 1, 1, -1, 1, 1, -1, 1\}$.

Optionally, the bandwidth of the target channel is 320 MHz, and the frequency domain sequence of the short training field is any one of the following:

$\{HES_{-496:16:496'},0,HES_{-496:16:496'},0,HES_{-496:16:496'},$
$\quad 0,-HES_{-496:16:496'}\}*(1+j)\sqrt{2};$ or $\{-HES_{-496:16:496'},0,-HES_{-496:16:496'},0,$
$\quad -HES_{-496:16:496'},0,HES_{-496:16:496'}\}*(1+j)\sqrt{2}.$ $HES_{-496:16:496'}$ is represented as $\{M,1,-M,0,-M,1,-M\}$.

Optionally, the bandwidth of the target channel is 320 MHz, and the frequency domain sequence of the short training field is any one of the following:

{HES$_{-504:8:504'}$,1,HES$_{-504:8:504'}$,0,HES$_{-504:8:504'}$,1,-HES$_{-504:8:504'}$}*(1+$j$)√2;

{HES$_{-504:8:504'}$,-1,-HES$_{-504:8:504'}$,0,-HES$_{-504:8:504'}$,-1,-HES$_{-504:8:504'}$}*(1+$j$)√2;

{-HES$_{-504:8:504'}$,1,HES$_{-504:8:504'}$,0,HES$_{-504:8:504'}$,1,HES$_{-504:8:504'}$}*(1+$j$)√2;

{-HES$_{-504:8:504'}$,-1,-HES$_{-504:8:504'}$,0,-HES$_{-504:8:504'}$,-1,HES$_{-504:8:504'}$}*(1+$j$)√2;

{HES$_{-504:8:504'}$,0,HES$_{-504:8:504'}$,0,HES$_{-504:8:504'}$,0,-HES$_{-504:8:504'}$}*(1+$j$)√2;

{HES$_{-504:8:504'}$,0,-HES$_{-504:8:504'}$,0,-HES$_{-504:8:504'}$,0,-HES$_{-504:8:504'}$}*(1+$j$)√2;

{-HES$_{-504:8:504'}$,0,HES$_{-504:8:504'}$,0,HES$_{-504:8:504'}$,0,HES$_{-504:8:504'}$}*(1+$j$)√2;

{-HES$_{-504:8:504'}$,0,-HES$_{-504:8:504'}$,0,-HES$_{-504:8:504'}$,0,HES$_{-504:8:504'}$}*(1+$j$)√2;

{HES$_{-504:8:504'}$,0,HES$_{-504:8:504'}$,0,HES$_{-504:8:504'}$,1,-HES$_{-504:8:504'}$}*(1+$j$)√2;

{HES$_{-504:8:504'}$,-1,-HES$_{-504:8:504'}$,0,-HES$_{-504:8:504'}$,0,-HES$_{-504:8:504'}$}*(1+$j$)√2;

{-HES$_{-504:8:504'}$,1,HES$_{-504:8:504'}$,0,HES$_{-504:8:504'}$,0,HES$_{-504:8:504'}$}*(1+$j$)√2;

{-HES$_{-504:8:504'}$,0,-HES$_{-504:8:504'}$,0,-HES$_{-504:8:504'}$,-1,HES$_{-504:8:504'}$}*(1+$j$)√2;

{HES$_{-504:8:504'}$,-1,HES$_{-504:8:504'}$,0,HES$_{-504:8:504'}$,-1,-HES$_{-504:8:504'}$}*(1+$j$)√2;

{HES$_{-504:8:504'}$,1,-HES$_{-504:8:504'}$,0,-HES$_{-504:8:504'}$,1,-HES$_{-504:8:504'}$}*(1+$j$)√2;

{-HES$_{-504:8:504'}$,-1,HES$_{-504:8:504'}$,0,HES$_{-504:8:504'}$,-1,HES$_{-504:8:504'}$}*(1+$j$)√2;

{-HES$_{-504:8:504'}$,1,-HES$_{-504:8:504'}$,0,-HES$_{-504:8:504'}$,1,HES$_{-504:8:504'}$}*(1+$j$)√2;

{HES$_{-504:8:504'}$,-1,HES$_{-504:8:504'}$,0,HES$_{-504:8:504'}$,0,-HES$_{-504:8:504'}$}*(1+$j$)√2;

{HES$_{-504:8:504'}$,0,-HES$_{-504:8:504'}$,0,-HES$_{-504:8:504'}$,1,-HES$_{-504:8:504'}$}*(1+$j$)√2;

{-HES$_{-504:8:504'}$,0,HES$_{-504:8:504'}$,0,HES$_{-504:8:504'}$,-1,HES$_{-504:8:504'}$}*(1+$j$)√2; or

{-HES$_{-504:8:504'}$,1,-HES$_{-504:8:504'}$,0,-HES$_{-504:8:504'}$,0,HES$_{-504:8:504'}$}*(1+$j$)√2;

HES$_{-504:8:504'}$ is represented as {M, −1, M, −1, −M, −1, M, 0, −M, 1, M, 1, −M, 1, −M}, and M={−1, −1, −1, 1, 1, 1, −1, 1, 1, 1, −1, 1, 1, −1, 1}.

Optionally, the bandwidth of the target channel is 320 MHz, and the frequency domain sequence of the short training field is any one of the following:

{HES$_{-504:8:504'}$,0,HES$_{-504:8:504'}$,0,HES$_{-504:8:504'}$,0,-HES$_{-504:8:504'}$}*(1+$j$)√2;

{HES$_{-504:8:504'}$,0,-HES$_{-504:8:504'}$,0,-HES$_{-504:8:504'}$,0,-HES$_{-504:8:504'}$}*(1+$j$)√2;

{-HES$_{-504:8:504'}$,0,HES$_{-504:8:504'}$,0,HES$_{-504:8:504'}$,0,HES$_{-504:8:504'}$}*(1+$j$)√2; or

{-HES$_{-504:8:504'}$,0,-HES$_{-504:8:504'}$,0,-HES$_{-504:8:504'}$,0,HES$_{-504:8:504'}$}*(1+$j$)√2.

HES$_{-504:8:504'}$ is represented as {M, −1, M, −1, −M, −1, M, 0, −M, 1, M, 1, −M, 1, −M}, and M={−1, −1, −1, 1, 1, 1, −1, 1, 1, 1, −1, 1, 1, −1, 1}.

Optionally, a period length of the frequency domain sequence of the short training field is 0.8 μs or 1.6 μs.

Specifically, the apparatus 700 may include a module configured to perform the method performed by the terminal device in the method 500. In addition, the modules in the apparatus 700 and the foregoing other operations and/or functions are respectively used to implement corresponding procedures of the method 500 in FIG. 5.

When the apparatus 700 is configured to perform the method 500 in FIG. 5, the processing unit 720 may be configured to perform steps such as parsing the PPDU in the method 500, and the communications unit 710 may be configured to perform step 520 in the method 500.

It should be understood that, a specific process of performing a corresponding step by each module has been described in detail in the foregoing method embodiments.

It should be further understood that the processing unit 720 in the apparatus 700 may correspond to a processor 920 in a terminal device 900 shown in FIG. 9, and the communications unit 710 may correspond to a transceiver 910 in the terminal device 900 shown in FIG. 9.

An embodiment of this application further provides an apparatus 800. The apparatus 800 may be a network device or a chip. The apparatus 800 may be configured to perform an action performed by the network device in the foregoing method embodiments.

When the apparatus 800 is a network device, for example, a base station, FIG. 8 is a simplified schematic diagram of a structure of the base station. The base station includes a part 810 and a part 820. The part 810 (e.g., a transceiver) is mainly configured to: send and receive a radio frequency signal, and perform conversion between the radio frequency signal and a baseband signal. The part 820 (e.g., processing circuitry) is mainly configured to: perform baseband processing, control the base station, and the like. The part 810 may be usually referred to as a transceiver unit, a transceiver device, a transceiver circuit, a transceiver, or the like. The part 820 is usually a control center of the base station, may usually be referred to as a processing unit, and is configured to control the base station to perform a processing operation on a network device side in the foregoing method embodiments.

The transceiver unit of the part 810 may also be referred to as a transceiver device, a transceiver, or the like, and includes an antenna and a radio frequency unit. The radio frequency unit is mainly configured to perform radio frequency processing. Optionally, a component that is of the part 810 and that is configured to implement a receiving function may be considered as a receiving unit, and a component that is configured to implement a sending function may be considered as a sending unit. In other words, the part 810 includes the receiving unit and the sending unit. The receiving unit may also be referred to as a receiver device, a receiver, a receiver circuit, or the like. The sending unit may be referred to as a transmitter device, a transmitter, a transmitter circuit, or the like.

The part 820 may include one or more boards, and each board may include one or more processors and one or more memories. The processor is configured to read and execute a program in the memory to implement a baseband processing function and control the base station. If there are a plurality of boards, the boards may be interconnected to enhance a processing capability. In an optional implementation, alternatively, the plurality of boards may share one or more processors, or the plurality of boards share one or more memories, or the plurality of boards simultaneously share one or more processors.

For example, in an implementation, the transceiver unit in the part 810 is configured to perform the sending operation on the network device side in step 520 in FIG. 5, and/or the transceiver unit in the part 810 is further configured to perform other receiving and sending steps on the network device side in the embodiments of this application. The processing unit in the part 820 is configured to perform a processing operation in step 510 in FIG. 5, and/or the processing unit in the part 820 is further configured to perform a processing step on the network device side in the embodiments of this application.

It should be understood that FIG. 8 is merely an example instead of a limitation. The network device including the transceiver unit and the processing unit may not depend on the structure shown in FIG. 8.

When the communications apparatus 800 is a chip, the chip includes a transceiver unit and a processing unit. The transceiver unit may be an input/output circuit or a communications interface. The processing unit includes a processor, a microprocessor, or an integrated circuit that is integrated on the chip.

In addition, the network device is not limited to the foregoing forms, and may also be in another form. For example, the network device includes a BBU and an adaptive radio unit (ARU), or includes a BBU and an active antenna unit (AAU), or may be customer-premises equipment (CPE), or may be in another form. This is not limited in this application.

The BBU may be configured to perform an action that is implemented inside the network device and that is described in the foregoing method embodiments, and the RRU may be configured to perform an action of receiving or sending that is performed by the network device from or to the terminal device and that is described in the foregoing method embodiments. For details, refer to the descriptions in the foregoing method embodiments.

An embodiment of this application further provides a communications apparatus. The communications apparatus may be a terminal device or a chip. The communications apparatus may be configured to perform an action performed by the terminal device in the foregoing method embodiments.

When the communications apparatus is a terminal device, FIG. 9 is a simplified schematic structural diagram of a terminal device. For ease of understanding and convenience of figure illustration, an example in which the terminal device is a mobile phone is used in FIG. 9. As shown in FIG. 9, the terminal device includes a processor, a memory, a radio frequency circuit, an antenna, and an input/output apparatus. The processor is mainly configured to: process a communications protocol and communications data, control the terminal device, execute a software program, process data of the software program, and the like. The memory is mainly configured to store the software program and data. The radio frequency circuit is mainly configured to: perform conversion between a baseband signal and a radio frequency signal, and process the radio frequency signal. The antenna is mainly configured to send and receive a radio frequency signal in an electromagnetic wave form. The input/output apparatus, for example, a touchscreen, a display screen, or a keyboard, is mainly configured to: receive data entered by a user, and output data to the user. It should be noted that some types of terminal devices may have no input/output apparatus.

When data needs to be sent, after performing baseband processing on the to-be-sent data, the processor outputs a baseband signal to the radio frequency circuit. After performing radio frequency processing on the baseband signal, the radio frequency circuit sends a radio frequency signal to the outside in an electromagnetic wave form through the antenna. When data is sent to the terminal device, the radio frequency circuit receives the radio frequency signal through the antenna, converts the radio frequency signal into a baseband signal, and outputs the baseband signal to the processor. The processor converts the baseband signal into data, and processes the data. For ease of description, FIG. 9 shows only one memory and one processor. In an actual terminal device product, there may be one or more processors and one or more memories. The memory may also be referred to as a storage medium, a storage device, or the like. The memory may be disposed independent of the processor, or may be integrated with the processor. This is not limited in this embodiment of this application.

In the embodiments of this application, the radio frequency circuit and the antenna that has sending and receiving functions may be considered as a transceiver unit of the terminal device, and the processor that has a processing function may be considered as a processing unit of the terminal device.

As shown in FIG. 9, the terminal device includes a transceiver unit 910 and a processing unit 920. The transceiver unit 910 may also be referred to as a transceiver, a transceiver device, a transceiver apparatus, or the like. The processing unit 920 may also be referred to as a processor, a processing board, a processing module, a processing apparatus, or the like. Optionally, a component that is in the transceiver unit 910 and that is configured to implement a receiving function may be considered as a receiving unit, and a component that is in the transceiver unit 910 and that is configured to implement a sending function may be considered as a sending unit. In other words, the transceiver unit 910 includes the receiving unit and the sending unit. The transceiver unit may also be sometimes referred to as a transceiver device, a transceiver, a transceiver circuit, or the like. The receiving unit sometimes may also be referred to as a receiver device, a receiver, a receiving circuit, or the like. The sending unit sometimes may also be referred to as a transmitter device, a transmitter, a transmitter circuit, or the like.

For example, in an implementation, the processing unit 920 is configured to perform step 530 shown in FIG. 5. The transceiver unit 910 is further configured to perform step 520 shown in FIG. 5, and/or the transceiver unit 910 is further configured to perform other sending and receiving steps on a terminal device side.

It should be understood that FIG. 9 is merely an example instead of a limitation. The terminal device including the transceiver unit and the processing unit may not depend on the structure shown in FIG. 9.

When the communications device is a chip, the chip includes a transceiver unit and a processing unit. The transceiver unit may be an input/output circuit or a communications interface. The processing unit may be a processor, a microprocessor, or an integrated circuit integrated on the chip.

An embodiment of this application further provides a processing apparatus, including a processor and an interface. The processor may be configured to perform a method described in the method embodiments.

It should be understood that the foregoing processing apparatus may be a chip. For example, the processing apparatus may be a field programmable gate array (FPGA), an application-specific integrated circuit (ASIC), a system on chip (SoC), a central processor unit (CPU), a network processor (NP), a digital signal processor (DSP), a micro controller unit (MCU), or a programmable logic device (PLD) or another integrated chip.

In an implementation process, steps in the foregoing methods can be implemented by using a hardware integrated logical circuit in the processor, or by using instructions in a form of software. The steps of the method disclosed with reference to the embodiments of this application may be directly performed by a hardware processor, or may be performed by using a combination of hardware in the processor and a software module. A software module may be located in a storage medium in the art, for example, a random access memory, a flash memory, a read-only memory, a programmable read-only memory, an electrically erasable programmable memory, or a register. The storage medium is located in the memory, and a processor reads information in the memory and completes the steps in the foregoing methods in combination with hardware of the processor.

It should be noted that, the processor in the embodiments of this application may be an integrated circuit chip, and has a signal processing capability. In an implementation process, steps in the foregoing method embodiments can be implemented by using a hardware integrated logical circuit in the processor, or by using instructions in a form of software. The processor may be a general purpose processor, a digital signal processor (DSP), an application-specific integrated circuit (ASIC), a field programmable gate array (FPGA) or another programmable logic device, a discrete gate or a transistor logic device, or a discrete hardware component. It may implement or perform the methods, the steps, and logical block diagrams that are disclosed in the embodiments of this application. The general purpose processor may be a microprocessor, or the processor may be any conventional processor or the like. Steps of the methods disclosed with reference to the embodiments of this application may be directly executed and accomplished by a hardware decoding processor, or may be executed and accomplished by using a combination of hardware and software modules in the decoding processor. A software module may be located in a storage medium in the art, for example, a random access memory, a flash memory, a read-only memory, a programmable read-only memory, an electrically erasable programmable memory, or a register. The storage medium is located in the memory, and a processor reads information in the memory and completes the steps in the foregoing methods in combination with hardware of the processor.

It may be understood that the memory in the embodiments of this application may be a volatile memory or a non-volatile memory, or may include a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct rambus dynamic random access memory (DR RAM). It should be noted that the memory of the systems and methods described in this specification includes but is not limited to these and any memory of another type.

According to the methods provided in the embodiments of this application, this application further provides a computer program product, and the computer program product includes computer program code. When the computer program code is run on a computer, the computer is enabled to perform the method in the embodiment shown in FIG. 5.

According to the methods provided in the embodiments of this application, this application further provides a computer-readable medium. The computer-readable medium stores program code. When the program code is run on a computer, the computer is enabled to perform the method in the embodiment shown in FIG. 5.

According to the methods provided in the embodiments of this application, this application further provides a system. The system includes the foregoing one or more terminal devices and the foregoing one or more network devices.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments.

In the several embodiments provided in this application, it should be understood that the disclosed system, apparatus, and method may be implemented in other manners. For example, the described apparatus embodiment is merely an example. For example, the unit division is merely logical function division and may be other division in an actual implementation. For example, a plurality of units or components may be combined or integrated into another system, or some features may be ignored or not performed. In addition, the displayed or discussed mutual couplings or direct couplings or communications connections may be implemented through some interfaces. The indirect couplings or communications connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing description is merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for sending a physical layer protocol data unit (PPDU), the method comprising:
generating the PPDU over a target channel of 320 MHz, the PPDU comprising a short training field, and a frequency domain sequence of the short training field satisfying $\{c_1*HES_{-504:8:504'}, a_1, c_2*HES_{-504:8:504'}, 0, c_3*HES_{-504:8:504'}, a_2, c_4*HES_{-504:8:504'}\}*(1+j)/\sqrt{2}$, wherein a value of $a_i$ is $\{-1, 0, 1\}$, and i=1 and 2;
a value of $c_j$ is $\{-1, 1\}$, and j=1, 2, 3, and 4; and
$HES_{-504:8:504'}$ is represented as $\{M, -1, M, -1, -M, -1, M, 0, -M, 1, M, 1, -M, 1, -M\}$, $M=\{-1, -1, -1, 1, 1, 1, -1, 1, 1, 1, -1, 1, 1, -1, 1\}$; and
sending the PPDU over the target channel.

2. The method according to claim 1, wherein a period length of the frequency domain sequence of the short training field is 1.6 µs.

3. The method according to claim 1, wherein $a_1=0$ and $a_2=0$.

4. The method according to claim 3, wherein c1=1, c2=1, and c4=−1.

5. A method for receiving a physical layer protocol data unit (PPDU), the method comprising:
receiving the PPDU over a target channel of 320 MHz;
performing automatic gain control (AGC based on a frequency domain sequence of a short training field of the PPDU, the frequency domain sequence of a short training field of the PPDU relating to a defined frequency domain sequence of 320 MHz, and the defined frequency domain sequence of 320 MHz satisfying $\{c_1*HES_{-504:8:504'}, a_1, c_2*HES_{-504:8:504'}, 0, c_3*HES_{-504:8:504'}, a_2, c_4*HES_{-504:8:504'}\}*(+1+j)/\sqrt{2}$, wherein a value of $a_i$ is $\{-1, 0, 1\}$, and i=1 and 2;
a value of $c_j$ is $\{-1, 1\}$, and j=1, 2, 3, and 4; and
$HES_{-504:8:504'}$ is represented as $\{M, -1, M, -1, -M, -1, M, 0, -M, 1, M, 1, -M, 1, -M\}$, $M=\{-1, -1, -1, 1, 1, 1, -1, 1, 1, 1, -1, 1, 1, -1, 1\}$.

6. The method according to claim 5, wherein a period length of the frequency domain sequence of the short training field is 1.6 µs.

7. The method according to claim 5, wherein $a_1=0$ and $a_2=0$.

8. The method according to claim 7, wherein c1=1, c2=1, and c4=−1.

9. An apparatus configured to send a physical layer protocol data unit (PPDU), the apparatus comprising a processor and a communications interface operatively coupled to the processor,
wherein the processer is configured to:
generate the PPDU over a target channel of 320 MHz, the PPDU comprising a short training field, and a frequency domain sequence of the short training field satisfying $\{c_1*HES_{-504:8:504'}, a_1, c_2*HES_{-504:8:504'}, 0, c_3*HES_{-504:8:504'}, a_2, c_4*HES_{-504:8:504'}\}*(1+j)/\sqrt{2}$, wherein a value of $a_i$ is $\{-1, 0, 1\}$, and i=1 and 2;
a value of $c_j$ is $\{-1, 1\}$, and j=1, 2, 3, and 4; and
$HES_{-504:8:504'}$ is represented as $\{M, -1, M, -1, -M, -1, M, 0, -M, 1, M, 1, -M, 1, -M\}$, $M=\{-1, -1, -1, 1, 1, 1, -1, 1, 1, 1, -1, 1, 1, -1, 1\}$; and
the communications interface is configured to:
send the PPDU over the target channel.

10. The apparatus according to claim 9, wherein a period length of the frequency domain sequence of the short training field is 1.6 µs.

11. The apparatus according to claim 9, wherein $a_1=0$ and $a_2=0$.

12. The apparatus according to claim 11, wherein c1=1, c2=1, and c4=−1.

13. An apparatus configured to send a physical layer protocol data unit (PPDU), the apparatus comprising: a processor and a communications interface operatively coupled to the processor, wherein the communications interface is configured to receive the PPDU over a target channel of 320 MHz; and
the processor is configured to perform automatic gain control (AGO based on a frequency domain sequence of a short training field of the PPDU, the frequency domain sequence of a short training field of the PPDU relating to a defined frequency domain sequence of 320 MHz, and the defined frequency domain sequence of 320 MHz satisfying $\{c_1*HES_{-504:8:504'}, a_1, c_2*HES_{-504:8:504'}, 0, c_3*HES_{-504:8:504'}, a_2, c_4*HES_{-504:8:504'}\}*(1+j)/\sqrt{2}$, wherein a value of $a_i$ is $\{-1, 0, 1\}$, and i=1 and 2;
a value of $c_i$ is $\{-1, 1\}$, and j=1, 2, 3, and 4; and
$HES_{-504:8:504'}$ is represented as $\{M, -1, M, -1, -M, -1, M, 0, -M, 1, M, 1, -M, 1, -M\}$ $M=\{-1, -1, -1, 1, 1, 1, -1, 1, 1, 1, -1, 1, 1, -1, 1\}$.

14. The apparatus according to claim 13, wherein a period length of the frequency domain sequence of the short training field is 1.6 µs.

15. The apparatus according to claim 13, wherein $a_1=0$ and $a_2=0$.

16. The apparatus according to claim 15, wherein c1=1, c2=1, and c4=−1.

* * * * *